United States Patent
Bhargava et al.

(10) Patent No.: US 12,072,532 B2
(45) Date of Patent: Aug. 27, 2024

(54) ELECTRO-OPTIC COMBINER AND ASSOCIATED METHODS

(71) Applicant: Ayar Labs, Inc., Santa Clara, CA (US)

(72) Inventors: Pavan Bhargava, Berkeley, CA (US); Derek Van Orden, San Francisco, CA (US); Mark Wade, Berkeley, CA (US); John Fini, Oakland, CA (US); Chen Sun, Berkeley, CA (US); Milos Popovic, San Francisco, CA (US); Anatol Khilo, Dublin, CA (US)

(73) Assignee: Ayar Labs, Inc., Santa Clara, CA (US)

( * ) Notice: Subject to any disclaimer, the term of this patent is extended or adjusted under 35 U.S.C. 154(b) by 106 days.

(21) Appl. No.: 17/982,497

(22) Filed: Nov. 7, 2022

(65) Prior Publication Data

US 2023/0059176 A1     Feb. 23, 2023

Related U.S. Application Data

(63) Continuation of application No. 17/353,789, filed on Jun. 21, 2021, now Pat. No. 11,493,694.

(Continued)

(51) Int. Cl.
    *G02B 6/293*      (2006.01)
    *G02B 6/27*      (2006.01)
    (Continued)

(52) U.S. Cl.
    CPC ......... *G02B 6/29343* (2013.01); *G02B 6/272* (2013.01); *G02B 6/2766* (2013.01);
    (Continued)

(58) Field of Classification Search
    CPC .. G02B 6/29343; G02B 6/272; G02B 6/2766; G02B 6/2773; G02B 6/2934;
    (Continued)

(56) References Cited

U.S. PATENT DOCUMENTS 6,400,856 B1 *    6/2002    Chin .................. G02B 6/12007
                                                         385/11
6,895,161 B2      5/2005    Romo et al.
(Continued)

OTHER PUBLICATIONS

PCT Application No. PCT/US21/38550, International Search Report and Written Opinion, Mailed on Oct. 4, 2021, 28 pages.
(Continued)

*Primary Examiner* — Ryan A Lepisto
*Assistant Examiner* — Erin D Chiem
(74) *Attorney, Agent, or Firm* — Penilla IP, APC

(57) ABSTRACT

An electro-optic combiner includes a polarization splitter and rotator (PSR) that directs a portion of incoming light having a first polarization through a first optical waveguide (OW). The PSR rotates a portion of the incoming light having a second polarization to the first polarization to provide polarization-rotated light. The PSR directs the polarization-rotated light through a second OW. Each of the first and second OW's has a respective combiner section. The first and second OW combiner sections extend parallel to each other and have opposite light propagation directions. A plurality of ring resonators is disposed between the combiner sections of the first and second OW's and within an evanescent optically coupling distance of both the first and second OW's. Each of ring resonators operates at a respective resonant wavelength to optically couple light from the combiner section of the first OW into the combiner section of the second OW.

20 Claims, 31 Drawing Sheets

Related U.S. Application Data

(60) Provisional application No. 63/043,774, filed on Jun. 24, 2020.

(51) Int. Cl.
  G02B 6/42 (2006.01)
  G02B 27/10 (2006.01)
  G02B 27/28 (2006.01)
  H04B 10/60 (2013.01)

(52) U.S. Cl.
  CPC ......... *G02B 6/2773* (2013.01); *G02B 6/2934* (2013.01); *G02B 6/4213* (2013.01); *G02B 6/4215* (2013.01); *G02B 27/1006* (2013.01); *H04B 10/60* (2013.01)

(58) Field of Classification Search
  CPC .. G02B 6/4213; G02B 6/4215; G02B 6/2793; G02B 6/34; G02B 27/1006; G02B 27/283; H04B 10/60; H04B 10/6151
  See application file for complete search history.

(56) References Cited

U.S. PATENT DOCUMENTS

| | | | |
|---|---|---|---|
| 7,068,887 B1 | 6/2006 | Gunn, III et al. | |
| 9,261,754 B2* | 2/2016 | Xu | G02F 1/365 |
| 9,584,246 B2 | 2/2017 | Jeong | |
| 9,615,152 B2 | 4/2017 | Jeong | |
| 10,225,018 B2 | 3/2019 | Witzens et al. | |
| 10,659,154 B2 | 5/2020 | Toda et al. | |
| 10,684,415 B1 | 6/2020 | Bulthuis et al. | |
| 10,735,124 B2* | 8/2020 | Ji | G02B 6/29383 |
| 10,841,012 B2 | 11/2020 | Wang et al. | |
| 11,172,275 B2 | 11/2021 | Testa et al. | |
| 2001/0053008 A1 | 12/2001 | Ueno | |
| 2003/0123780 A1 | 7/2003 | Fischer | |
| 2008/0123188 A1* | 5/2008 | Klein | G02B 6/29343 359/487.04 |
| 2014/0153931 A1 | 6/2014 | Doerr | |
| 2014/0217269 A1 | 8/2014 | Guo et al. | |
| 2015/0381301 A1* | 12/2015 | Jeong | H04J 14/06 398/79 |
| 2016/0007105 A1* | 1/2016 | Jeong | H04J 14/02 398/48 |
| 2018/0062761 A1 | 3/2018 | Wade et al. | |
| 2018/0143460 A1* | 5/2018 | Wen | G02B 27/286 |
| 2018/0375583 A1* | 12/2018 | Wang | H04J 14/02 |
| 2019/0179163 A1 | 6/2019 | Ueno | |
| 2019/0207682 A1 | 7/2019 | Wen et al. | |
| 2021/0159659 A1* | 5/2021 | Bandyopadhyay | H01S 3/094053 |
| 2021/0405308 A1 | 12/2021 | Bhargava et al. | |

OTHER PUBLICATIONS

Madsen C.K. et al., "Reset-Free Integrated Polarization Controller Using Phase Shifters," IEEE Journal of Selected Topics in Quantum Electronics, vol. 11, No. 2, Mar./Apr. 2005, 8 pages.

Sun, C. et al., "Single-Chip Microprocessor that Communicates Directly Using Light," Nature, vol. 528, Dec. 2015, 5 pages (pp. 534-538).

PCT Application No. PCT/US23/12442, International Search Report and Written Opinion, Mailed on Jul. 7, 2023, 12 pages.

Nojic, Jovana et al., "Polarization-Diverse Silicon Photonics WDM Receiver with a Reduced Number of OADMs and Balanced Group Delays," Optical Fiber Communication Conference (OFC) 2020, OSA Technical Digest, Optica Publishing Group, Mar. 8, 2020, paper M4H.2, 3 pages.

Park, Anthony H. K. et al., "Ring Resonator Based Polarization Diversity WDM Receiver," Optics Express, vol. 27, No. 5, Mar. 4, 2019, 11 pages.

* cited by examiner (View A-A)

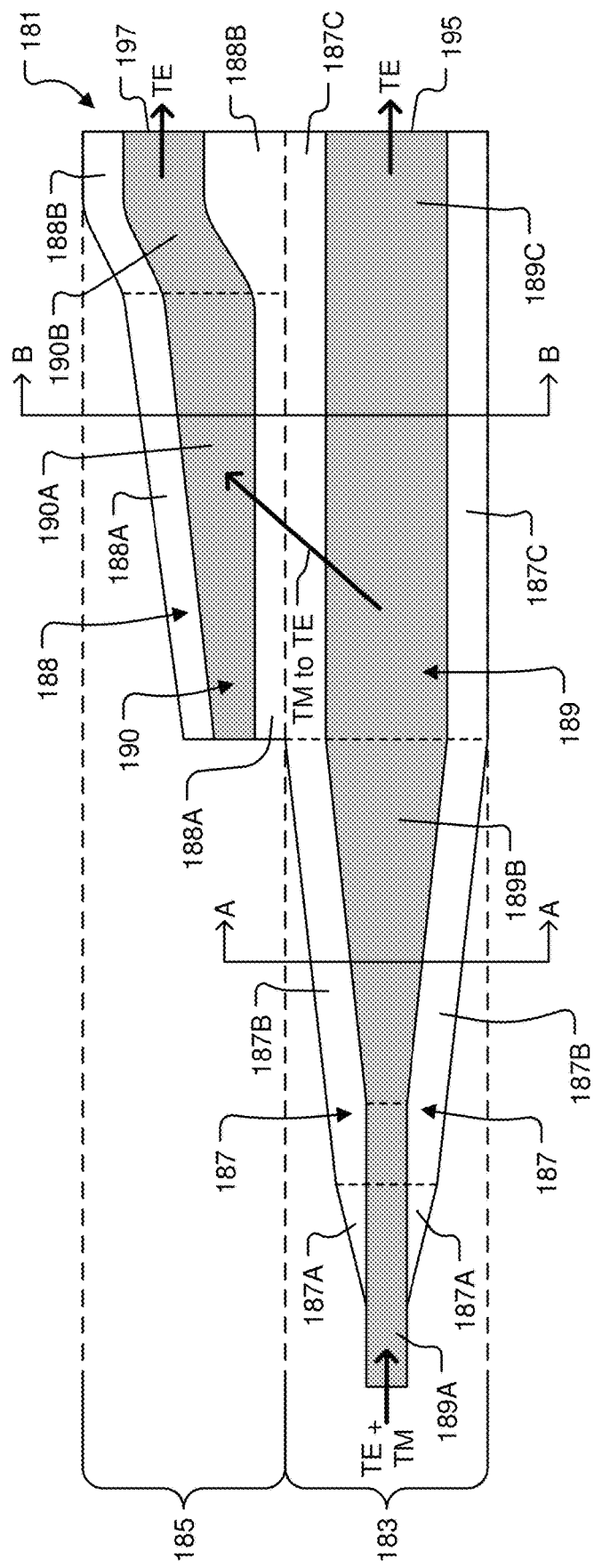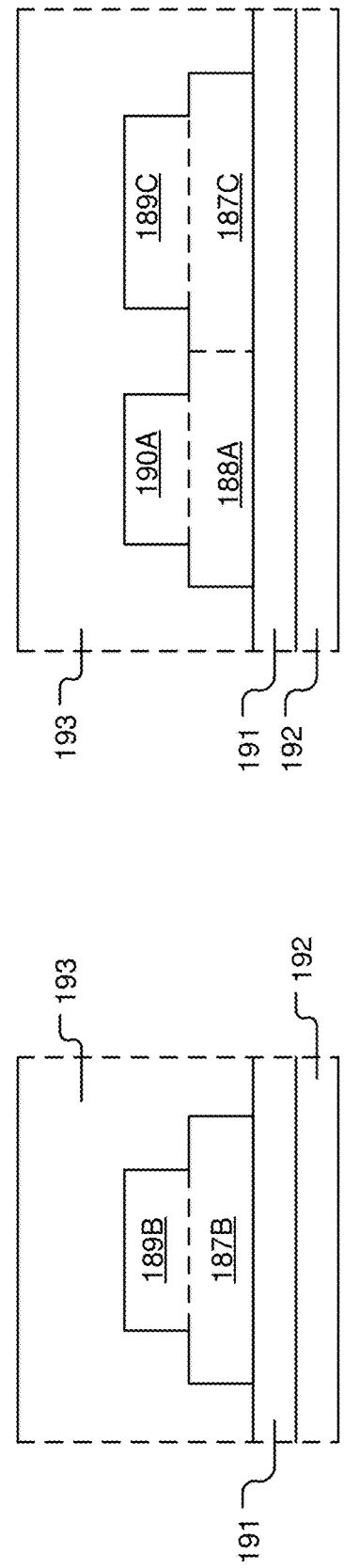

ELECTRO-OPTIC COMBINER AND ASSOCIATED METHODS

CLAIM OF PRIORITY

This application is a continuation application under 35 U.S.C. 120 of prior U.S. application Ser. No. 17/353,789, filed Jun. 21, 2021, which claims priority under 35 U.S.C. 119(e) to U.S. Provisional Patent Application No. 63/043,774, filed on Jun. 24, 2020. The disclosure of each above-identified patent application is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient devices for modulating optical signals and for receiving optical signals. It is within this context that the present invention arises.

SUMMARY

In an example embodiment, an electro-optic receiver is disclosed. The electro-optic receiver includes a polarization splitter and rotator that has an optical input optically connected to receive incoming light. The polarization splitter and rotator has a first optical output and a second optical output. The polarization splitter and rotator is configured to direct a first portion of the incoming light having a first polarization through the first optical output. The polarization splitter and rotator is configured to rotate a polarization of a second portion of the incoming light from a second polarization to the first polarization so that the second portion of the incoming light is a polarization-rotated second portion of the incoming light. The polarization splitter and rotator is configured to direct the polarization-rotated second portion of the incoming light through the second optical output. The electro-optic receiver also includes an optical waveguide having a first end optically to the first optical output of the polarization splitter and rotator. The optical waveguide has a second end optically connected to the second optical output of the polarization splitter and rotator, such that the first portion of the incoming light travels from the first optical output of the polarization splitter and rotator through the optical waveguide in a first direction, and such that the polarization-rotated second portion of the incoming light travels from the second optical output of the polarization splitter and rotator through the optical waveguide in a second direction opposite the first direction. The electro-optic receiver also includes a plurality of ring resonator photodetectors positioned alongside the optical waveguide and within an evanescent optical coupling distance of the optical waveguide. Each of the plurality of ring resonator photodetectors is configured to operate at a respective resonant wavelength, such that the first portion of the incoming light having a wavelength substantially equal to the respective resonant wavelength of a given one of the plurality of ring resonator photodetectors optically couples into the given one of the plurality of ring resonator photodetectors in a first propagation direction, and such that the polarization-rotated second portion of the incoming light having a wavelength substantially equal to the respective resonant wavelength of the given one of the plurality of ring resonator photodetectors optically couples into the given one of the plurality of ring resonator photodetectors in a second propagation direction opposite the first propagation direction.

In an example embodiment, an electro-optic receiver is disclosed. The electro-optic receiver includes a polarization splitter and rotator that has an optical input optically connected to receive incoming light. The polarization splitter and rotator has a first optical output and a second optical output. The polarization splitter and rotator is configured to direct a first portion of the incoming light having a first polarization through the first optical output. The polarization splitter and rotator is configured to rotate a polarization of a second portion of the incoming light from a second polarization to the first polarization so that the second portion of the incoming light is a polarization-rotated second portion of the incoming light. The polarization splitter and rotator is configured to direct the polarization-rotated second portion of the incoming light through the second optical output. The electro-optic receiver also includes an optical waveguide that has a first end optically to the first optical output of the polarization splitter and rotator. The optical waveguide has a second end optically connected to the second optical output of the polarization splitter and rotator, such that the first portion of the incoming light travels from the first optical output of the polarization splitter and rotator through the optical waveguide in a first direction, and such that the polarization-rotated second portion of the incoming light travels from the second optical output of the polarization splitter and rotator through the optical waveguide in a second direction opposite the first direction. The electro-optic receiver also includes a plurality of ring resonators positioned alongside the optical waveguide and within an evanescent optical coupling distance of the optical waveguide. Each of the plurality of ring resonators is configured to operate at a respective resonant wavelength, such that the first portion of the incoming light having a wavelength substantially equal to the respective resonant wavelength of a given one of the plurality of ring resonators optically couples into the given one of the plurality of ring resonators in a first propagation direction, and such that the polarization-rotated second portion of the incoming light having a wavelength substantially equal to the respective resonant wavelength of the given one of the plurality of ring resonators optically couples into the given one of the plurality of ring resonators in a second propagation direction opposite the first propagation direction. The electro-optic receiver also includes a plurality of photodetectors respectively associated with the plurality of ring resonators. The electro-optic receiver also includes a plurality of output optical waveguides respectively optically coupled to the plurality of ring resonators. Each of the plurality of output optical waveguides includes a coupling section, a short section, and a long section. The coupling section is positioned to evanescently couple light from a corresponding one of the plurality of ring resonators. The short section extends from a first end of the coupling section to a corresponding one of the plurality of photodetectors. The long section extends from a second end of the coupling section to the corresponding one of the plurality of photodetectors.

In an example embodiment, a method is disclosed for operating a photonic integrated circuit. The method includes receiving incoming light through an optical input port. A first portion of the incoming light has a first polarization, and a second portion of the incoming light has a second polarization. The method also includes splitting the first portion of the incoming light from the second portion of the incoming light. The method also includes directing the first portion of the incoming light through a first end of an optical waveguide. The method also includes rotating the second polarization of the second portion of the incoming light to the first polarization so that the second portion of the incoming light is a polarization-rotated second portion of the incoming light. The method also includes directing the polarization-rotated second portion of the incoming light through a second end of the optical waveguide. The optical waveguide extends in a continuous manner from the first end to the second end. The method also includes operating a plurality of ring resonators to evanescently in-couple light from the optical waveguide. Each of the plurality of ring resonators is operated at a respective resonant wavelength to in-couple both the first portion of the incoming light having the respective resonant wavelength and the polarization-rotated second portion of the incoming light having the respective resonant wavelength.

In an example embodiment, an electro-optic receiver is disclosed. The electro-optic receiver includes a polarization splitter and rotator that has an optical input optically connected to receive incoming light. The polarization splitter and rotator has a first optical output and a second optical output. The polarization splitter and rotator is configured to direct a first portion of the incoming light having a first polarization through the first optical output. The polarization splitter and rotator is configured to rotate a polarization of a second portion of the incoming light from a second polarization to the first polarization so that the second portion of the incoming light is a polarization-rotated second portion of the incoming light. The polarization splitter and rotator is configured to direct the polarization-rotated second portion of the incoming light through the second optical output. The electro-optic receiver also includes a first optical waveguide optically connected to the first optical output of the polarization splitter and rotator. The electro-optic receiver also includes a first plurality of ring resonators positioned within an evanescent optical coupling distance of the first optical waveguide. Each of the first plurality of ring resonators is configured to operate at a respective resonant wavelength, such that the first portion of the incoming light having a wavelength substantially equal to the respective resonant wavelength of a given one of the first plurality of ring resonators optically couples into the given one of the first plurality of ring resonators. The electro-optic receiver also includes a first plurality of output optical waveguides respectively positioned within an evanescent optical coupling distance of the first plurality of ring resonators. The electro-optic receiver also includes a second optical waveguide optically connected to the second optical output of the polarization splitter and rotator. The electro-optic receiver also includes a second plurality of ring resonators positioned within an evanescent optical coupling distance of the second optical waveguide. Each of the second plurality of ring resonators is configured to operate at a respective resonant wavelength, such that the polarization-rotated second portion of the incoming light having a wavelength substantially equal to the respective resonant wavelength of a given one of the second plurality of ring resonators optically couples into the given one of the second plurality of ring resonators. The electro-optic receiver also includes a second plurality of output optical waveguides respectively positioned within an evanescent optical coupling distance of the second plurality of ring resonators. The electro-optic receiver also includes a plurality of photodetectors. Each of the plurality of photodetectors is optically connected to receive light from a respective one of the first plurality of output optical waveguides and from a respective one of the second plurality of output optical waveguides, where the respective one of the first plurality of output optical waveguides is optically coupled to one of the first plurality of ring resonators having a given resonant wavelength, and where the respective one of the second plurality of output optical waveguides is optically coupled to one of the second plurality of ring resonators having substantially the same given resonant wavelength.

In an example embodiment, a method is disclosed for operating a photonic integrated circuit. The method includes receiving incoming light through an optical input port. A first portion of the incoming light has a first polarization, and a second portion of the incoming light has a second polarization. The method also includes splitting the first portion of the incoming light from the second portion of the incoming light. The method also includes directing the first portion of the incoming light into a first optical waveguide. The method also includes rotating the second polarization of the second portion of the incoming light to the first polarization so that the second portion of the incoming light is a polarization-rotated second portion of the incoming light. The method also includes directing the polarization-rotated second portion of the incoming light into a second optical waveguide. The method also includes operating a first plurality of ring resonators to evanescently in-couple light from the first optical waveguide. Each of the first plurality of ring resonators is operated at a respective resonant wavelength to in-couple light having the respective resonant wavelength from the first optical waveguide. The method also includes optically coupling light from the first plurality of ring resonators into respective ones of a first plurality of output optical waveguides. The method also includes directing light within the first plurality of output optical waveguides into respective ones of a plurality of photodetectors. The method also includes operating a second plurality of ring resonators to evanescently in-couple light from the second optical waveguide. Each of the second plurality of ring resonators is operated at a respective resonant wavelength to in-couple light having the respective resonant wavelength from the second optical waveguide. The method also includes optically coupling light from the second plurality of ring resonators into respective ones of a second plurality of output optical waveguides. The method also includes directing light within the second plurality of output optical waveguides into respective ones of the plurality of photodetectors.

In an example embodiment, an electro-optic receiver is disclosed. The electro-optic receiver includes a polarization splitter and rotator that has an optical input optically connected to receive incoming light. The polarization splitter and rotator has a first optical output and a second optical output. The polarization splitter and rotator is configured to direct a first portion of the incoming light having a first polarization through the first optical output. The polarization splitter and rotator is configured to rotate a polarization of a second portion of the incoming light from a second polarization to the first polarization so that the second portion of the incoming light is a polarization-rotated second portion of the incoming light. The polarization splitter and rotator is configured to direct a polarization-rotated second portion of the incoming light through the second optical output. The electro-optic receiver also includes a first optical waveguide that has a first end and second end. The first end of the first optical waveguide is optically connected to the first optical output of the polarization splitter and rotator. The electro-optic receiver also includes a second optical waveguide that has a first end and second end. The first end of the second optical waveguide is optically connected to the second optical output of the polarization splitter and rotator. The electro-optic receiver also includes a two-by-two optical splitter that has a first optical input optically connected to the second end of the first optical waveguide. The two-by-two optical splitter has a second optical input optically connected to the second end of the second optical waveguide. The two-by-two optical splitter has a first optical output and a second optical output. The two-by-two optical splitter is configured to output some of the first portion of the incoming light and some of the polarization-rotated second portion of the incoming light through each of the first optical output and the second optical output of the two-by-two optical splitter. The electro-optic receiver also includes a third optical waveguide optically connected to the first optical output of the two-by-two optical splitter. The electro-optic receiver also includes a first plurality of ring resonators positioned within an evanescent optical coupling distance of the third optical waveguide. Each of the first plurality of ring resonators is configured to operate at a respective resonant wavelength, such that light having a wavelength substantially equal to the respective resonant wavelength of a given one of the first plurality of ring resonators optically couples from the third optical waveguide into the given one of the first plurality of ring resonators. The electro-optic receiver also includes a first plurality of output optical waveguides respectively positioned within an evanescent optical coupling distance of the first plurality of ring resonators. The electro-optic receiver also includes a fourth optical waveguide optically connected to the second optical output of the two-by-two optical splitter. The electro-optic receiver also includes a second plurality of ring resonators positioned within an evanescent optical coupling distance of the fourth optical waveguide. Each of the second plurality of ring resonators is configured to operate at a respective resonant wavelength, such that light having a wavelength substantially equal to the respective resonant wavelength of a given one of the second plurality of ring resonators optically couples from the fourth optical waveguide into the given one of the second plurality of ring resonators. The electro-optic receiver also includes a second plurality of output optical waveguides respectively positioned within an evanescent optical coupling distance of the second plurality of ring resonators. The electro-optic receiver also includes a plurality of photodetectors. Each of the plurality of photodetectors is optically connected to receive light from a respective one of the first plurality of output optical waveguides and from a respective one of the second plurality of output optical waveguides, where the respective one of the first plurality of output optical waveguides is optically coupled to one of the first plurality of ring resonators having a given resonant wavelength, and wherein the respective one of the second plurality of output optical waveguides is optically coupled to one of the second plurality of ring resonators having the same given resonant wavelength.

In an example embodiment, a method is disclosed for operating a photonic integrated circuit. The method includes receiving incoming light through an optical input port. A first portion of the incoming light has a first polarization, and a second portion of the incoming light has a second polarization. The method also includes splitting the first portion of the incoming light from the second portion of the incoming light. The method also includes directing the first portion of the incoming light through a first optical waveguide and into a first optical input of a two-by-two splitter. The method also includes rotating the second polarization of the second portion of the incoming light to the first polarization so that the second portion of the incoming light is a polarization-rotated second portion of the incoming light. The method also includes directing the polarization-rotated second portion of the incoming light through a second optical waveguide and into a second optical input of the two-by-two splitter. The method also includes directing some of the first portion of the incoming light through a first optical output of the two-by-two optical splitter and into a third optical waveguide. The method also includes directing some of the first portion of the incoming light through a second optical output of the two-by-two optical splitter and into a fourth optical waveguide. The method also includes directing some of the polarization-rotated second portion of the incoming light through the first optical output of the two-by-two optical splitter and into the third optical waveguide. The method also includes directing some of the polarization-rotated second portion of the incoming light through the second optical output of the two-by-two optical splitter and into the fourth optical waveguide. The method also includes operating a first plurality of ring resonators to evanescently in-couple light from the third optical waveguide. Each of the first plurality of ring resonators is operated at a respective resonant wavelength to in-couple light having the respective resonant wavelength from the third optical waveguide. The method also includes optically coupling light from the first plurality of ring resonators into respective ones of a first plurality of output optical waveguides. The method also includes directing light within the first plurality of output optical waveguides into respective ones of a plurality of photodetectors. The method also includes operating a second plurality of ring resonators to evanescently in-couple light from the fourth optical waveguide. Each of the second plurality of ring resonators is operated at a respective resonant wavelength to in-couple light having the respective resonant wavelength from the fourth optical waveguide. The method also includes optically coupling light from the second plurality of ring resonators into respective ones of a second plurality of output optical waveguides. The method also includes directing light within the second plurality of output optical waveguides into respective ones of the plurality of photodetectors.

In an example embodiment, an optical input polarization management device is disclosed. The optical input polarization management device includes a polarization splitter and rotator that has an optical input optically connected to receive incoming light. The polarization splitter and rotator has a first optical output and a second optical output. The polarization splitter and rotator is configured to direct a first portion of the incoming light that has a first polarization through the first optical output. The polarization splitter and rotator is configured to rotate a polarization of a second portion of the incoming light from a second polarization to the first polarization so that the second portion of the incoming light is a polarization-rotated second portion of the incoming light. The polarization splitter and rotator is configured to direct the polarization-rotated second portion of the incoming light through the second optical output. The optical input polarization management device also includes a first optical waveguide that has a first end and second end. The first end of the first optical waveguide is optically connected to the first optical output of the polarization splitter and rotator. The optical input polarization management device also includes a second optical waveguide that has a first end and second end. The first end of the second optical waveguide is optically connected to the second optical output of the polarization splitter and rotator. The optical input polarization management device also includes a first phase shifter interfaced with either the first optical waveguide or the second optical waveguide. The optical input polarization management device also includes a first two-by-two optical splitter that has a first optical input optically connected to the second end of the first optical waveguide. The first two-by-two optical splitter has a second optical input optically connected to the second end of the second optical waveguide. The first two-by-two optical splitter has a first optical output and a second optical output. The optical input polarization management device also includes a third optical waveguide that has a first end and second end. The first end of the third optical waveguide is optically connected to the first optical output of the first two-by-two optical splitter. The optical input polarization management device also includes a fourth optical waveguide that has a first end and second end. The first end of the fourth optical waveguide is optically connected to the second optical output of the first two-by-two optical splitter. The optical input polarization management device also includes a second two-by-two optical splitter that has a first optical input optically connected to the second end of the third optical waveguide. The second two-by-two optical splitter has a second optical input optically connected to the second end of the fourth optical waveguide. The second two-by-two optical splitter has a first optical output and a second optical output. The optical input polarization management device also includes a second phase shifter interfaced with either the third optical waveguide or the fourth optical waveguide. The optical input polarization management device also includes a fifth optical waveguide optically connected to either the first optical output of the second two-by-two optical splitter or the second optical output of the second two-by-two optical splitter.

In an example embodiment, a method is disclosed for optical input polarization management. The method includes receiving incoming light through an optical input port. A first portion of the incoming light has a first polarization, and a second portion of the incoming light has a second polarization. The method also includes splitting the first portion of the incoming light from the second portion of the incoming light. The method also includes directing the first portion of the incoming light through a first optical waveguide and into a first optical input of a first two-by-two splitter. The method also includes rotating the second polarization of the second portion of the incoming light to the first polarization so that the second portion of the incoming light is a polarization-rotated second portion of the incoming light. The method also includes directing the polarization-rotated second portion of the incoming light through a second optical waveguide and into a second optical input of the first two-by-two splitter. The method also includes operating a first phase shifter interfaced with either the first optical waveguide or the second optical waveguide to apply a controlled amount of shift to a phase of light traveling through either the first optical waveguide or the second optical waveguide to which the phase shifter is interfaced. The method also includes directing some of the first portion of the incoming light through a first optical output of the first two-by-two optical splitter and into a third optical waveguide. The method also includes directing some of the first portion of the incoming light through a second optical output of the first two-by-two optical splitter and into a fourth optical waveguide. The method also includes directing some of the polarization-rotated second portion of the incoming light through the first optical output of the first two-by-two optical splitter and into the third optical waveguide. The method also includes directing some of the polarization-rotated second portion of the incoming light through the second optical output of the first two-by-two optical splitter and into the fourth optical waveguide. The method also includes operating a second phase shifter interfaced with either the third optical waveguide or the fourth optical waveguide to apply a controlled amount of shift to a phase of light traveling through either the third optical waveguide or the fourth optical waveguide to which the phase shifter is interfaced. The method also includes directing said some of the first portion of the incoming light and said some of the polarization-rotated second portion of the incoming light from the third optical waveguide into a first optical input of a second two-by-two splitter. The method also includes directing said some of the first portion of the incoming light and said some of the polarization-rotated second portion of the incoming light from the fourth optical waveguide into a second optical input of the second two-by-two splitter. The method also includes directing part of said some of the first portion of the incoming light and part of said some of the polarization-rotated second portion of the incoming light through an optical output of the second two-by-two splitter and into a fifth optical waveguide.

In an example embodiment, an electro-optic transmitter is disclosed. The electro-optic transmitter includes a plurality of optical input ports. The electro-optic transmitter also includes a plurality of polarization controllers. Each of the plurality of polarization controllers has an optical input optically connected to a respective one of the plurality of optical input ports. Each of the plurality of polarization controllers is configured to convert two polarizations of incoming light as received through the respective one of the plurality of optical input ports into light having a single polarization, and output the light having the single polarization through an output optical waveguide of the polarization controller. The electro-optic transmitter also includes an optical multiplexer that has a plurality of optical inputs respectively optically connected to the output optical waveguides of the plurality of polarization controllers. The optical multiplexer has a plurality of optical outputs. The electro-optic transmitter also includes a plurality of optical waveguides. Each of the plurality of optical waveguides has a first end and second end. The first end of each of the plurality of optical waveguides is respectively optically connected to the plurality of optical outputs of the optical multiplexer. The electro-optic transmitter also includes a plurality of ring resonator modulators positioned along each of the plurality of optical waveguides. The electro-optic transmitter also includes a plurality of optical output ports. The second end of each of the plurality of optical waveguides is respectively optically connected to the plurality of optical output ports.

In an example embodiment, a method is disclosed for operating an electro-optic transmitter. The method includes receiving incoming light through a plurality of optical input ports. The method also includes operating a plurality of polarization controllers. Each of the plurality of polarization controllers has an optical input respectively optically connected to the plurality of optical input ports. Each of the plurality of polarization controllers is operated to convert light having two polarizations as received through a corresponding one of the plurality of optical input ports into light having a single polarization. Each of the plurality of polarization controllers is operated to direct the light having the single polarization through an output optical waveguide of the polarization controller. The method also includes operating an optical multiplexer that has a plurality of optical inputs respectively optically connected to the output optical waveguides of the plurality of polarization controllers. The optical multiplexer has a plurality of optical outputs. The optical multiplexer is operated to direct a portion of light received at each of the plurality of optical inputs of the optical multiplexer to each of the plurality of optical outputs of the optical multiplexer. The method also includes directing light from each of the plurality of optical outputs of the optical multiplexer through respective ones of a plurality of optical waveguides. Each of the plurality of optical waveguides has a first end and second end. The first end of each of the plurality of optical waveguides is respectively optically connected to the plurality of optical outputs of the optical multiplexer. The second end of each of the plurality of optical waveguides is respectively optically connected to a plurality of optical output ports. The method also includes operating a plurality of ring resonator modulators positioned along a given one of the plurality of optical waveguides to modulate light with the given one of the plurality of optical waveguides in accordance with a digital bit pattern.

In an example embodiment, an electro-optic transmitter is disclosed. The electro-optic transmitter includes a first polarization splitter and rotator having an optical input optically connected to receive incoming light. The first polarization splitter and rotator has a first optical output and a second optical output. The first polarization splitter and rotator is configured to direct a first portion of the incoming light having a first polarization through the first optical output. The first polarization splitter and rotator is configured to rotate a polarization of a second portion of the incoming light from a second polarization to the first polarization so that the second portion of the incoming light is a polarization-rotated second portion of the incoming light. The first polarization splitter and rotator is configured to direct the polarization-rotated second portion of the incoming light through the second optical output. The electro-optic transmitter also includes a first optical waveguide that has a first end and a second end. The first end of the first optical waveguide is optically connected to the first optical output of the first polarization splitter and rotator. The electro-optic transmitter also includes a second optical waveguide that has a first end and a second end. The first end of the second optical waveguide is optically connected to the second optical output of the first polarization splitter and rotator. The electro-optic transmitter also includes a second polarization splitter and rotator that has a first reverse-connected optical output optically connected to the second end of the first optical waveguide. The second polarization splitter and rotator has a second reverse-connected optical output optically connected to the second end of the second optical waveguide. The second polarization splitter and rotator has a reverse-connected optical input. The second polarization splitter and rotator is connected in a reversed manner with respect to light propagation through the second polarization splitter and rotator. The second polarization splitter and rotator is connected to direct light having the first polarization as received from the first optical waveguide through the first reverse-connected optical output to the reverse-connected optical input of the second polarization splitter and rotator. The second polarization splitter and rotator is configured to derotate a polarization of the polarization-rotated second portion of the incoming light as received from the second optical waveguide through the second reverse-connected optical output from the first polarization back to the second polarization, so as to produce a polarization-derotated second portion of the incoming light. The polarization splitter and rotator is configured to direct the polarization-derotated second portion of the incoming light to the reverse-connected optical input of the second polarization splitter and rotator. The electro-optic transmitter also includes a plurality of ring resonator modulator pairs positioned along the first optical waveguide and the second optical waveguide. Each ring resonator modulator pair of the plurality of ring resonator modulator pairs includes one ring resonator modulator positioned within an evanescent optical coupling distance of the first optical waveguide and one ring resonator modulator positioned within an evanescent optical coupling distance of the second optical waveguide.

In an example embodiment, a method is disclosed for optical modulation. The method includes receiving incoming light through an optical input port. A first portion of the incoming light has a first polarization, and a second portion of the incoming light has a second polarization. The method also includes splitting the first portion of the incoming light from the second portion of the incoming light. The method also includes directing the first portion of the incoming light through a first optical waveguide. The method also includes rotating the second polarization of the second portion of the incoming light to the first polarization so that the second portion of the incoming light is a polarization-rotated second portion of the incoming light. The method also includes directing the polarization-rotated second portion of the incoming light through a second optical waveguide. The method also includes operating a plurality of ring resonator modulator pairs positioned along the first optical waveguide and the second optical waveguide. Each ring resonator modulator pair of the plurality of ring resonator modulator pairs includes one ring resonator modulator positioned within an evanescent optical coupling distance of the first optical waveguide and one ring resonator modulator positioned within an evanescent optical coupling distance of the second optical waveguide. Each of the plurality of ring resonator modulator pairs is configured to operate at a specified resonant wavelength to modulate a same bit pattern onto light traveling through the first and second optical waveguides to create a first portion of modulated light having the first polarization within the first optical waveguide and to create a second portion of modulated light having the first polarization within the second optical waveguide. The method also includes rotating a polarization of the second portion of modulated light within the second optical waveguide back from the first polarization to the second polarization. The method also includes directing both the first portion of modulated light having the first polarization and the second portion of modulated light having the second polarization through a same optical output port.

In an example embodiment, an electro-optic transmitter is disclosed. The electro-optic transmitter includes a first polarization splitter and rotator that has an optical input optically connected to receive incoming light. The first polarization splitter and rotator has a first optical output and a second optical output. The first polarization splitter and rotator is configured to direct a first portion of the incoming light that has a first polarization through the first optical output. The first polarization splitter and rotator is configured to rotate a polarization of a second portion of the incoming light from a second polarization to the first polarization so that the second portion of the incoming light is a polarization-rotated second portion of the incoming light. The first polarization splitter and rotator is configured to direct the polarization-rotated second portion of the incoming light through the second optical output. The electro-optic transmitter also includes a first optical waveguide that has a first end and second end. The first end of the first optical waveguide is optically connected to the first optical output of the first polarization splitter and rotator. The electro-optic transmitter also includes a second optical waveguide that has a first end and second end. The first end of the second optical waveguide is optically connected to the second optical output of the first polarization splitter and rotator. The electro-optic transmitter also includes a two-by-two optical splitter that has a first optical input optically connected to the second end of the first optical waveguide. The two-by-two optical splitter has a second optical input optically connected to the second end of the second optical waveguide. The two-by-two optical splitter has a first optical output and a second optical output. The two-by-two optical splitter is configured to output some of the first portion of the incoming light and some of the polarization-rotated second portion of the incoming light through each of the first optical output and the second optical output of the two-by-two optical splitter. The electro-optic transmitter also includes a third optical waveguide that has a first end and second end. The first end of the third optical waveguide is optically connected to the first optical output of the two-by-two optical splitter. The electro-optic transmitter also includes a fourth optical waveguide that has a first end and second end. The first end of the fourth optical waveguide is optically connected to the second optical output of the two-by-two optical splitter. The electro-optic transmitter also includes a second polarization splitter and rotator that has a first reverse-connected optical output optically connected to the second end of the third optical waveguide. The second polarization splitter and rotator has a second reverse-connected optical output optically connected to the second end of the fourth optical waveguide. The second polarization splitter and rotator has a reverse-connected optical input. The second polarization splitter and rotator is connected in a reversed manner with respect to light propagation through the second polarization splitter and rotator. The second polarization splitter and rotator is connected to direct light received through the first reverse-connected optical output of the second polarization splitter and rotator to the reverse-connected optical input of the second polarization splitter and rotator. The second polarization splitter and rotator is configured to derotate a polarization of light received through the second reverse-connected optical output of the second polarization splitter and rotator from the first polarization the second polarization so as to produce polarization-derotated light. The polarization splitter and rotator is configured to direct the polarization-derotated light to the reverse-connected optical input of the second polarization splitter and rotator. The electro-optic transmitter also includes a plurality of ring resonator modulator pairs positioned along the third optical waveguide and the fourth optical waveguide. Each ring resonator modulator pair of the plurality of ring resonator modulator pairs includes one ring resonator modulator positioned within an evanescent optical coupling distance of the third optical waveguide and one ring resonator modulator positioned within an evanescent optical coupling distance of the fourth optical waveguide.

In an example embodiment, a method is disclosed for optical modulation. The method includes receiving incoming light through an optical input port. A first portion of the incoming light has a first polarization, and a second portion of the incoming light has a second polarization. The method also includes splitting the first portion of the incoming light from the second portion of the incoming light. The method also includes directing the first portion of the incoming light through a first optical waveguide and into a first optical input of a two-by-two splitter. The method also includes rotating the second polarization of the second portion of the incoming light to the first polarization so that the second portion of the incoming light is a polarization-rotated second portion of the incoming light. The method also includes directing the polarization-rotated second portion of the incoming light through a second optical waveguide and into a second optical input of the two-by-two splitter. The method also includes directing some of the first portion of the incoming light through a first optical output of the two-by-two optical splitter and into a third optical waveguide. The method also includes directing some of the first portion of the incoming light through a second optical output of the two-by-two optical splitter and into a fourth optical waveguide. The method also includes directing some of the polarization-rotated second portion of the incoming light through the first optical output of the two-by-two optical splitter and into the third optical waveguide. The method also includes directing some of the polarization-rotated second portion of the incoming light through the second optical output of the two-by-two optical splitter and into the fourth optical waveguide. The method also includes operating a plurality of ring resonator modulator pairs positioned along the third optical waveguide and the fourth optical waveguide. Each ring resonator modulator pair of the plurality of ring resonator modulator pairs includes one ring resonator modulator positioned within an evanescent optical coupling distance of the third optical waveguide and one ring resonator modulator positioned within an evanescent optical coupling distance of the fourth optical waveguide. Each of the plurality of ring resonator modulator pairs is configured to operate at a specified resonant wavelength to modulate a same bit pattern onto light traveling through the third optical waveguide and the fourth optical waveguide. The method also includes rotating a polarization of modulated light within either the third optical waveguide or the fourth optical waveguide from the first polarization to the second polarization. The method also includes directing both modulated light that has the first polarization and modulated light that has the second polarization through a same optical output port.

In an example embodiment, an electro-optic combiner is disclosed. The electro-optic combiner includes a polarization splitter and rotator that has an optical input optically connected to receive incoming light. The polarization splitter and rotator has a first optical output and a second optical output. The polarization splitter and rotator is configured to direct a first portion of the incoming light that has a first polarization through the first optical output. The polarization splitter and rotator is configured to rotate a polarization of a second portion of the incoming light from a second polarization to the first polarization so that the second portion of the incoming light is a polarization-rotated second portion of the incoming light. The polarization splitter and rotator is configured to direct the polarization-rotated second portion of the incoming light through the second optical output. The electro-optic combiner also includes a first optical waveguide that has a first end and a second end. The first end of the first optical waveguide is optically connected to the first optical output of the polarization splitter and rotator. The electro-optic combiner also includes a second optical waveguide that has a first end and a second end. The first end of the second optical waveguide is optically connected to the second optical output of the polarization splitter and rotator. The electro-optic combiner also includes a plurality of ring resonators disposed between a combiner section of the first optical waveguide and a combiner section of the second optical waveguide. Each of the plurality of ring resonators is positioned within an evanescent optically coupling distance of both the first optical waveguide and the second optical waveguide. A light propagation direction through the combiner section of the first optical waveguide is opposite of a light propagation direction through the combiner section of the second optical waveguide. Each of the plurality of ring resonators is configured to operate at a respective resonant wavelength, such that light having a wavelength substantially equal to the respective resonant wavelength of a given one of the plurality of ring resonators optically couples light from the combiner section of the first optical waveguide into the given one of the plurality of ring resonators, and from the given one of the plurality of ring resonators into the second optical waveguide.

In an example embodiment, a method is disclosed for combination of optical signals. The method includes receiving incoming light through an optical input port. A first portion of the incoming light has a first polarization, and a second portion of the incoming light has a second polarization. The method also includes splitting the first portion of the incoming light from the second portion of the incoming light. The method also includes directing the first portion of the incoming light through a first optical waveguide. The method also includes rotating the second polarization of the second portion of the incoming light to the first polarization so that the second portion of the incoming light is a polarization-rotated second portion of the incoming light. The method also includes directing the polarization-rotated second portion of the incoming light through a second optical waveguide. The method also includes operating a plurality of ring resonators disposed between the first optical waveguide and the second optical waveguide. Each of the plurality of ring resonators is operated to evanescently in-couple light from the first optical waveguide and out-couple light into the second optical waveguide. Each of the plurality of ring resonators is configured to operate at a respective resonant wavelength, such that light having a wavelength substantially equal to the respective resonant wavelength of a given one of the plurality of ring resonators optically couples light from the first optical waveguide into the given one of the plurality of ring resonators, and from the given one of the plurality of ring resonators into the second optical waveguide.

In an example embodiment, an electro-optic combiner is disclosed. The electro-optic combiner includes a polarization splitter and rotator that has an optical input optically connected to receive incoming light. The polarization splitter and rotator has a first optical output and a second optical output. The polarization splitter and rotator is configured to direct a first portion of the incoming light that has a first polarization through the first optical output. The polarization splitter and rotator is configured to rotate a polarization of a second portion of the incoming light from a second polarization to the first polarization so that the second portion of the incoming light is a polarization-rotated second portion of the incoming light. The polarization splitter and rotator is configured to direct the polarization-rotated second portion of the incoming light through the second optical output. The electro-optic combiner also includes a first optical waveguide optically connected to the first optical output of the polarization splitter and rotator. The electro-optic combiner also includes a first plurality of ring resonators positioned along the first optical waveguide, such that the phase shifter is positioned alongside the first optical waveguide before the first plurality of ring resonators relative to a direction of light propagation through the first optical waveguide. Each of the first plurality of ring resonators is positioned within an evanescent optical coupling distance of the first optical waveguide. The electro-optic combiner also includes a second optical waveguide optically connected to the second optical output of the polarization splitter and rotator. The electro-optic combiner also includes a second plurality of ring resonators positioned along the second optical waveguide and within an evanescent optical coupling distance of the second optical waveguide. Each of the second plurality of ring resonators is positioned to optically in-couple light from a respective one of the first plurality of ring resonators and optically out-couple light into the second optical waveguide.

In an example embodiment, a method is disclosed for combination of optical signals. The method includes receiving incoming light through an optical input port. A first portion of the incoming light has a first polarization, and a second portion of the incoming light has a second polarization. The method also includes splitting the first portion of the incoming light from the second portion of the incoming light. The method also includes directing the first portion of the incoming light through a first optical waveguide. The method also includes rotating the second polarization of the second portion of the incoming light to the first polarization so that the second portion of the incoming light is a polarization-rotated second portion of the incoming light. The method also includes directing the polarization-rotated second portion of the incoming light through a second optical waveguide. The method also includes operating a first plurality of ring resonators disposed between the first optical waveguide and the second optical waveguide. Each of the first plurality of ring resonators is operated to evanescently in-couple light from the first optical waveguide. The method also includes operating a second plurality of ring resonators disposed between the first optical waveguide and the second optical waveguide. Each of the second plurality of ring resonators is operated to evanescently in-couple light from a respective one of the first plurality of ring resonators. Each of the second plurality of ring resonators is operated to evanescently out-couple light to the second optical waveguide. Each optically coupled pair of ring resonators within the first and second pluralities of ring resonators is operated at a substantially same resonant wavelength. Each optically coupled pair of ring resonators within the first and second pluralities of ring resonators has opposite light propagation directions.

In an example embodiment, an electro-optic combiner is disclosed. The electro-optic combiner includes a polarization splitter and rotator that has an optical input optically connected to receive incoming light. The polarization splitter and rotator has a first optical output and a second optical output. The polarization splitter and rotator is configured to direct a first portion of the incoming light that has a first polarization through the first optical output. The polarization splitter and rotator configured to rotate a polarization of a second portion of the incoming light from a second polarization to the first polarization so that the second portion of the incoming light is a polarization-rotated second portion of the incoming light. The polarization splitter and rotator is configured to direct the polarization-rotated second portion of the incoming light through the second optical output. The electro-optic combiner also includes a first optical waveguide optically connected to the first optical output of the polarization splitter and rotator. The electro-optic combiner also includes a first plurality of ring resonators positioned along the first optical waveguide such that the phase shifter is positioned alongside the first optical waveguide before the first plurality of ring resonators relative to a direction of light propagation through the first optical waveguide. Each of the first plurality of ring resonators is positioned within an evanescent optical coupling distance of the first optical waveguide. The electro-optic combiner also includes a second optical waveguide optically connected to the second optical output of the polarization splitter and rotator. The electro-optic combiner also includes a second plurality of ring resonators positioned along the second optical waveguide and within an evanescent optical coupling distance of the second optical waveguide. The electro-optic combiner also includes a plurality of intermediate optical waveguides. Each of the plurality of intermediate optical waveguides is positioned between a corresponding one of the first plurality of ring resonators and a corresponding one of the second plurality of ring resonators, such that light optically couples from the first optical waveguide to the corresponding one of the first plurality of ring resonators, and from the corresponding one of the first plurality of ring resonators to said intermediate optical waveguide, and from said intermediate optical waveguide to the corresponding one of the second plurality of ring resonators, and from the corresponding one of the second plurality of ring resonators to the second optical waveguide. The electro-optic combiner also includes a plurality of photodetectors respectively optically connected to the plurality of intermediate optical waveguides, such that some of the light that optically couples into a given one of the plurality of intermediate optical waveguides from the corresponding one of the first plurality of ring resonators is conveyed into one of the plurality of photodetectors that is optically connected to the given one of the plurality of intermediate optical waveguides.

In an example embodiment, a method is disclosed for combination of optical signals. The method includes receiving incoming light through an optical input port. A first portion of the incoming light has a first polarization, and a second portion of the incoming light has a second polarization. The method also includes splitting the first portion of the incoming light from the second portion of the incoming light. The method also includes directing the first portion of the incoming light through a first optical waveguide. The method also includes rotating the second polarization of the second portion of the incoming light to the first polarization so that the second portion of the incoming light is a polarization-rotated second portion of the incoming light. The method also includes directing the polarization-rotated second portion of the incoming light through a second optical waveguide. The method also includes operating a first plurality of ring resonators disposed between the first optical waveguide and the second optical waveguide. Each of the first plurality of ring resonators is operated to evanescently in-couple light from the first optical waveguide and evanescently out-couple light to a corresponding one of a plurality of intermediate optical waveguides. The method also includes operating a second plurality of ring resonators disposed between the first optical waveguide and the second optical waveguide. Each of the second plurality of ring resonators is operated to evanescently in-couple light from a corresponding one of the plurality of intermediate optical waveguides. Each of the second plurality of ring resonators is operated to evanescently out-couple light to the second optical waveguide. Each pair of ring resonators within the first and second pluralities of ring resonators that are optically coupled to a same one of the plurality of intermediate optical waveguides is operated at a substantially same resonant wavelength. Each pair of ring resonators within the first and second pluralities of ring resonators that are optically coupled to the same one of the plurality of intermediate optical waveguides has opposite light propagation directions.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 1E shows an example configuration of a PSR, in accordance with some embodiments.

FIG. 1F shows a vertical cross-section view through the example PSR, referenced as View A-A in FIG. 1E, in accordance with some embodiments.

FIG. 1G shows a vertical cross-section view through the example PSR, referenced as View B-B in FIG. 1E, in accordance with some embodiments.

DETAILED DESCRIPTION

Figure 1A:
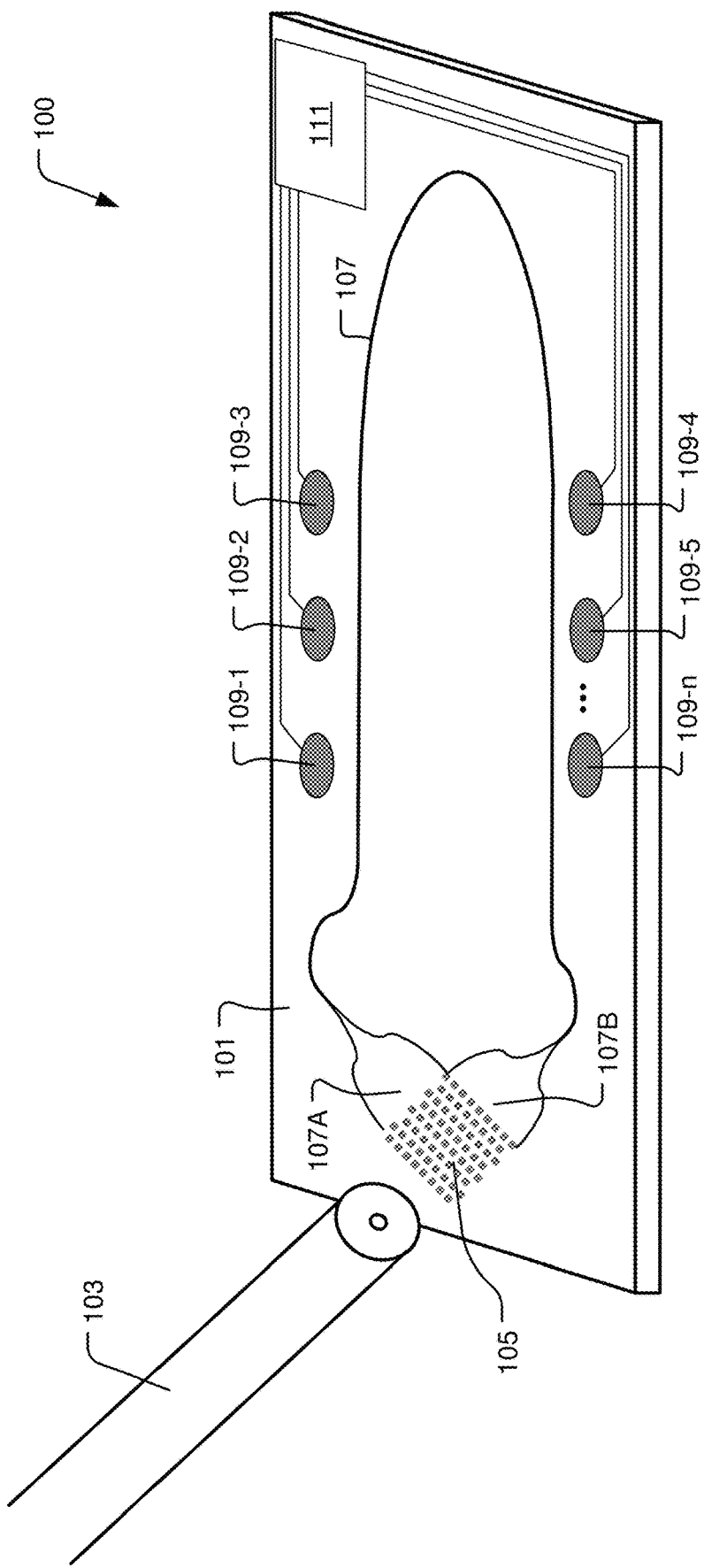
FIG. 1A shows an example configuration of an electro-optic receiver, in accordance with some embodiments.

In the following description, numerous specific details are set forth in order to provide an understanding of the disclosed embodiments. It will be apparent, however, to one skilled in the art that the present invention may be practiced without some or all of these specific details. In other instances, well known process operations have not been described in detail in order not to unnecessarily obscure the disclosed embodiments.

Optical data communication systems operate by modulating laser light to encode digital data patterns within the electrical domain as modulated light signals within the optical domain. The modulated light signals are transmitted through optical fibers to an electro-optic receiver where the modulated light signals are detected and decoded to obtain the original encoded digital data patterns back in the electrical domain. In many optical data communication systems, a polarization state of the light within the optical fiber is not controlled, and may be perturbed by small movements of the optical fiber and/or changes in ambient temperature while the system is operating. In these systems, the electro-optic receiver has to handle incoming light signals that have an arbitrary polarization that varies over time.

Electro-optic receiver systems are often built into photonic integrated circuits (PIC's), enabling compact and high-performance detection of modulated light signals received as input from optical fibers. Optical coupling of light from an optical fiber into a PIC requires an optical coupling configuration that can accept input light from either polarization (transverse electric (TE) or transverse magnetic (TM)) of an optical fiber and output it to one or more optical waveguides on the PIC, and often into a preferred polarization state. In some embodiments disclosed herein, an optical coupling configuration is provided in which incoming light is received through either a dual-polarization vertical grating coupler or an edge coupler and is conveyed into a PIC polarization splitter, which splits the incoming light from the two input optical fiber polarizations (TE and TM) and outputs the incoming light of a first polarization and a second polarization into two separate optical waveguides on the PIC, respectively. Also, in some embodiments, either the first polarization or the second polarization is rotated to the other polarization in route to the two separate optical waveguides on the PIC, such that light having the same polarization is conveyed into each of the two separate optical waveguides on the PIC. In some implementations, a significant advantage is gained by using optical devices that can efficiently detect optical signals that are split in this way based on polarization. Also, in some implementations, there are further advantages obtained by using one photodiode (such as in a photodetector) for both polarization mode components of the incoming light rather than duplicating the number of photodiodes to provide for separate detection of the two polarization mode components of the incoming light, where such further advantages include decreased complexity of the optical circuitry, reduced detector capacitance per channel, and reduced dark current, which results in increased photodiode/photodetector sensitivity.

Various embodiments are disclosed herein for an electro-optic receiver. The electro-optic receiver enables the detection of optical signals of arbitrary input polarization with a single photodetector or set of photodetectors. The electro-optic receiver includes an input optical fiber carrying incoming light (modulated light) with arbitrary (uncontrolled) polarization that conveys a signal that is decodable to a digital data pattern. The electro-optic receiver also includes an optical coupling device that transfers the incoming light from the input fiber to a PIC. The electro-optic receiver also includes a polarization beam splitter that receives an arbitrary input polarization state and splits it into two separate optical waveguides of the PIC, where each optical waveguide contains one of the orthogonal components of the input polarization state of the incoming light, possibly converted into a different polarization state. In some embodiments of the electro-optic receiver, the functionality of the polarization beam splitter is combined with the optical coupling device in the form of a dual-polarization grating coupler. In some embodiments of the electro-optic receiver, the two optical waveguides of the PIC support a single polarization mode that is well isolated in propagation constant from other spatial modes, including the other polarization state, making it operationally single-mode, single-polarization. The electro-optic receiver also includes an optical routing system in which the two optical waveguides of the PIC are routed to the same photodetector or set of photodetectors. The electro-optic receiver also includes a timing-skew management system that corrects for degradation in the signal arising from time delay mismatch between the two optical waveguides of the PIC and the photodetector or set of photodetectors.

The electro-optic receiver disclosed herein is particularly useful in applications where electro-optic receivers implemented within a PIC detect light from an input optical fiber in which the polarization is not controlled. The electro-optic receiver is especially advantageous in applications that encode multiple data channels on the input optical fiber on different wavelengths, for example using wavelength division multiplexing (WDM), and in cases where polarization-diversity WDM electro-optic receiver architectures have a timing-skew. This timing-skew may vary from one channel to the next, typically in a known way. Some existing electro-optic receivers that are capable of handling uncontrolled input polarization require two separate electro-optic receivers, one for each orthogonal polarization state, together with extensive digital signal processing to combine the signals. It should be appreciated that the electro-optic receiver embodiments disclosed herein provide a single, compact, and power-efficient electro-optic receiver to combine and detect signals from the two polarization states of any wavelength channel.

Some embodiments of the electro-optic receiver disclosed herein are particularly useful in situations in which the polarization states of the incoming light of the different wavelength channels are roughly the same from one wavelength channel to the next, and where the polarization states of the incoming light of the different wavelength channels are unknown. Some embodiments of the electro-optic receiver disclosed herein are particularly useful in situations in which the polarization state of the incoming light of a given wavelength channel is unknown, and where the polarization state of the incoming light of the given wavelength channel varies in a slow and controlled manner (such as monotonically) as compared to other wavelength channels of the incoming light. For example, these situations may occur when the WDM signal wavelength channels all originate at the same source, traverse the same optical fiber, and are received together, as is the case in a WDM point-to-point link. Some embodiments of the electro-optic receiver disclosed herein are useful in a more generalized situation in which each wavelength channel of the incoming light has a completely different unknown polarization, and where the polarization states of the different wavelength channels of the incoming light are uncorrelated. For example, these situations may occur when different WDM channels originate in different locations and may not share the same optical fiber(s) over the entire propagation path from the respective sources of the incoming light to the electro-optic receiver. The electro-optic receiver embodiments disclosed herein are configured to handle incoming light signals whose polarization state is unknown and is either static in time or dynamically changing in time. Various embodiments of the electro-optic receiver disclosed herein provide for reception of incoming light signals having unknown polarization states, even if the polarization states changes at high speeds, e.g., into the gigaHertz (GHz) regime, but more typically in the kiloHertz (kHz) (or millisecond) regime.

FIG. 1A shows an example configuration of an electro-optic receiver 100, in accordance with some embodiments. The electro-optic receiver 100 includes a PIC 101 into which incoming light is received from an optical fiber 103. The PIC includes an optical coupler 105 configured to receive the incoming light from the optical fiber 103 and direct the incoming light into an optical waveguide 107 within the PIC 101. The incoming light conveys one or more optical signals. For example, the incoming light is modulated light that optically conveys a digital bit pattern. The incoming light also does not have polarization control. Therefore, the polarization of the incoming light received from the optical fiber 103 is unknown when it enters into the optical coupler 105. In the example electro-optic receiver 100, the optical coupler 105 is a vertical grating coupler. In some embodiments, the optical coupler 105 is configured as a dual-polarization grating coupler (either as an edge grating coupler or as a vertical grating coupler) that splits the two polarizations (TE and TM) of incoming light. The dual-polarization grating coupler is configured to direct a first portion of the incoming light having a first polarization (either TE or TM) into a first end 107A of the optical waveguide 107. The dual-polarization grating coupler is also configured to rotate a polarization of a second portion of the incoming light from a second polarization that is opposite of the first polarization (e.g., the second polarization is TM, if the first polarization is TE, and vice-versa) to the first polarization so as to provide a polarization-rotated second portion of the incoming light that has the first polarization. The dual-polarization grating coupler is also configured to direct the polarization-rotated second portion of the incoming light into a second end 107B of the optical waveguide 107. The optical waveguide 107 is configured to extend in a continuous, loop-like configuration from the first end 107A to the second end 107B. In this manner, the first portion of the incoming light having the first polarization travels in a first light propagation direction through the optical waveguide 107 from the first end 107A toward the second end 107B, and the polarization-rotated second portion of the incoming light (also having the first polarization) travels in a second light propagation direction through the optical waveguide 107 from the second end 107B toward the first end 107A. Therefore, the first portion of the incoming light and the polarization-rotated second portion of the incoming light travel in opposite light propagation directions through the optical waveguide 107. In some embodiments, each of the first end 107A and the second end 107B of the optical waveguide 107 is configured as a respective tapered region of the optical waveguide 107 to facilitate optical coupling of light from the dual-polarization grating coupler into the optical waveguide 107.

The electro-optic receiver 100 also includes multiple ring resonator photodetectors 109-1 to 109-$n$, where n is an integer value greater than 1. The ring resonator photodetectors 109-1 to 109-$n$ are positioned alongside the optical waveguide 107 and within an evanescent optical coupling distance of the optical waveguide 107. Each of the ring resonator photodetectors 109-1 to 109-$n$ is configured to operate at a respective resonant wavelength. In some embodiments, the respective resonant wavelength at which any one of the ring resonator photodetectors 109-1 to 109-$n$ operates is a narrow wavelength range. For ease of description, any ring resonator disclosed herein is described as operating a respective resonant wavelength, with the understanding that the respective resonant wavelength is actually a narrow wavelength range that is distinguishable from other different resonant wavelength ranges. In this manner, each of the ring resonator photodetectors 109-1 to 109-n is configured to detect light at the respective resonant wavelength (within the narrow wavelength range about the respective resonant wavelength). In some embodiments, each of the ring resonator photodetectors 109-1 to 109-n is configured to have an annular-shape or disc-shape with an outer diameter of less than about 50 micrometers. In some embodiments, each of the ring resonator photodetectors 109-1 to 109-n is configured to have an annular-shape or disc-shape with an outer diameter of less than about 10 micrometers.

Each of the ring resonator photodetectors 109-1 to 109-n is configured to operate at a respective resonant wavelength, such that the first portion of the incoming light having a wavelength substantially equal to the respective resonant wavelength of a given one of the ring resonator photodetectors 109-x optically couples into the given one of the ring resonator photodetectors 109-x in a first propagation direction, and such that the polarization-rotated second portion of the incoming light having a wavelength substantially equal to the respective resonant wavelength of the given one of the ring resonator photodetectors 109-x also optically couples into the given one of the ring resonator photodetectors 109-x in a second propagation direction opposite the first propagation direction. For example, a particular wavelength of the first portion of the incoming light traveling from the first end 107A of the optical waveguide 107 toward the second end 107B of the optical waveguide 107 will optically couple into one or more of the ring resonator photodetectors 109-1 to 109-n operating at a resonant wavelength substantially equal to the particular wavelength, such that the particular wavelength of the first portion of the incoming light propagates in a counter-clockwise direction within the one or more ring resonator photodetectors 109-1 to 109-n into which it optically couples. Conversely, a particular wavelength of the polarization-rotated second portion of the incoming light traveling from the second end 107B of the optical waveguide 107 toward the first end 107A of the optical waveguide 107 will optically couple into one or more of the ring resonator photodetectors 109-1 to 109-n operating at a resonant wavelength substantially equal to the particular wavelength, such that the particular wavelength of the polarization-rotated portion of the incoming light propagates in a clockwise direction within the one or more ring resonator photodetectors 109-1 to 109-n into which it optically couples.

Because the first portion of the incoming light and the corresponding polarization-rotated second portion of the incoming light may not arrive at a given one of the ring resonator photodetectors 109-x at the same time, the electro-optic receiver 100 also includes a timing-skew management system 111 that is configured to identify and compensate for the temporal differences in arrival time of the first portion of the incoming light and the corresponding polarization-rotated second portion of the incoming light at a given one of the ring resonator photodetectors 109-x in order to provide for recovery of the optical signal as conveyed within the incoming light. The difference in arrival time of the first portion of the incoming light and the corresponding polarization-rotated second portion of the incoming light at a given one of the ring resonator photodetectors 109-x can be caused by differences in optical path length through the optical waveguide 107 to the given one of the ring resonator photodetectors 109-x and/or by delay in outputting the polarization-rotated second portion of the incoming light relative to the first portion of the incoming light from the optical coupler 105 (from the dual-polarization grating coupler).

Figure 1B:
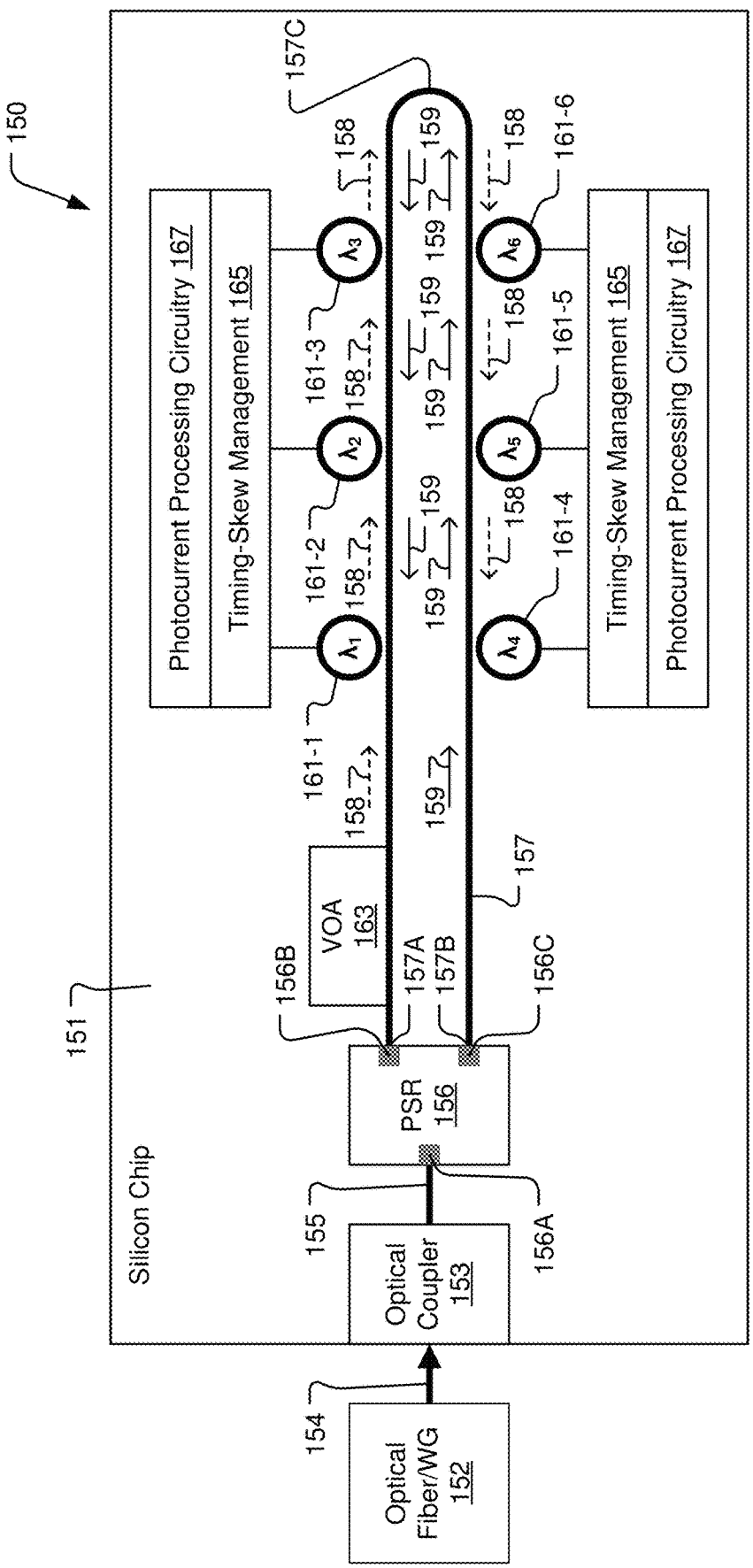
FIG. 1B shows an example configuration of an electro-optic receiver implemented within a PIC, in accordance with some embodiments.

FIG. 1B shows an example configuration of an electro-optic receiver 150 implemented within a PIC 151, in accordance with some embodiments. The electro-optic receiver 150 receives the incoming optical signal from an optical fiber/waveguide 152 through an optical coupler 153, as indicated by arrow 154. In some embodiments, the optical coupler 153 is implemented as an edge coupler. However, in other embodiments, the optical coupler 153 is implemented as a vertical grating coupler, or as another type of optical coupling device that provides for optical coupling of the PIC 151 to the optical fiber/waveguide 152. The incoming optical signal is conveyed from the optical coupler 153 through an optical waveguide 155 to an optical input of a polarization splitter and rotator (PSR) 156 of the electro-optic receiver 150. In this manner, the PSR 156 has an optical input 156A optically connected to receive incoming light. In some embodiments, the optical input 156A of the PSR 156 is directly optically coupled to the optical coupler 153, such that the optical waveguide 155 is not required. The PSR 156 has a first optical output 156B and a second optical output 156C. The PSR 156 is configured to direct a first portion of the incoming light having a first polarization through the first optical output 156B. The PSR 156 is configured to rotate a polarization of a second portion of the incoming light from a second polarization to the first polarization. In this manner, the PSR 156 turns the second portion of the incoming light into a polarization-rotated second portion of the incoming light. The PSR 156 is configured to direct the polarization-rotated second portion of the incoming light through the second optical output 156C.

The electro-optic receiver 150 includes an optical waveguide 157 formed within the PIC 151. The optical waveguide 157 has a first end 157A optically to the first optical output 156B of the PSR 156. The optical waveguide 157 also has a second end 157B optically connected to the second optical output 156C of the PSR 156. In this manner, the first portion of the incoming light travels from the first optical output 156A of the PSR 156 through the optical waveguide 157 in a first direction, as indicated by arrows 158. Also, the polarization-rotated second portion of the incoming light travels from the second optical output 156C of the PSR 156 through the optical waveguide 157 in a second direction, as indicated by arrows 159, that is opposite the first direction. The optical waveguide 157 is formed of a material through which light can be in-coupled, out-coupled, and guided. The optical waveguide 157 is formed within a surrounding material that has an optical index of refraction sufficiently different from that of the optical waveguide 157 to enable guiding of light within the optical waveguide 157.

The electro-optic receiver 150 also includes a plurality of ring resonator photodetectors 161-1 to 161-6 positioned alongside the optical waveguide 157 and within an evanescent optical coupling distance of the optical waveguide 157. It should be understood that the number of the ring resonator photodetectors 161-1 to 161-6 is provided by way of example. In some embodiments, the electro-optic receiver 150 includes less than six ring resonator photodetectors. In some embodiments, the electro-optic receiver 150 includes more than six ring resonator photodetectors. It should be understood that there is no limit on the number of the ring resonator photodetectors (e.g., 161-1 to 161-6) that can be positioned along the optical waveguide 157, so long as the ring resonator photodetectors and associated signal processing circuitry can be spatially and electrically accommodated on the chip. In some embodiments, the ring resonator photodetectors 161-1 to 161-6 are implemented as annular-shaped waveguides having circuitous configuration, e.g., circular, oval, race-track, or another arbitrary circuitous shape. In some embodiments, the ring resonator photodetectors 161-1 to 161-6 are implemented as circular discs. The ring resonator photodetectors 161-1 to 161-6 are formed of a material through which light can be in-coupled, out-coupled, and guided. Each of the ring resonator photodetectors 161-1 to 161-6 is formed within a surrounding material that has an optical index of refraction sufficiently different from that of the ring resonator photodetectors 161-1 to 161-6 to enable guiding of light within the ring resonator photodetectors 161-1 to 161-6 and around the circuitous path defined by each of the ring resonator photodetectors 161-1 to 161-6. In some embodiments, each of the ring resonator photodetectors 161-1 to 161-6 is configured to have an annular-shape or disc-shape with an outer diameter of less than about 50 micrometers. In some embodiments, each of the ring resonator photodetectors 161-1 to 161-6 is configured to have an annular-shape or disc-shape with an outer diameter of less than about 10 micrometers.

Each of the plurality of ring resonator photodetectors 161-1 to 161-6 is configured to operate at a respective resonant wavelength $\lambda_1$ to $\lambda_6$, respectively, such that the first portion of the incoming light having a wavelength substantially equal to the respective resonant wavelength of a given one of the plurality of ring resonator photodetectors 161-1 to 161-6 optically couples into the given one of the plurality of ring resonator photodetectors 161-1 to 161-6 in a first propagation direction, and such that the polarization-rotated second portion of the incoming light having a wavelength substantially equal to the respective resonant wavelength of the given one of the plurality of ring resonator photodetectors 161-1 to 161-6 optically couples into the given one of the plurality of ring resonator photodetectors 161-1 to 161-6 in a second propagation direction opposite the first propagation direction. For example, if the incoming light has a wavelength substantially equal to the wavelength $\lambda_2$, then the first portion of the incoming light having the wavelength $\lambda_2$ will optically couple into the ring resonator 161-2 and propagate in a counter-clockwise direction within the ring resonator 161-2, and the polarization-rotated second portion of the incoming light having the wavelength $\lambda_2$ will also optically couple into the ring resonator 161-2 and propagate in a clockwise direction within the ring resonator 161-2. It should be understood that both the first portion of the incoming light and the polarization-rotated second portion of the incoming light have the same polarization state within the optical waveguide 157. Therefore, any given one of the ring resonator photodetectors 161-1 to 161-6 operating at a particular resonant wavelength is able to optically in-couple and detect both the first portion of the incoming light and the polarization-rotated second portion of the incoming light having the particular resonant wavelength.

In some embodiments, such as shown in the example electro-optic receiver 150, the plurality of ring resonator photodetectors 161-1 to 161-6 includes a first set of ring resonator photodetectors 161-1 to 161-3 positioned between the first end 157A of the optical waveguide 157 and a midpoint 157C of the optical waveguide 157 located half-way between the first end 157A and the second end 157B of the optical waveguide 157. Also, in these embodiments, the plurality of ring resonator photodetectors 161-1 to 161-6 includes a second set of ring resonator photodetectors 161-4 to 161-6 positioned between the second end 157B of the optical waveguide 157 and the midpoint 157C of the optical waveguide 157. It should be understood that in some embodiments, the number of ring resonator photodetectors in the first set of ring resonator photodetectors is either less than or more than the three ring resonator photodetectors 161-1 to 161-3. Also, in some embodiments, the number of ring resonator photodetectors in the second set of ring resonator photodetectors is either less than or more than the three ring resonator photodetectors 161-4 to 161-6.

In some embodiments, the electro-optic receiver 150 also includes a variable optical attenuator (VOA) 163 that is configured to attenuate the light propagated through the optical waveguide 157 in a controlled manner in accordance with an electrical control signal. In some embodiments, the VOA 163 is positioned to optically couple to the optical waveguide 157 near either the first end 157A or the second end 157B of the optical waveguide 157. In the example electro-optic receiver 150, the VOA 163 is optically coupled to the optical waveguide 157 near the first end 157A of the optical waveguide 157. The VOA 163 operates to limit the optical reflection/transmission of light from the optical waveguide 157 back into the optical fiber/waveguide 152 when the electro-optic receiver 150 is initially turned on, and before the ring resonator photodetectors 161-1 to 161-6 have been tuned to their respective resonant wavelengths $\lambda_1$ to $\lambda_6$ to in-couple light of the various wavelength channels present in the incoming optical signal. During startup of the electro-optic receiver 150, incoming light that does not couple into any of the ring resonator photodetectors 161-1 to 161-6 will pass through the optical waveguide 157 and back out through the optical fiber/waveguide 152, which could possibly damage the source from which the incoming light was transmitted. For example, if the source of the incoming light is a laser source, reverse transmission of the incoming laser light back into the laser source could damage the laser source or degrade its performance. To prevent this from happening, during startup of the electro-optic receiver 150, the VOA 163 operates to attenuate the light propagating within the optical waveguide 157 to a level where light returning to the optical fiber/waveguide 152 will not damage and/or disrupt operation of the source from which the incoming light was transmitted, e.g., the laser source, while also keeping the optical power within the optical waveguide 157 just high enough to allow the ring resonator photodetectors 161-1 to 161-6 to be tuned and locked to their respective resonant wavelengths $\lambda_1$ to $\lambda_6$ corresponding to the various wavelength channels present in the incoming optical signal. Then, after the ring resonator photodetectors 161-1 to 161-6 are tuned and locked to their respective resonant wavelengths $\lambda_1$ to $\lambda_6$ corresponding to the various wavelength channels present in the incoming optical signal, operation of the VOA 163 is adjusted to reduce or stop attenuation of the light propagating within the optical waveguide 157.

In some embodiments, the VOA 163 is implemented as an optical waveguide (or portion of the optical waveguide 157) having a built-in PN or PIN diode that when forward-biased creates an electrical current within the optical waveguide of the VOA 163 that increases optical absorption within the optical waveguide of the VOA 163 through free-carrier absorption. In these embodiments, the optical absorption within the optical waveguide of the VOA 163 is increased by increasing the forward-bias voltage (and thus by increasing the electrical current) within the optical waveguide of the VOA 163. Also, in these embodiments, the optical absorption within the optical waveguide of the VOA 163 is reduced by reducing the forward bias-voltage (and thus by reducing the electrical current) within the optical waveguide of the VOA 163. Also, in these embodiments, the optical absorption within the optical waveguide of the VOA 163 is stopped by reverse-biasing of the PN or PIN diode within the optical waveguide of the VOA 163. In some embodiments, the PN or PIN diode of the VOA 163 is actually formed within the optical waveguide 157. In some embodiments, the VOA 163 includes its own optical waveguide separate from the optical waveguide 157, where the optical waveguide of the VOA 163 is evanescently optically coupled to a section of the optical waveguide 157, with the PN or PIN diode built into the optical waveguide of the VOA 163.

In some embodiments, the electro-optic receiver 150 also includes a timing-skew management system 165 configured to electronically compensate for a temporal difference in photocurrent generation by any given one of the plurality of ring resonator photodetectors 161-1 to 161-6 caused by a difference in arrival time of the first portion of the incoming light and the polarization-rotated second portion of the incoming light at said any given one of the plurality of ring resonator photodetectors 161-1 to 161-6. After the timing-skew management system 165 operates to electronically compensate for the temporal difference in photocurrent generation by each of the plurality of ring resonator photodetectors 161-1 to 161-6, the photocurrents generated by each of the plurality of ring resonator photodetectors 161-1 to 161-6 are transmitted to photocurrent processing circuitry 167 to decode the photocurrents into digital data patterns as conveyed by the incoming optical signal. In some embodiments where light from different polarizations is made to have a same polarization and is combined into a single waveguide, or where light from different polarizations is made to have a same polarization and is combined into a single photodetector or set of photodetectors, there may be a time delay difference (timing-skew) between the optical signals from each polarization state. After converting the combined optical signal into an electronic signal with a photodetector or set of photodetectors, the timing-skew manifests itself as a notch filter around an electrical radiofrequency component of the baseband signal. The center frequency of the notch filter is dependent on the magnitude of the timing-skew, and the depth of the notch filter is determined by the relative split in optical power between the two polarization states. For a digital communications application, this notch filter results in increased inter-symbol interference (ISI). The timing-skew management system 165 is configured to detect the presence of the timing-skew, determine the magnitude of the timing-skew, and compensate for the timing-skew in the photocurrent-based signals that are transmitted to the photocurrent processing circuitry 167.

Figure 2A:
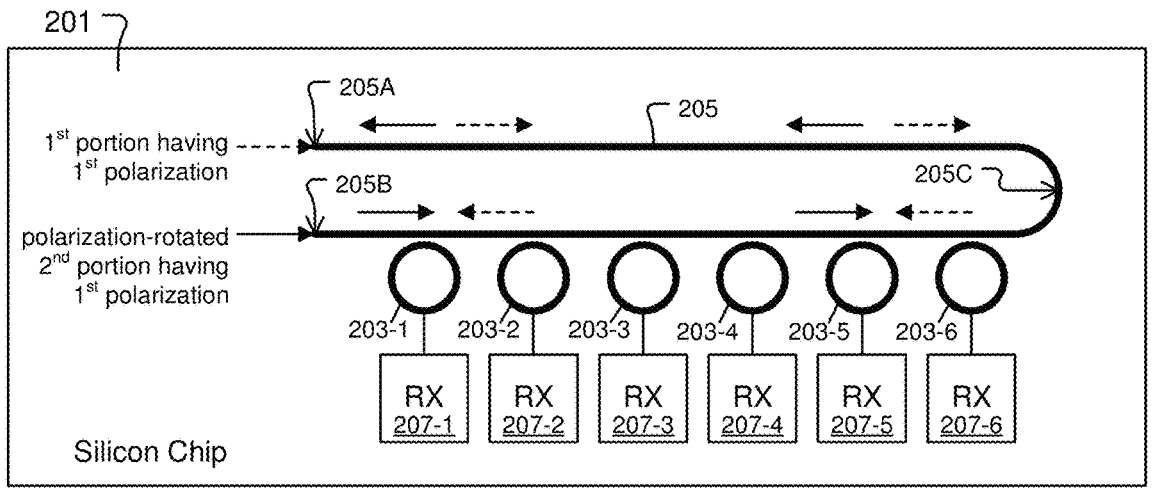
FIG. 2A shows an example of a WDM optical receiver that includes multiple ring resonator photodetectors positioned along an optical waveguide that is configured to extend in a continuous, loop-like configuration, in accordance with some embodiments.
Figure 2B:
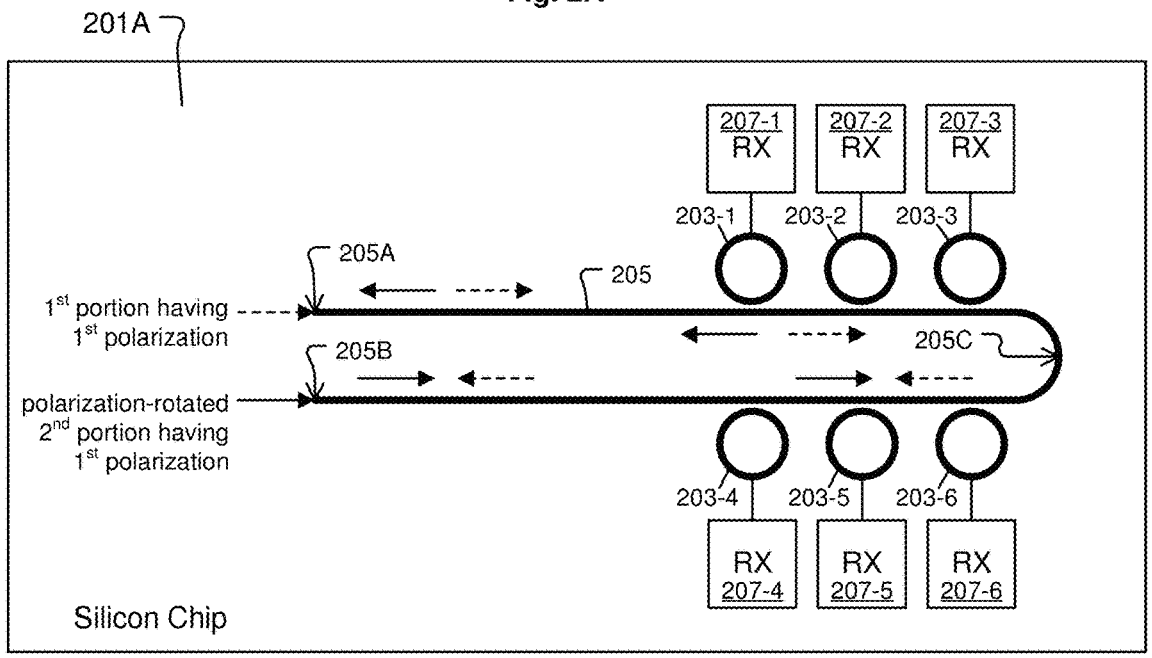
FIG. 2B shows a WDM optical receiver that is modified version of the WDM optical receiver of FIG. 2A, in accordance with some embodiments.
Figure 2C:
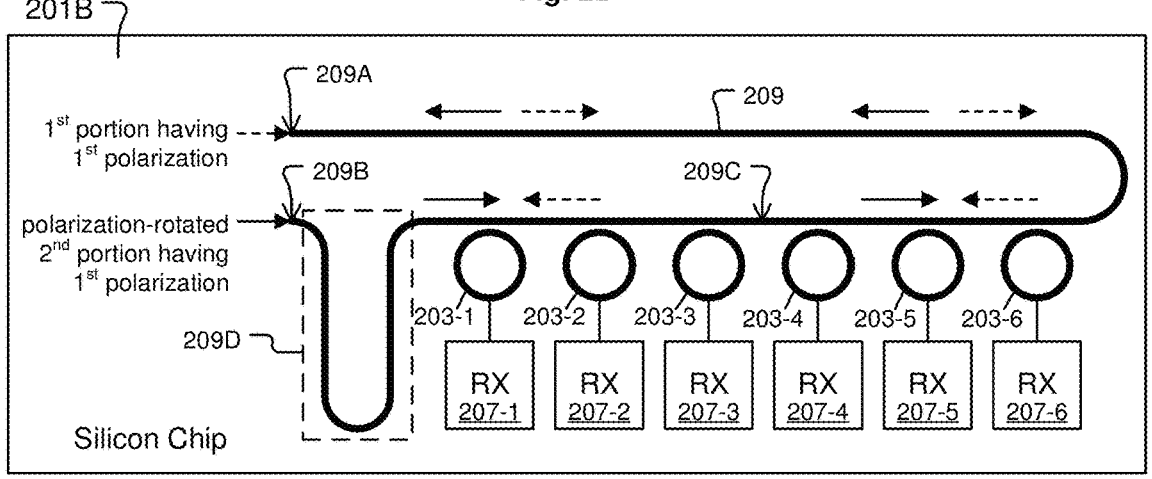
FIG. 2C shows a WDM optical receiver that is modified version of the WDM optical receiver of FIG. 2B, in accordance with some embodiments.

In some embodiments, the temporal difference (timing-skew) in photocurrent generation by a given one of the plurality of ring resonator photodetectors 161-1 to 161-6 caused by a difference in arrival time of the first portion of the incoming light and the polarization-rotated second portion of the incoming light at the given one of the plurality of ring resonator photodetectors 161-1 to 161-6 is reduced by reducing a difference in optical travel distance to the given one of the plurality of ring resonator photodetectors 161-1 to 161-6 that is traveled by the first portion of the incoming light and the polarization-rotated second portion of the incoming light. FIGS. 2A, 2B, and 2C illustrate examples of how to reduce the difference in optical travel distance through a same optical waveguide to a given one of a plurality of photodetectors that is traveled by the first portion of the incoming light and the polarization-rotated second portion of the incoming light, where the first portion of the incoming light and the polarization-rotated second portion of the incoming light travel in opposite directions through the same optical waveguide, such as in the electro-optic receiver 150 of FIG. 1B.

In various embodiments, the PSR 156, and any of the PSR's referred to herein, is configured in a manner that provides for: 1) reception of two polarizations of incoming light (TE and TM), 2) rotation of one of the polarizations of the incoming light to the other polarization (either rotation of TE to TM, or rotation of TM to TE), 3) outputting of the portion of the incoming light having the polarization that was not rotated to a first output optical waveguide, and 4) outputting of the portion of the incoming light having the polarization that was rotated to a second output optical waveguide. In it should be understood that in various embodiments, the polarization rotation and original-polarization-based splitting of the incoming light performed by the PSR 156, and any of the PSR's referred to herein, can be done simultaneously or sequentially within the PSR (e.g., with the polarization rotation happening either before, after, or in conjunction with the original-polarization-based splitting of the incoming light).

Figure 1C:
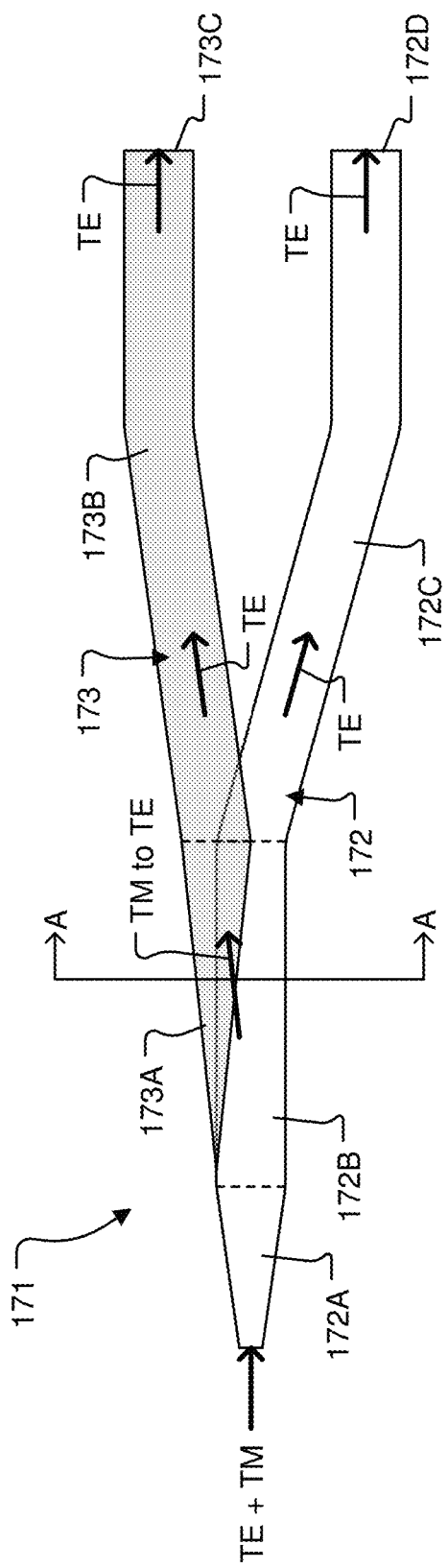
FIG. 1C shows an example configuration of a PSR, in accordance with some embodiments.
Figure 1D:
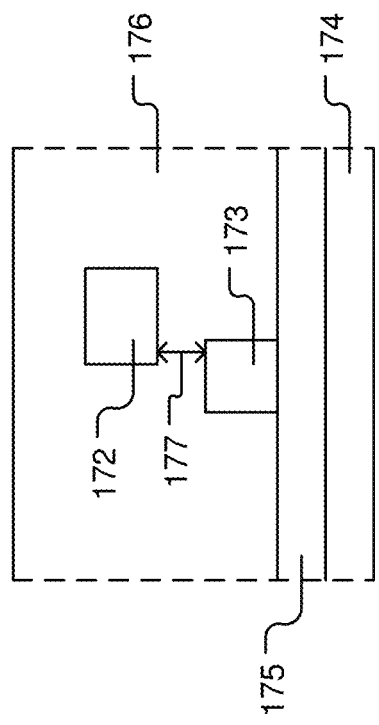
FIG. 1D shows a vertical cross-section view through the example PSR, referenced as View A-A in FIG. 1C, in accordance with some embodiments.

FIG. 1C shows an example configuration of a PSR 171, in accordance with some embodiments. It should be understood that the example PSR 171 can be used for the PSR 156 and/or any of the PSR's referred to herein. Also, it should be understood that the PSR 171 is provided by way of example and in no way limits how the PSR 156 and/or any of PSR's referred to herein can be configured in various embodiments. The PSR 171 includes a first optical waveguide 172 and a second optical waveguide 173. FIG. 1D shows a vertical cross-section view through the example PSR 171, referenced as View A-A in FIG. 1C, in accordance with some embodiments. In some embodiments, the first optical waveguide 172 is a silicon nitride optical waveguide, and the second optical waveguide 173 is a silicon optical waveguide. In some embodiments, the PSR 171 is formed on a buried oxide (BOX) layer 175 that is disposed over a substrate 174. In some embodiments, the first optical waveguide 173 and the second optical waveguide 172 are formed within an optical cladding 176. In some embodiments, the optical cladding 176 is silicon dioxide. The first optical waveguide 172 is vertical separated from the second optical waveguide 173 by a layer of the optical cladding, as indicated by arrow 177.

The first optical waveguide 172 includes an input section 172A connected to receive incoming light that includes both the TE and TM polarizations. In some embodiments, the input section 172A is configured as an inverse taper to convert a spot size of the incoming light to the optical mode of the first optical waveguide 172. After the input section 172A (with respect to the light propagation direction) the first optical waveguide 172 includes a rotation/splitting section 172B. In some embodiments, the rotation/splitting section 172B has a substantially linear shape. After the rotation/splitting section 172B, the first optical waveguide 172 includes an output section 172C that is optically connected to a first optical output 172D of the PSR 171. The first optical waveguide 172 is configured such that a portion of the incoming light having a first polarization (TE or TM) travels through the first optical waveguide 172 to the first optical output 172D of the PSR 171 in a substantially unchanged manner. The example PSR 171 shows the TE polarization of the incoming light traveling through the first optical waveguide 172 to the first optical output 172D of the PSR 171 in a substantially unchanged manner.

The second optical waveguide 173 includes a rotation/splitting section 173A that is configured to evanescently in-couple the TM polarization of the incoming light from the rotation/splitting section 172B of the first optical waveguide 172 and simultaneously rotate the in-coupled TM polarization to the TE polarization. To accomplish this, the rotation/splitting section 173A of the second optical waveguide 173 has an inverse taper configuration that positioned off-center (having a lateral offset in a direction perpendicular to the light propagation direction) with respect to the rotation/splitting section 172B of the first optical waveguide 172. The lateral offset of the rotation/splitting section 173A of the second optical waveguide 173 with respect to the rotation/splitting section 172B of the first optical waveguide 172 serves to break horizontal and vertical symmetry so as to rotate the TM0 mode in the rotation/splitting section 172B of the first optical waveguide 172 to a rotated TE0 mode and couple this rotated TE0 mode into the rotation/splitting section 173A of the second optical waveguide 173. The rotated TE0 mode is conveyed through an output section 173B of the second optical waveguide 173 to a second optical output 173C of the PSR 171. While the example PSR 171 shows the TE polarization of the incoming light traveling through the first optical waveguide 172 to the first optical output 172D of the PSR 171 in a substantially unchanged manner, and shows the TM polarization of the incoming light being rotated to the TE polarization in route to the second optical output 173C of the PSR 171, other embodiments of the PSR 171 are configured to have the TM polarization of the incoming light travel through the first optical waveguide 172 to the first optical output 172D of the PSR 171 in a substantially unchanged manner, with the TE polarization of the incoming light rotated to the TM polarization in route to the second optical output 173C of the PSR 171.

FIG. 1E shows an example configuration of a PSR 181, in accordance with some embodiments. It should be understood that the example PSR 181 can be used for the PSR 156 and/or any of the PSR's referred to herein. Also, it should be understood that the PSR 181 is provided by way of example and in no way limits how the PSR 156 and/or any of PSR's referred to herein can be configured in various embodiments. The PSR 181 is a broadband PSR that implements parallel rib-type optical waveguides. The PSR 181 includes a first branch 183 and a second branch 185. The PSR 181 is configured as an optical waveguide system that includes a first branch slab waveguide 187, a first branch rib waveguide 189, a second branch slab waveguide 188, and a second branch rib waveguide 190. FIG. 1F shows a vertical cross-section view through the example PSR 181, referenced as View A-A in FIG. 1E, in accordance with some embodiments. FIG. 1G shows a vertical cross-section view through the example PSR 181, referenced as View B-B in FIG. 1E, in accordance with some embodiments. In some embodiments, the first branch slab waveguide 187, the second branch slab waveguide 188, the first branch rib waveguide 189, and the second branch rib waveguide 190 are integrally formed as a monolithic optical waveguide structure, in which the first branch slab waveguide 187, the second branch slab waveguide 188, the first branch rib waveguide 189, and the second branch rib waveguide 190 form different parts of the monolithic optical waveguide structure. In some embodiments, the monolithic optical waveguide structure is formed as a silicon optical waveguide. In some embodiments, the monolithic optical waveguide structure is formed as a silicon nitride optical waveguide. In some embodiments, the PSR 181 is formed on a BOX layer 191 that is disposed over a substrate 192. In some embodiments, the monolithic optical waveguide structure that includes the first slab waveguide 187, the second branch slab waveguide 188, the first branch rib waveguide 189, and the second branch rib waveguide 190 is formed within an optical cladding 193. In some embodiments, the optical cladding 193 is silicon dioxide.

The first branch rib waveguide 189 includes an input section 189A that has a substantially linear shape, followed by a tapered section 189B, followed by an output section 189C (with respect to a light propagation direction through the PSR 181). The first branch slab waveguide 187 includes tapered input section 187A, followed by a tapered section 187B (corresponding to the rib tapered section 189B), followed by an output section 187C (corresponding to the rib output section 189C). The second branch rib waveguide 190 includes a tapered section 190A, followed by an output section 190B (with respect to a light propagation direction through the PSR 181). The second branch slab waveguide 188 includes tapered section 188A (corresponding to the rib tapered section 190A, followed by an output section 188B (corresponding to the rib output section 190B). In some embodiments, a portion of the output section 188B of the second branch slab waveguide 188 located between the first branch rib waveguide 189 and the second branch rib waveguide 190 has an increasing width along the light propagation direction to provide for easier optical routing of the outputs of the first branch 183 and the second branch 185 to separate output optical waveguides.

The input section 189A and the tapered section 189B of the first branch rib waveguide 189, and the tapered input section 187A and the tapered section 187B of the first branch slab waveguide 187, collectively function as a polarization rotator. The output section 189C of the first branch rib waveguide 189 and the output section 187C of the first branch slab waveguide 187, and the tapered section 190A of the second branch rib waveguide 190 and the tapered section 188A of the second branch slab waveguide 188, collectively function as a polarization splitter. In this manner, the TE0 polarization of the incoming light is transmitted in a substantially unchanged manner through the first branch 183 to a first optical output 195 of the PSR 181. The TM0 polarization of the incoming light is rotated to a TE1 polarization and then to a TE0 polarization as this portion of the incoming light is transmitted through the first branch 183 and is optically coupled into the second branch 185 in route to a second optical output 197 of the PSR 181. Alternatively, in some other embodiments, the PSR 181 is configured to pass through the TM polarization of the incoming light in a substantially unchanged manner and rotate/split the TE polarization of the incoming light to outgoing TM polarized light.

It should be understood that the PSR 171 and the PSR 181 are provided as examples of how the PSR's described herein may be implemented in some example embodiments. It should also be understood that in some embodiments, any of the PSR's described herein can be implemented as a dual-polarization grating coupler, such as described with regard to FIG. 1A. It should be understood that the example PSR 171 and the example PSR 181 do not limit in any way how the various PSR's described herein can be implemented in various embodiments. Any of the PSR's described herein can be implemented in different ways so long as one of the two input polarizations (TE or TM) of incoming light received by the PSR is rotated to the other polarization and is directed to one of two outputs of the PSR, with the non-rotated polarization of the incoming light being directed to another of the two outputs of the PSR.

FIG. 2A shows an example of a WDM optical receiver 201 that includes multiple ring resonator photodetectors 203-1 to 203-6 (one for each wavelength channel) positioned along an optical waveguide 205 that is configured to extend in a continuous, loop-like configuration from a first end 205A to a second end 205B, in accordance with some embodiments. Each of the multiple ring resonator photodetectors 203-1 to 203-6 is electrically connected to transmit detected photocurrent to a corresponding one of multiple receiver circuits 207-1 to 207-6. Each of the multiple ring resonator photodetectors 203-1 to 203-6 is positioned to evanescently in-couple light from the optical waveguide 205 that has a substantially same wavelength as the operating resonant wavelength of the particular ring resonator photodetector. In some embodiments, each of the ring resonator photodetectors 203-1 to 203-6 is configured to have an annular-shape or disc-shape with an outer diameter of less than about 50 micrometers. In some embodiments, each of the ring resonator photodetectors 203-1 to 203-6 is configured to have an annular-shape or disc-shape with an outer diameter of less than about 10 micrometers. The optical waveguide 205 has a center location 205C that is about halfway between the first end 205A and the second end 205B of the optical waveguide 205. In the example of FIG. 2A, all of the multiple ring resonator photodetectors 203-1 to 203-6 are positioned along a same half of the optical waveguide 205, which causes an increased optical path length mismatch between the different ring resonator photodetectors 203-1 to 203-6. Therefore, in the example of FIG. 2A, there is a large temporal difference (timing-skew) in photocurrent generation by a given one of the multiple ring resonator photodetectors 203-1 to 203-6 that is caused by a difference in arrival time of the first portion of the incoming light and the polarization-rotated second portion of the incoming light at the given one of the multiple ring resonator photodetectors 203-1 to 203-6.

FIG. 2B shows a WDM optical receiver 201A that is modified version of the WDM optical receiver 201 of FIG. 2A, in accordance with some embodiments. In the WDM optical receiver 201A, a first half of the multiple ring resonator photodetectors 203-1 to 203-3 are positioned along a first half of the optical waveguide 205 extending from the first end 205A to the center location 205C of the optical waveguide. The first half of the ring resonator photodetectors 203-1 to 203-3 are also positioned close to the center location 205C of the optical waveguide 205. Similarly, in the WDM optical receiver 201A, a second half of the multiple ring resonator photodetectors 203-4 to 203-6 are positioned along a second half of the optical waveguide 205 extending from the second end 205B to the center location 205C of the optical waveguide 205. The second half of the ring resonator photodetectors 203-1 to 203-3 are also positioned close to the center location 205C of the optical waveguide 205. In the optical receiver 201A, the ring resonator photodetectors 203-1 to 203-6 are distributed evenly about the center location 205C of the optical waveguide 205 and as close as possible to the center location 205C of the optical waveguide 205. It should be understood that centering the multiple ring resonator photodetectors 203-1 to 203-6 on the center location 205C of the optical waveguide 205 minimizes a difference in optical travel distance to a given one of the multiple ring resonator photodetectors 203-1 to 203-6 that is traveled by the first portion of the incoming light and the polarization-rotated second portion of the incoming light, which in turn minimizes the timing-skew between the first portion of the incoming light and the polarization-rotated second portion of the incoming light at the given one of the multiple ring resonator photodetectors 203-1 to 203-6. The optical receiver 201A minimizes the residual path length difference between each polarization of each of the wavelength channel signals in the incoming optical signal.

FIG. 2C shows a WDM optical receiver 201B that is modified version of the WDM optical receiver 201A of FIG. 2B, in accordance with some embodiments. In the WDM optical receiver 201B, the optical waveguide 205 is replaced by an optical waveguide 209 that has a first end 209A, a second end 209B, and a center location 209C. The optical waveguide 209 also includes an extra waveguide section 209D that is configured so that the center location 209C of the optical waveguide 209 is positioned along a linear stretch of the optical waveguide 209 that is long enough to accommodate a linear positioning of the multiple ring resonator photodetectors 203-1 to 203-6 along the linear stretch of the optical waveguide 209, with the multiple ring resonator photodetectors 203-1 to 203-6 centered on the center location 205C of the optical waveguide 205. Having the multiple ring resonator photodetectors 203-1 to 203-6 centered on the center location 209C of the optical waveguide 205 provides for minimization of the difference in optical travel distance to a given one of the multiple ring resonator photodetectors 203-1 to 203-6 that is traveled by the first portion of the incoming light and the polarization-rotated second portion of the incoming light, which in turn minimizes the timing-skew between the first portion of the incoming light and the polarization-rotated second portion of the incoming light at the given one of the multiple ring resonator photodetectors 203-1 to 203-6. It should be appreciated that having the multiple ring resonator photodetectors 203-1 to 203-6 positioned in the linear arrangement within the WDM optical receiver 201B provides for placement of the receiver circuits 207-1 to 207-6 next to each other on the chip, which opens up other areas of the chip for implementation of other photonic and/or electronic circuitry. The optical receiver 201B also minimizes the residual path length difference between each of the signals of each polarization.

Figure 3:
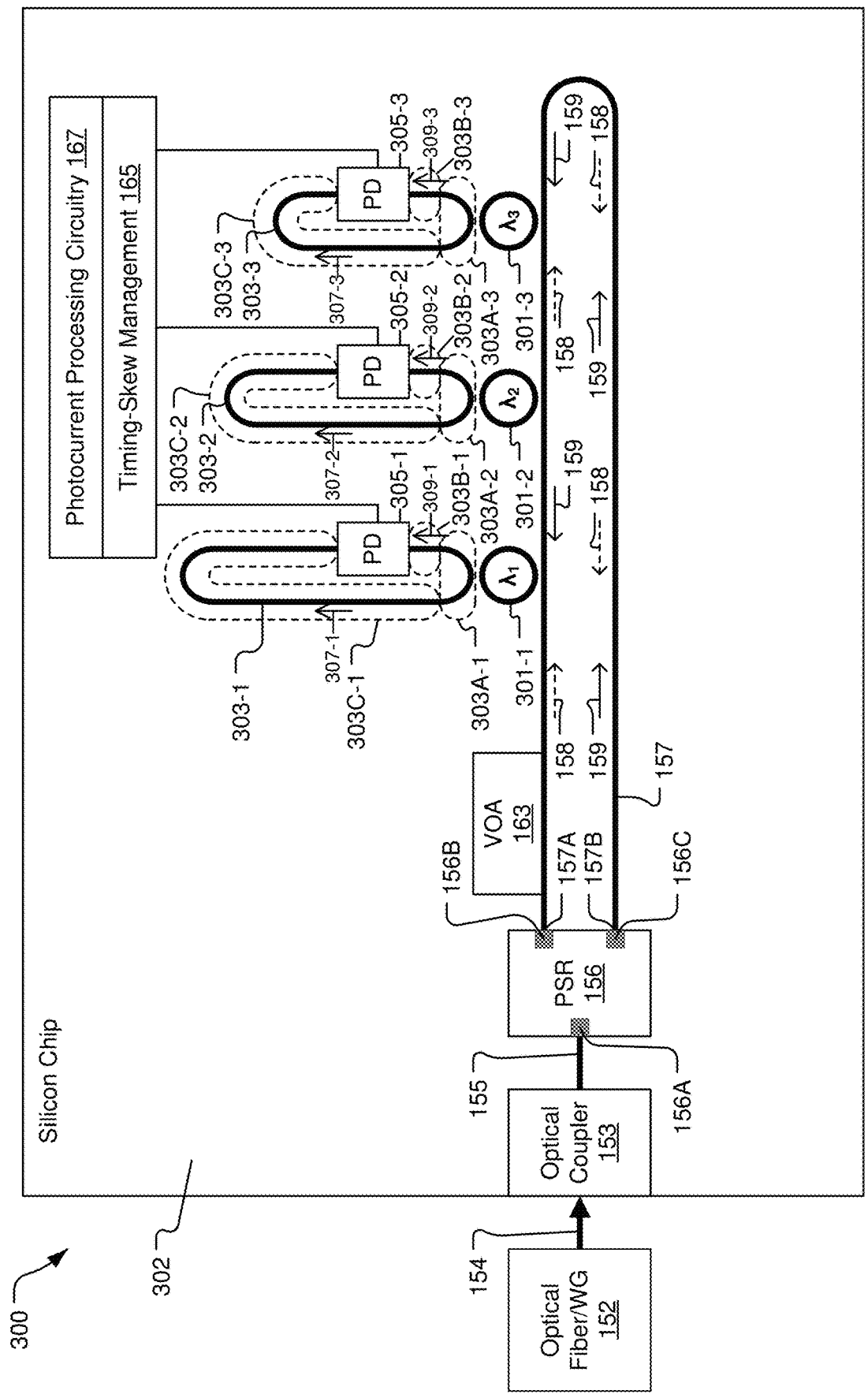
FIG. 3 shows an example configuration of an electro-optic receiver implemented within a PIC, in accordance with some embodiments.

FIG. 3 shows an example configuration of an electro-optic receiver 300 implemented within a PIC 302, in accordance with some embodiments. Like the electro-optic receiver 150 of FIG. 1B, the electro-optic receiver 300 receives the incoming optical signal from the optical fiber/waveguide 152 through the optical coupler 153, as indicated by arrow 154. The incoming optical signal is conveyed from the optical coupler 153 through the optical waveguide 155 to the optical input of the PSR 156. As with the electro-optic receiver 150 of FIG. 1B, the PSR 156 is configured to direct a first portion of the incoming light having a first polarization through the first optical output 156B of the PSR 156. The PSR 156 is also configured to rotate a polarization of a second portion of the incoming light from a second polarization to the first polarization so that the second portion of the incoming light is a polarization-rotated second portion of the incoming light. The PSR 156 is configured to direct the polarization-rotated second portion of the incoming light through the second optical output 156C of the PSR 156. The first end 157A of the optical waveguide 157 is optically connected to the first optical output 156B of the PSR 156. The second end 157B of the optical waveguide 157 is optically connected to the second optical output 156C of the PSR 156. The optical waveguide 157 of the electro-optic receiver 300 is like that of the electro-optic receiver 150 of FIG. 1B. The optical waveguide 157 has the continuous, loop-like structure. In this manner, the first portion of the incoming light travels from the first optical output 156A of the PSR 156 through the optical waveguide 157 in a first direction, as indicated by arrows 158. Also, the polarization-rotated second portion of the incoming light travels from the second optical output 156C of the PSR 156 through the optical waveguide 157 in a second direction, as indicated by arrows 159, that is opposite the first direction.

The electro-optic receiver 300 includes a plurality of ring resonators 301-1 to 301-3 positioned alongside the optical waveguide 157 and within an evanescent optical coupling distance of the optical waveguide 157. The example configuration of the electro-optic receiver 300 includes three ring resonators 301-1 to 301-3 for description purposes. It should be understood that in various embodiments, the electro-optic receiver 300 includes either less than three or more than three ring resonators positioned alongside the optical waveguide 157 and within an evanescent optical coupling distance of the optical waveguide 157. There is no limit on the number of ring resonators that (e.g., 301-1 to 301-3) that can be positioned along the optical waveguide 157, so long as the ring resonators and associated signal processing circuitry can be spatially and electrically accommodated on the chip. In some embodiments, the ring resonators 301-1 to 301-3 are implemented as annular-shaped waveguides having circuitous configuration, e.g., circular, oval, race-track, or another arbitrary circuitous shape. In some embodiments, the ring resonators 301-1 to 301-3 are implemented as circular discs. The ring resonators 301-1 to 301-3 are formed of a material through which light can be in-coupled, out-coupled, and guided. Each of the ring resonators 301-1 to 301-3 is formed within a surrounding material that has an optical index of refraction sufficiently different from that of the ring resonators 301-1 to 301-3 to enable guiding of light within the ring resonators 301-1 to 301-3 and around the circuitous path defined by each of the ring resonators 301-1 to 301-3. In some embodiments, each of the ring resonators 301-1 to 301-3 is configured to have an annular-shape or disc-shape with an outer diameter of less than about 50 micrometers. In some embodiments, each of the ring resonators 301-1 to 301-3 is configured to have an annular-shape or disc-shape with an outer diameter of less than about 10 micrometers.

Each of the plurality of ring resonators 301-1 to 301-3 is configured to operate at a respective resonant wavelength $\lambda_1$ to $\lambda_3$. In this manner, the first portion of the incoming light having a wavelength substantially equal to the respective resonant wavelength of a given one of the plurality of ring resonators 301-1 to 301-3 optically couples into the given one of the plurality of ring resonators 301-1 to 301-3 in a first propagation direction, and the polarization-rotated second portion of the incoming light having a wavelength substantially equal to the respective resonant wavelength of the given one of the plurality of ring resonators 301-1 to 301-3 optically couples into the given one of the plurality of ring resonators 301-1 to 301-3 in a second propagation direction opposite the first propagation direction. For example, the first portion of the incoming light having a particular wavelength optically couples into the ring resonator 301-$x$ operating at the particular wavelength and propagates in a counter-clockwise direction within the ring resonator 301-$x$. The polarization-rotated second portion of the incoming light having a particular wavelength optically couples into the ring resonator 301-$x$ operating at the particular wavelength and propagates in a clockwise direction within the ring resonator 301-$x$.

The electro-optic receiver 300 includes a plurality of output optical waveguides 303-1 to 303-3 positioned within an evanescent optical coupling distance of the plurality of ring resonators 301-1 to 301-3, respectively. Each of the plurality of output optical waveguides 303-1 to 303-3 includes a coupling section 303A-1 to 303A-3, respectively. Each of the plurality of output optical waveguides 303-1 to 303-3 includes a short section 303B-1 to 303B-3, respectively. Each of the plurality of output optical waveguides 303-1 to 303-3 includes a long section 303C-1 to 303C-3, respectively. The number of output optical waveguides 303-1 to 303-3 is equal to the number of ring resonators 301-1 to 301-3. Therefore, as the number of ring resonators changes in various embodiments, so does the number of output optical waveguides. The coupling section 303A-1 to 303A-3 is positioned to evanescently in-couple light from a corresponding one of the plurality of ring resonators 301-1 to 301-3. In this manner, each of the ring resonators 301-1 to 301-3 operates to transfer a particular wavelength of the first portion of the incoming light and the polarization-rotated second portion of the incoming light from the optical waveguide 157 to the corresponding one of the output optical waveguides 303-1 to 303-3. The first portion of the incoming light that propagates in the counter-clockwise direction within the ring resonators 301-1 to 301-3 is optically coupled through the coupling section 303A-1 to 303A-3, respectively, and into the long section 303C-1 to 303C-3, respectively, as indicated by arrows 307-1 to 307-3, respectively. The polarization-rotated second portion of the incoming light that propagates in the clockwise direction within the ring resonators 301-1 to 301-3 is optically coupled through the coupling section 303A-1 to 303A-3, respectively, and into the short section 303B-1 to 303B-3, respectively, as indicated by arrows 309-1 to 309-3, respectively.

The output optical waveguides 303-1 to 303-3 are formed of a material through which light can be in-coupled, out-coupled, and guided. Each of the output optical waveguides 303-1 to 303-3 is formed within a surrounding material that has an optical index of refraction sufficiently different from that of the output optical waveguides 303-1 to 303-3, respectively, to enable guiding of light within the output optical waveguides 303-1 to 303-3. In some embodiments, the output optical waveguides 303-1 to 303-3 are implemented to have a rack-track type shape. However, it should be understood that in other embodiments, the output optical waveguides 303-1 to 303-3 can be implemented to have an arbitrary shape, so long as they include the coupling section 303A-1 to 303A-3, respectively, and the short section 303B-1 to 303B-3, respectively, and the long section 303C-1 to 303C-3, respectively.

The electro-optic receiver 300 includes a plurality of photodetectors 305-1 to 305-3 respectively associated with the plurality of ring resonators 301-1 to 301-3. Therefore, as the number of ring resonators changes in various embodiments, so does the number of photodetectors. The short section 303B-1 to 303B-3 of the output optical waveguides 303-1 to 303-3 extends from a first end of the corresponding coupling section 303A-1 to 303A-3 to the corresponding one of the plurality of photodetectors 305-1 to 305-3. The long section 303C-1 to 303C-3 of the output optical waveguides 303-1 to 303-3 extends from a second end of the corresponding coupling section 303A-1 to 303A-3 to the corresponding one of the plurality of photodetectors 305-1 to 305-3. A length of the long section 303C-1 to 303C-3 and a length of the short section 303B-1 to 303B-3 within a given one of the output optical waveguides 303-1 to 303-3 are defined to reduce a difference in arrival time of the first portion of the incoming light and the polarization-rotated second portion of the incoming light at the corresponding one of the photodetectors 305-1 to 305-3 to which the long section 303C-1 to 303C-3 and the short section 303B-1 to 303B-3 are optically connected. Because the distance along the optical waveguide 157 from the second end 157B of the optical waveguide 157 to each of the ring resonators 301-1 to 301-3 is different, the length of the long section 303C-1 to 303C-3 is different for each of the output optical waveguides 303-1 to 303-3. In some embodiments, the length of the long section 303C-1 to 303C-3 decreases as a distance between the corresponding one of the plurality of ring resonators 301-1 to 301-3 and the midpoint of the optical waveguide 157 decreases, where the midpoint of the optical waveguide 157 is about halfway between the first end 157A and the second end 157B of the optical waveguide 157.

The electro-optic receiver 300 also includes the timing-skew management system 165 configured to electronically compensate for a temporal difference in photocurrent generation by a given one of the plurality of photodetectors 305-1 to 305-3 caused by the difference in arrival time of the first portion of the incoming light and the polarization-rotated second portion of the incoming light at the given one of the plurality of photodetectors 305-1 to 305-3. In some embodiments, each of the photodetectors 305-1 to 305-3 is a linear photodetector, with the short section 303B-1 to 303B-3 of the corresponding one of the output optical waveguides 303-1 to 303-3 optically connected to a first end of the linear photodetector, and with the long section 303C-1 to 303C-3 of the corresponding one of the output optical waveguides 303-1 to 303-3 optically connected to a second end of the linear photodetector.

Figure 4:
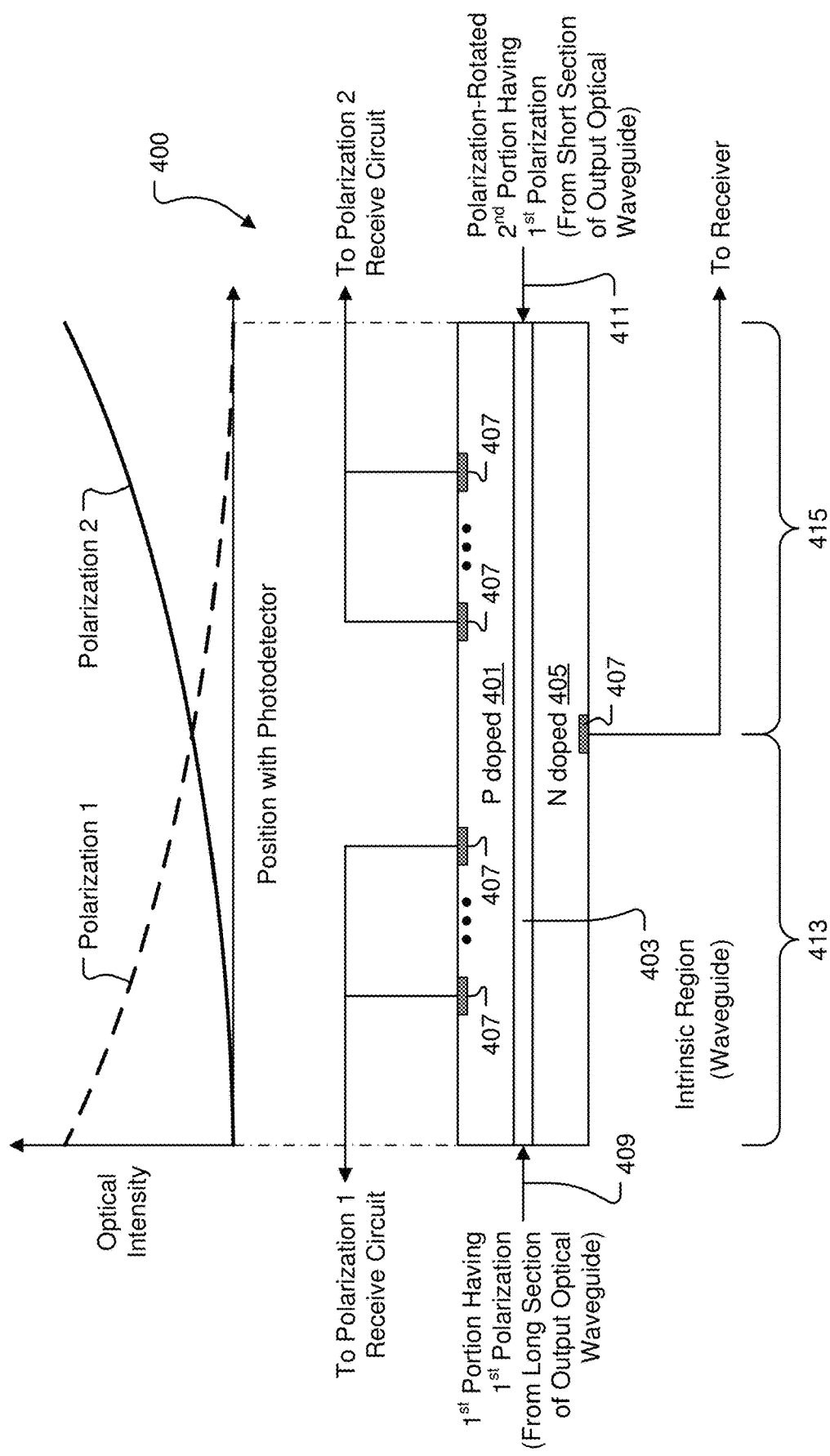
FIG. 4 shows a diagram of an example linear photodetector, in accordance with some embodiments.

FIG. 4 shows a diagram of an example linear photodetector 400, in accordance with some embodiments. In some embodiments, a separate instance of the linear photodetector 400 is used for each of the photodetectors 305-1 to 305-3 in the electro-optic receiver 300. The linear photodetector 400 is shown as a PIN type of photodetector that includes a P doped region 401, an intrinsic region 403, and an N doped region 405. The intrinsic region 403 is positioned between the P doped region 401 and the N doped region 405. In some embodiments, the P doped region 401 and the N doped region 405 are switched. In some embodiments, the intrinsic region 403 is an optical waveguide through which light that is to be detected is directed. In some embodiments, at least a portion of the P doped region 401 and at least a portion of the N doped region 405 is formed within the optical waveguide. During operation the photodetector 400 is reverse-biased so that charge carriers generated by photo-absorption within the intrinsic region 403 are swept into electrical contacts 407 connected along the length of the photodetector 400.

The linear photodetector 400 enables the incoming light from each polarization to be detected independently. More specifically, the first portion of the incoming light having the first polarization is input through a first end of the photodetector 400, and the polarization-rotated second portion of the incoming light having the first polarization (but corresponding to the incoming light that had the second polarization) is input through a second end of the photodetector 400. Due to photo-absorption along the length of the linear photodetector 400, the intensity of the first portion of the incoming light having the first polarization as input through the first end of the photodetector 400 decays exponentially in accordance with the photo-absorption coefficient as the light travels along the length of the photodetector 400 in the first direction, as indicated by arrow 409. Similarly, the intensity of the polarization-rotated second portion of the incoming light having the first polarization as input through the second end of the photodetector 400 decays exponentially in accordance with the photo-absorption coefficient as the light travels along the length of the photodetector 400 in the second direction, as indicated by arrow 411. Therefore, a majority of the first portion of the incoming light having the first polarization is absorbed within a first half 413 of the linear photodetector 400, and a majority of polarization-rotated second portion of the incoming light having the first polarization is absorbed within a second half 415 of the linear photodetector 400. In some embodiments, the electrical contacts 407 along the first half 413 of the photodetector 400 are segmented and connected to a first reverse-biasing circuit and a first receive circuit, and the electrical contacts 407 along the second half 415 of the photodetector 400 are segmented and connected to a second reverse-biasing circuit and a second receive circuit. In these embodiments, comparison of the photocurrent measured by the first receive circuit to the photocurrent measured by the second receive circuit provides for determination of the relative optical power split between different polarizations within the incoming optical signal, given that the polarization-rotated second portion of the incoming signal actually corresponds to the second polarization within the incoming optical signal.

The electro-optic receiver 300 of FIG. 3 represents an embodiment in which the input optical fiber/waveguide 152 transmits an input optical signal with no polarization control into the PIC 302. The optical coupler 153 couples the incoming light of the input optical signal onto the waveguide 155 on the chip. In some embodiments, the PSR 156 splits the input optical signal polarizations and transmits the two polarizations into two separate waveguides within the PSR 156. One of these two waveguides within the PSR 156 passes through a polarization rotator, so that its polarization is rotated into the same state as the other waveguide within the PSR 156. The two waveguides within the PSR 156 are optically connected to the first end 157A and the second end 157B, respectively, of the optical waveguide 157 (loop) which is evanescently coupled to the ring resonators 301-1 to 301-3. In some embodiments, the ring resonators 301-1 to 301-3 are respectively replaced by passive ring filters. Each of the ring resonators 301-1 to 301-3 (or passive ring filters) is designed to route the light from a single wavelength channel, within a narrow wavelength range, to the corresponding output optical waveguide 303-1 to 303-3 that is optically connected to the corresponding photodetector 305-1 to 305-3 (e.g., linear photodetector 400).

In the electro-optic receiver 300 of FIG. 3, light that is coupled from the optical waveguide 157 into the ring resonator 301-1 to 301-3 (or passive ring filter) from the right (light traveling from the second end 157B toward the first end 157A of the optical waveguide 157) is routed clockwise through the ring resonator 301-1 to 301-3 (or passive ring filter) and is coupled into the coupling section 303A-1 to 303A-3 of the corresponding output optical waveguide 303-1 to 303-3, where it passes through the short section 303B-1 to 303B-3 of the corresponding output optical waveguide 303-1 to 303-3 and into the second end of the photodetector 305-1 to 305-3. Conversely, light that is coupled from the optical waveguide 157 into the ring resonator 301-1 to 301-3 (or passive ring filter) from the left (light traveling from the first end 157A toward the second end 157B of the optical waveguide 157) is routed counter-clockwise through the ring resonator 301-1 to 301-3 (or passive ring filter) and is coupled into the coupling section 303A-1 to 303A-3 of the corresponding output optical waveguide 303-1 to 303-3, where it passes through the long section 303C-1 to 303C-3 of the corresponding output optical waveguide 303-1 to 303-3 and into the first end of the photodetector 305-1 to 305-3. The long section 303C-1 to 303C-3 of the output optical waveguide 303-1 to 303-3 functions as an optical delay line. The long section 303C-1 to 303C-3 of the output optical waveguide 303-1 to 303-3 is defined so that the two polarizations of the incoming optical signal from a given wavelength channel in the optical fiber/waveguide 152 (after splitting, polarization rotation, and waveguide routing), enter a given photodetector 305-1 to 305-3 (defined as the linear photodetector 400) from opposite directions at about the same time, which reduces timing-skew between the two polarizations of the incoming optical signal at the given photodetector 305-1 to 305-3 and correspondingly makes electronic timing-skew management possible (or easier) to implement, and may eliminate the need for timing-skew management altogether.

Additionally, in some embodiments of the electro-optic receiver 300 of FIG. 3, the photocurrent from a given photodetector 305-1 to 305-3 is used as a feedback signal to control alignment between the resonant wavelength of the corresponding ring resonator 301-1 to 301-3 and the wavelength of a given data channel in the incoming optical signal. For example, in some embodiments, the electro-optic receiver 300 includes a control circuit that tunes the ring resonance wavelength of the ring resonator 301-1 to 301-3 using a thermal tuner and/or a diode built into the ring resonator 301-1 to 301-3, in order to optimize the optical power reaching the photodetector 305-1 to 305-3. Also, in some embodiments, the electro-optic receiver 300 includes the VOA 163, as described with regard to the electro-optic receiver 150 of FIG. 1B, for use at startup of the electro-optic receiver 300.

Figure 5:
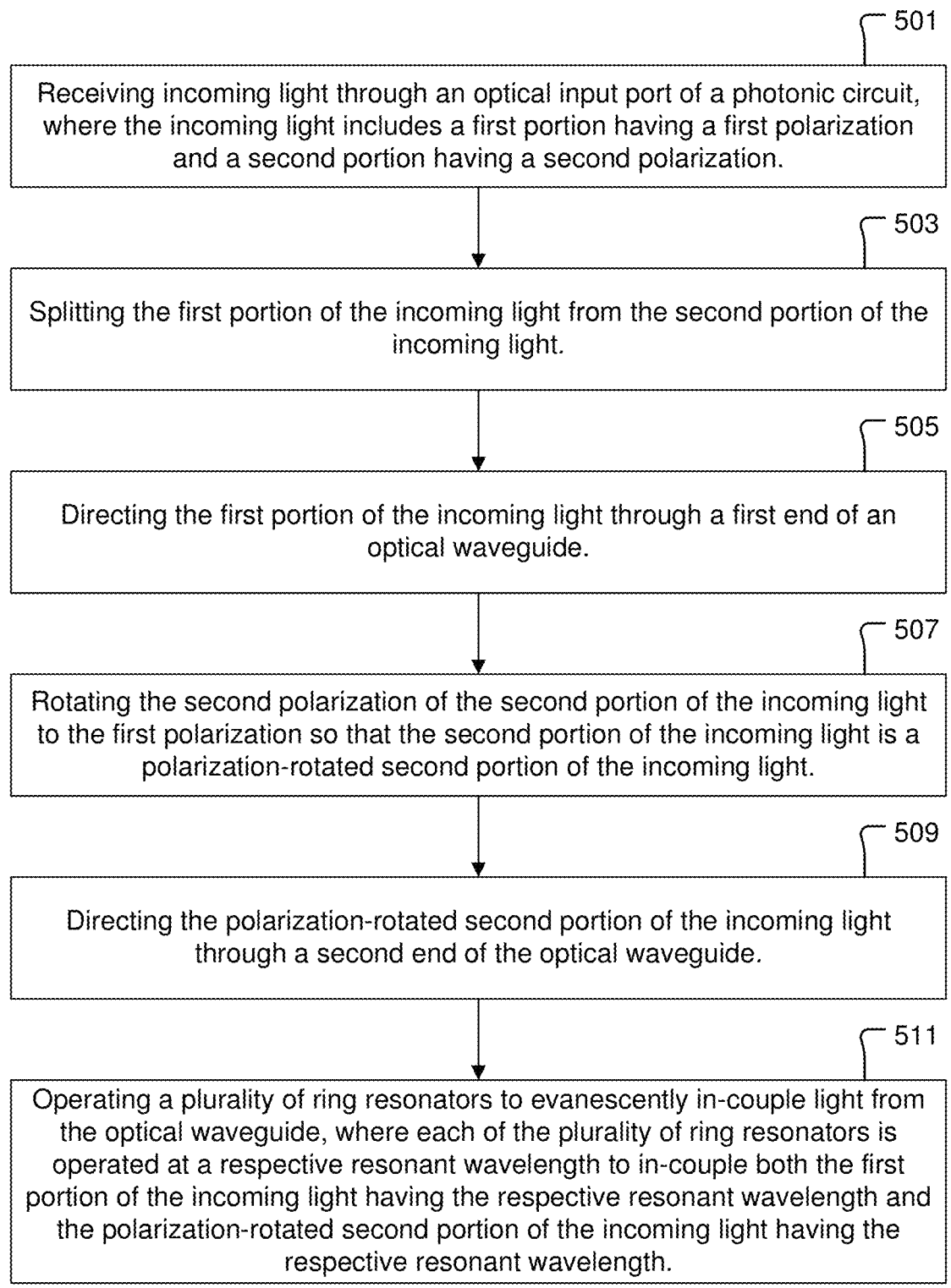
FIG. 5 shows a flowchart of a method for operating a photonic circuit, in accordance with some embodiments.

FIG. 5 shows a flowchart of a method for operating a photonic circuit, in accordance with some embodiments. In some embodiments, the method of FIG. 5 is practiced using the electro-optic receivers 150 and/or 300. The method includes an operation 501 for receiving incoming light through an optical input port of the photonic circuit. A first portion of the incoming light has a first polarization and a second portion of the incoming light has a second polarization. The method also includes an operation 503 for splitting the first portion of the incoming light from the second portion of the incoming light, such as by using the PSR 156. The method also includes an operation 505 for directing the first portion of the incoming light through a first end of an optical waveguide, such as the through the first end 157A of the optical waveguide 157. The method also includes an operation 507 for rotating the second polarization of the second portion of the incoming light to the first polarization so that the second portion of the incoming light is a polarization-rotated second portion of the incoming light, such as done by the PSR 156. The method also includes an operation 509 for directing the polarization-rotated second portion of the incoming light through a second end of the optical waveguide, such as the through the second end 157B of the optical waveguide 157, where the optical waveguide 157 extends in a continuous manner from the first end 157A to the second end 157B. In some embodiments, the operations 503, 505, 507, and 509 are done is an essentially simultaneous manner. The method also includes an operation 511 for operating a plurality of ring resonators, e.g., 161-1 to 161-6 and 301-1 to 301-3, to evanescently in-couple light from the optical waveguide 157, wherein each of the plurality of ring resonators is operated at a respective resonant wavelength to in-couple both the first portion of the incoming light having the respective resonant wavelength and the polarization-rotated second portion of the incoming light having the respective resonant wavelength.

In some embodiments, the method also includes transmitting the first portion of the incoming light and the second portion of the incoming light through a variable optical attenuator, such as the VOA 163, and controlling the variable optical attenuator to attenuate an optical power of first portion of the incoming light and the second portion of the incoming light during a time when the plurality of ring resonators, e.g., 161-1 to 161-6 and 301-1 to 301-3, are being tuned to their respective resonant wavelengths. In these embodiments, the method also includes controlling the variable optical attenuator to not attenuate the optical power of first portion of the incoming light and the second portion of the incoming light during a time when the plurality of ring resonators are operating at their respective resonant wavelengths, e.g., during normal operation.

In some embodiments, each of the plurality of ring resonators, e.g., 161-1 to 161-6, includes a respective photodetector. In some embodiments, the method includes optically coupling light from each of the plurality of ring resonators, e.g., 301-1 to 301-3, into a corresponding one of a plurality of output optical waveguides, e.g., 303-1 to 303-3, such that the first portion of the incoming light is transmitted through a long section, e.g., 303C-1 to 3030C-3, of the corresponding one of the plurality of output optical waveguides, and such that the polarization-rotated second portion of the incoming light is transmitted through a short section, e.g., 303B-1 to 303B-3, of the corresponding one of the plurality of output optical waveguides. In these embodiments, the method also includes operating a photodetector, e.g., 305-1 to 305-3, to detect the first portion of the incoming light at an output end of the long section of the corresponding one of the plurality of output optical waveguides, and to detect the polarization-rotated second portion of the incoming light at an output end of the short section of the corresponding one of the plurality of output optical waveguides.

Figure 6:
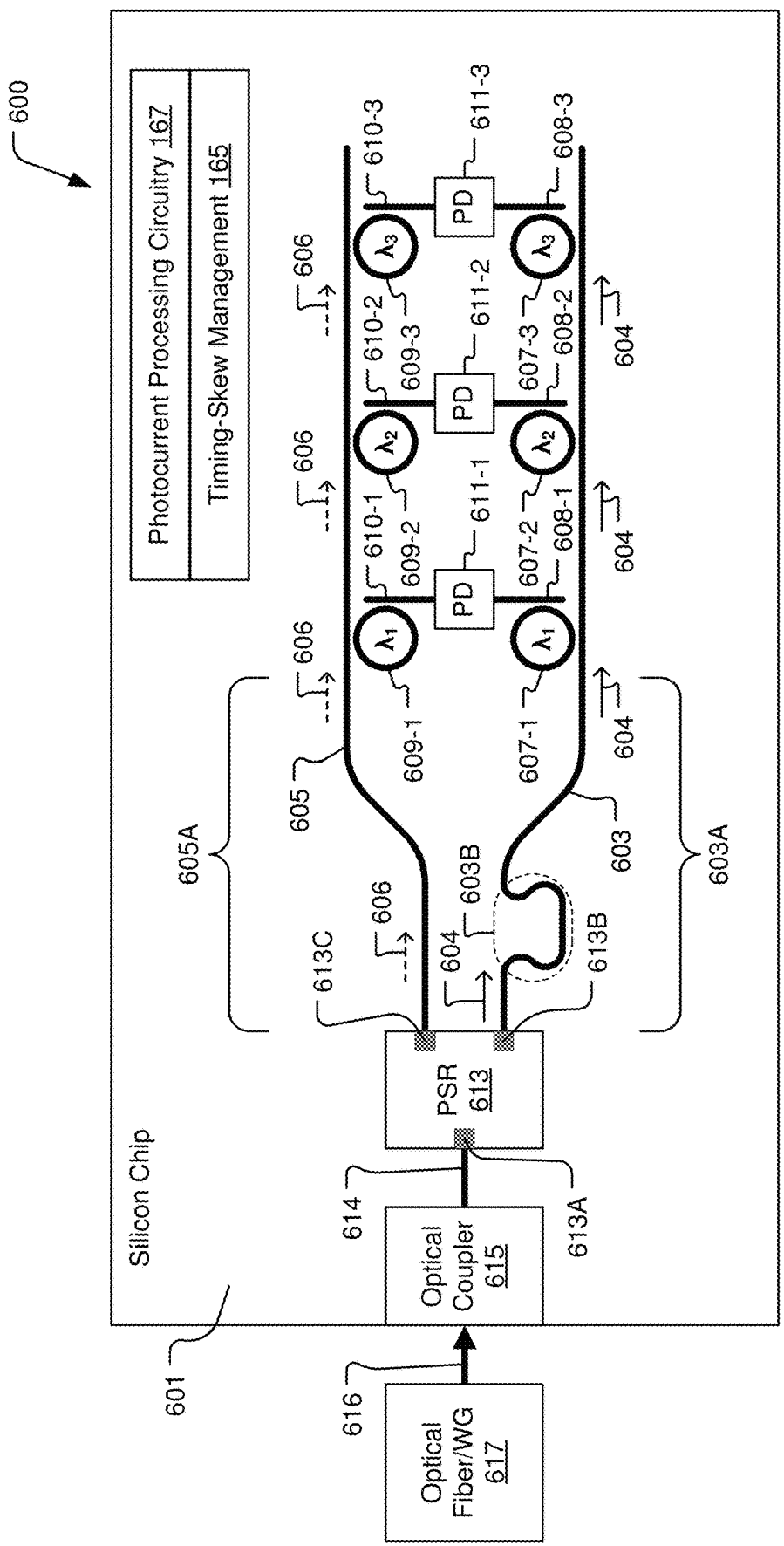
FIG. 6 shows an example configuration of an electro-optic receiver implemented within a PIC, in accordance with some embodiments.

FIG. 6 shows an example configuration of an electro-optic receiver 600 implemented within a PIC 601, in accordance with some embodiments. The electro-optic receiver 600 includes a PSR 613 that has an optical input 613A optically connected to receive incoming light from an optical coupler 615, by way of an optical waveguide 614. In some embodiments, the optical input 613A of the PSR 156 is directly optically coupled to the optical coupler 615, such that the optical waveguide 155 is not required. In some embodiments, the optical coupler 615 is implemented as an edge coupler. However, in other embodiments, the optical coupler 615 is implemented as a vertical grating coupler, or as another type of optical coupling device that provides for optical coupling of the PIC 601 to an optical fiber/waveguide 617. Incoming light is transmitted from the optical fiber/waveguide 617 into the optical coupler 615, as indicated by arrow 616. The PSR 613 has a first optical output 613B and a second optical output 613C. The PSR 613 is configured to direct a first portion of the incoming light having a first polarization (TE or TM) through the first optical output 613B. The PSR 613 is also configured to rotate a polarization of a second portion of the incoming light from a second polarization (opposite of the first polarization) to the first polarization. In this manner, the PSR 613 turns the second portion of the incoming light into a polarization-rotated second portion of the incoming light. The PSR 613 is configured to direct the polarization-rotated second portion of the incoming light through the second optical output 613C.

The electro-optic receiver 600 includes a first optical waveguide 603 optically connected to the first optical output 613B of the PSR 613. The electro-optic receiver 600 also includes a second optical waveguide 605 optically connected to the second optical output 613C of the PSR 613. In the electro-optic receiver 600, the first optical waveguide 603 and the second optical waveguide 605 are not optically connected/coupled to each other. The first optical waveguide 603 and the second optical waveguide 605 are formed of a material through which light can be in-coupled, out-coupled, and guided. Each of the first optical waveguide 603 and the second optical waveguide 605 is formed within a surrounding material that has an optical index of refraction sufficiently different from that of the first optical waveguide 603 and the second optical waveguide 605, respectively, to enable guiding of light within the first optical waveguide 603 and the second optical waveguide 605. In some embodiments, first optical waveguide 603 and the second optical waveguide 605 are formed of a same material. The first portion of the incoming light is transmitted through the first optical output 613B of the PSR 613 and into the first optical waveguide 603, and travels along the first optical waveguide 603, as indicated by arrows 604. The polarization-rotated second portion of the incoming light is transmitted through the second optical output 613C of the PSR 613 and into the second optical waveguide 605, and travels along the second optical waveguide 605, as indicated by arrows 606.

The electro-optic receiver 600 includes a first plurality of ring resonators 607-1 to 607-3 positioned along the first optical waveguide 603 and within an evanescent optical coupling distance of the first optical waveguide 603. While the example electro-optic receiver 600 shows three ring resonators 607-1 to 607-3 for purposes of description, it should be understood that there is no limit on the number of the first plurality of ring resonators that can be positioned along the first optical waveguide 603, so long as the first plurality of ring resonators and associated signal processing circuitry can be spatially and electrically accommodated on the chip. Each of the ring resonators 607-1 to 607-3 is configured to operate at a respective resonant wavelength $\lambda_1$ to $\lambda_3$, such that the first portion of the incoming light having a wavelength ($\lambda_1$, $\lambda_2$, or $\lambda_3$) substantially equal to the respective resonant wavelength ($\lambda_1$, $\lambda_2$, or $\lambda_3$) of a given one of the ring resonators 607-1 to 607-3 optically couples into the given one of the ring resonators 607-1 to 607-3. In some embodiments, the ring resonators 607-1 to 607-3 are implemented as annular-shaped waveguides having circuitous configuration, e.g., circular, oval, race-track, or another arbitrary circuitous shape. In some embodiments, the ring resonators 607-1 to 607-3 are implemented as circular discs. The ring resonators 607-1 to 607-3 are formed of a material through which light can be in-coupled, out-coupled, and guided. Each of the ring resonators 607-1 to 607-3 is formed within a surrounding material that has an optical index of refraction sufficiently different from that of the ring resonators 607-1 to 607-3 to enable guiding of light within the ring resonators 607-1 to 607-3 and around the circuitous path defined by each of the ring resonators 607-1 to 607-3. In some embodiments, each of the ring resonators 607-1 to 607-3 is configured to have an annular-shape or disc-shape with an outer diameter of less than about 50 micrometers. In some embodiments, each of the ring resonators 607-1 to 607-3 is configured to have an annular-shape or disc-shape with an outer diameter of less than about 10 micrometers.

The electro-optic receiver 600 includes a second plurality of ring resonators 609-1 to 609-3 positioned along the second optical waveguide 605 and within an evanescent optical coupling distance of the second optical waveguide 605. While the example electro-optic receiver 600 shows three ring resonators 609-1 to 609-3 for purposes of description, it should be understood that there is no limit on the number of the second plurality of ring resonators that can be positioned along the second optical waveguide 605, so long as the second plurality of ring resonators and associated signal processing circuitry can be spatially and electrically accommodated on the chip. Each of the ring resonators 609-1 to 609-3 is configured to operate at a respective resonant wavelength $\lambda_1$ to $\lambda_3$, such that the polarization-rotated second portion of the incoming light having a wavelength ($\lambda_1$, $\lambda_2$, or $\lambda_3$) substantially equal to the respective resonant wavelength ($\lambda_1$, $\lambda_2$, or $\lambda_3$) of a given one of the ring resonators 609-1 to 609-3 optically couples into the given one of the ring resonators 609-1 to 609-3. The number of the second plurality of ring resonators 609-1 to 609-3 is equal to the number of the first plurality of ring resonators 607-1 to 607-3. Also, the respective resonant wavelengths ($\lambda_1$, $\lambda_2$, $\lambda_3$) of the ring resonators 609-1 to 609-3 substantially match the respective resonant wavelengths ($\lambda_1$, $\lambda_2$, $\lambda_3$) of the ring resonators 607-1 to 607-3. In some embodiments, the ring resonators 609-1 to 609-3 are implemented as annular-shaped waveguides having circuitous configuration, e.g., circular, oval, race-track, or another arbitrary circuitous shape. In some embodiments, the ring resonators 609-1 to 609-3 are implemented as circular discs. In some embodiments, each of the second plurality of ring resonators 609-1 to 609-3 is formed to have a same shape and size as the corresponding one (with respect to resonant wavelength ($\lambda_1$, $\lambda_2$, $\lambda_3$)) of the first plurality of ring resonators 607-1 to 607-3. The ring resonators 609-1 to 609-3 are formed of a material through which light can be in-coupled, out-coupled, and guided. Each of the ring resonators 609-1 to 609-3 is formed within a surrounding material that has an optical index of refraction sufficiently different from that of the ring resonators 609-1 to 609-3 to enable guiding of light within the ring resonators 609-1 to 609-3 and around the circuitous path defined by each of the ring resonators 609-1 to 609-3. In some embodiments, each of the second plurality of ring resonators 609-1 to 609-3 is formed of a same material as the corresponding one (with respect to resonant wavelength ($\lambda_1$, $\lambda_2$, $\lambda_3$)) of the first plurality of ring resonators 607-1 to 607-3. In some embodiments, each of the ring resonators 609-1 to 609-3 is configured to have an annular-shape or disc-shape with an outer diameter of less than about 50 micrometers. In some embodiments, each of the ring resonator resonators 609-1 to 609-3 is configured to have an annular-shape or disc-shape with an outer diameter of less than about 10 micrometers.

The electro-optic receiver 600 includes a first plurality of output optical waveguides 608-1 to 608-3 respectively positioned within an evanescent optical coupling distance of the first plurality of ring resonators 607-1 to 607-3. The electro-optic receiver 600 also includes a second plurality of output optical waveguides 610-1 to 610-3 respectively positioned within an evanescent optical coupling distance of the second plurality of ring resonators 609-1 to 609-3. The electro-optic receiver 600 also includes a plurality of photodetectors 611-1 to 611-3. Each of the photodetectors 611-1 to 611-3 is optically connected to receive light from a respective one of the first plurality of output optical waveguides 608-1 to 608-3 and from a respective one of the second plurality of output optical waveguides 610-1 to 610-3, where the respective one of the first plurality of output optical waveguides 608-1 to 608-3 is optically coupled to one of the first plurality of ring resonators 607-1 to 607-3 having a given resonant wavelength ($\lambda_1$, $\lambda_2$, or $\lambda_3$), and where the respective one of the second plurality of output optical waveguides 610-1 to 610-3 is optically coupled to one of the second plurality of ring resonators 609-1 to 609-3 having the given resonant wavelength ($\lambda_1$, $\lambda_2$, or $\lambda_3$). In this manner, each of the photodetectors 611-1 to 611-3 receives incoming light of the substantially same wavelength from a corresponding one of the first plurality of output optical waveguides 608-1 to 608-3 and from a corresponding one of the second plurality of output optical waveguides 610-1 to 610-3.

In some embodiments, each of the photodetectors 611-1 to 611-3 is configured like the linear photodetector described with regard to FIG. 4, such that the corresponding one of the first plurality of output optical waveguides 608-1 to 608-3 is connected to one end of the photodetector 611-1 to 611-3, and the corresponding one of the second plurality of output optical waveguides 610-1 to 610-3 is connected to the other end of the photodetector 611-1 to 611-3. In this manner, the photodetector 611-1 to 611-3 is configured to absorb a majority of the first portion of the incoming light (having the first polarization) in a first linear half of the photodetector 611-1 to 611-3, and absorb a majority of the polarization-rotated second portion of the incoming light (also having the first polarization) in a second linear half of the photodetector 611-1 to 611-3. In some embodiments, one or more electrical contacts (e.g., 407) positioned along the first linear half of the photodetector 611-1 to 611-3 are electrically connected to a first photocurrent detection circuit within the photocurrent processing circuitry 167, and one or more electrical contacts (e.g., 407) positioned along the second linear half of the photodetector 611-1 to 611-3 are electrically connected to a second photocurrent detection circuit within the photocurrent processing circuitry 167.

In some embodiments, the first optical waveguide 603 includes a first section 603A extending from the first optical output 613B of the PSR 613 to a nearest one (607-1) of the first plurality of ring resonators 607-1 to 607-3 to the PSR 613. Also, the second optical waveguide 605 includes a first section 605A extending from the second optical output 613C of the PSR 613 to a nearest one (609-1) of the second plurality of ring resonators 609-1 to 609-3 to the PSR 613. In these embodiments, either the first section 603A of the first optical waveguide 603 is longer than the first section 605A of the second optical waveguide 605, or the first section 605A of the second optical waveguide 605 is longer than the first section 603A of the first optical waveguide 603, in order to compensate for a timing delay between the first portion of the incoming light exiting the PSR 613 and the polarization-rotated second portion of the incoming light exiting the PSR 613, so as to minimize a timing-skew (timing difference) between optical coupling of the first portion of the incoming light into the first plurality of ring resonators 607-1 to 607-3 and optical coupling of the polarization-rotated second portion of the incoming light into corresponding ones (by wavelength) of the second plurality of ring resonators 609-1 to 609-3. In the example electro-optic receiver 600, the first section 603A of the first optical waveguide 603 includes a delay section 603B configured so that the optical path length through the first section 603A of the first optical waveguide 603 is longer than the optical path length through the first section 605A of the second optical waveguide 605. The delay section 603B is configured to compensate for the timing delay between the first portion of the incoming light exiting the PSR 613 and the polarization-rotated second portion of the incoming light exiting the PSR 613. The length of the first section 603A of the first optical waveguide 603 and the length of the first section 605A of the second optical waveguide 605 are defined to reduce a difference in arrival time of the first portion of the incoming light and the polarization-rotated second portion of the incoming light at a closest one (611-1) of the plurality of photodetectors 611-1 to 611-3 to the PSR 613. Also, in some embodiments, the electro-optic receiver 600 includes the timing-skew management system 165 to electronically compensate for a temporal difference in photocurrent generation by a given one of the plurality of photodetectors 611-1 to 611-3 caused by a difference between the arrival time of the first portion of the incoming light at the corresponding one of the plurality of photodetectors 607-1 to 607-3, respectively, and the arrival time of the polarization-rotated second portion of the incoming light at the corresponding one of the plurality of photodetectors 609-1 to 609-3, respectively.

In some embodiments of the electro-optic receiver 600, the two optical waveguides (603 and 605) are separately coupled to an array of passive ring filters (607-1 to 607-3 and 609-1 to 609-3, respectively). Each passive ring filter (607-1 to 607-3 and 609-1 to 609-3) is designed to route the light from a single wavelength channel ($\lambda_1$, $\lambda_2$, $\lambda_3$), within a narrow wavelength range, to a corresponding output waveguide (608-1 to 608-3, respectively, and 610-1 to 610-3, respectively) that is connected to a linear photodetector (611-1 to 611-3, respectively). The light routing within the electro-optic receiver 600 is designed so that the two polarizations of incoming light in a given wavelength channel as received through the optical coupler 615 are routed separately, through separate ring filters (607-1 to 607-3 and 609-1 to 609-3), into the same linear detector (611-1 to 611-3) from opposite directions. In some embodiments, an optical delay line (603B) may be added (for example, in the form of a longer section of waveguide) to one of the two optical waveguides (603, 605) in order to compensate for asymmetric delay between the first portion of the incoming light and the polarization-rotated second portion of the incoming light introduced by the PSR 613. The electronic timing-skew management system 165 can be implemented and operated to correct for any remaining timing-skew between the first portion of the incoming light and the polarization-rotated second portion of the incoming light introduced by the PSR 613. Also, because the first optical waveguide 603 is not optically connected to the second optical waveguide 605, the electro-optic receiver 600 does not require a VOA, such as previously described with regard to the VOA 163 in the electro-optic receiver 150 of FIG. 1B.

In some embodiments of the electro-optic receiver 600, the photocurrent from a given photodetector 611-1 to 611-3 is used as a feedback signal to control the alignment between the resonance wavelength ($\lambda_1$, $\lambda_2$, $\lambda_3$) of the pair of ring resonators (607-1 to 607-3 and 609-1 to 609-3) corresponding to the given photodetector 611-1 to 611-3 and the wavelength of the corresponding data wavelength channel of the incoming light as received through the optical coupler 615. For example, in some embodiments, a control circuit is used to tune the two the resonance wavelengths of the pair of ring resonators (607-1 to 607-3 and 609-1 to 609-3) corresponding to the given photodetector 611-1 to 611-3 to optimize optical power reaching the given photodetector 611-1 to 611-3. In some embodiments, the control circuit operates to control a thermal tuner (e.g., heater) implemented to control a temperature of the pair of ring resonators (607-1 to 607-3 and 609-1 to 609-3) corresponding to the given photodetector 611-1 to 611-3 to optimize optical power reaching the given photodetector 611-1 to 611-3. In some embodiments, the control circuit operates to control a diode built into the pair of ring resonators (607-1 to 607-3 and 609-1 to 609-3) corresponding to the given photodetector 611-1 to 611-3 to optimize optical power reaching the given photodetector 611-1 to 611-3.

Figure 7:
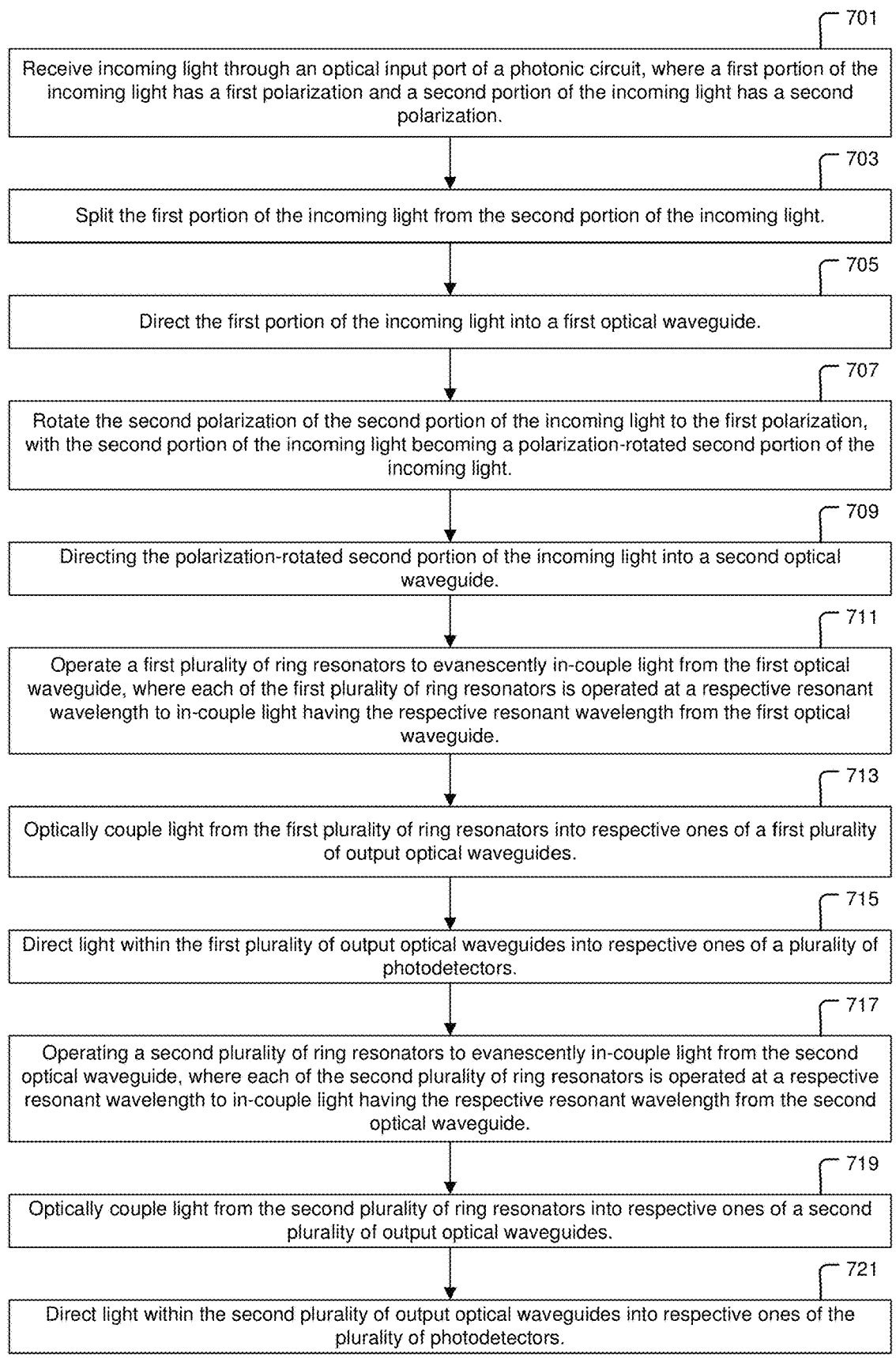
FIG. 7 shows a flowchart of a method for operating a photonic circuit, in accordance with some embodiments.

FIG. 7 shows a flowchart of a method for operating a photonic circuit, in accordance with some embodiments. In some embodiments, the method of FIG. 7 is practiced using the electro-optic receiver 600. The method includes an operation 701 for receiving incoming light through an optical input port (e.g., optical coupler 615) of the photonic circuit (e.g., PIC 601). A first portion of the incoming light has a first polarization and a second portion of the incoming light having a second polarization. The method also includes an operation 703 for splitting the first portion of the incoming light from the second portion of the incoming light. In some embodiments, the operation 703 is performed by the PSR 613. The method also includes an operation 705 for directing the first portion of the incoming light into a first optical waveguide (e.g., optical waveguide 603). The method also includes an operation 707 for rotating the second polarization of the second portion of the incoming light to the first polarization so that the second portion of the incoming light is a polarization-rotated second portion of the incoming light. In some embodiments, the operation 703 is performed by the PSR 613. The method also includes an operation 709 for directing the polarization-rotated second portion of the incoming light into a second optical waveguide (e.g., optical waveguide 605). The method also includes an operation 711 for operating a first plurality of ring resonators (e.g., ring resonators 607-1 to 607-3) to evanescently in-couple light from the first optical waveguide, where each of the first plurality of ring resonators is operated at a respective resonant wavelength to in-couple light having the respective resonant wavelength from the first optical waveguide. The method also includes an operation 713 for optically coupling light from the first plurality of ring resonators into respective ones of a first plurality of output optical waveguides (e.g., optical waveguides 608-1 to 608-3). The method also includes an operation 715 for directing light within the first plurality of output optical waveguides into respective ones of a plurality of photodetectors (e.g., photodetectors 611-1 to 611-3). The method also includes an operation 717 for operating a second plurality of ring resonators (e.g., ring resonators 609-1 to 609-3) to evanescently in-couple light from the second optical waveguide, where each of the second plurality of ring resonators is operated at a respective resonant wavelength to in-couple light having the respective resonant wavelength from the second optical waveguide. The method also includes an operation 719 for optically coupling light from the second plurality of ring resonators into respective ones of a second plurality of output optical waveguides (e.g., optical waveguides 610-1 to 610-3). The method also includes an operation 721 for directing light within the second plurality of output optical waveguides into respective ones of the plurality of photodetectors.

In some embodiments, the first optical waveguide includes an input section (e.g., 603A), and the second optical waveguide includes an input section (e.g., 605A), where either the input section of the first optical waveguide is longer than the input section of the second optical waveguide, or the input section of the second optical waveguide is longer than the input section of the first optical waveguide.

In these embodiments, the method includes defining a length of the input section of the first optical waveguide and a length of the input section of the second optical waveguide to reduce a difference in arrival time of the first portion of the incoming light and the polarization-rotated second portion of the incoming light at a given one of the plurality of photodetectors. In some embodiments, the method includes electronically compensating for a temporal difference in photocurrent generation by a given one of the plurality of photodetectors caused by a difference in arrival time of the first portion of the incoming light and the polarization-rotated second portion of the incoming light at the given one of the plurality of photodetectors. In some embodiments, the length of the input section of the first optical waveguide and the length of the input section of the second optical waveguide are defined to compensate for a temporal difference between directing the first portion of the incoming light into the first optical waveguide and directing the polarization-rotated second portion of the incoming light into the second optical waveguide.

In some embodiments, the each of the plurality of photodetectors used in the method is a linear photodetector (e.g., linear photodetector 400) that has a first end optically connected to a respective one of the first plurality of output optical waveguides and a second end optically connected to a respective one of the second plurality of output optical waveguides. In some of these embodiments, the method includes operating the linear photodetector to absorb a majority of the first portion of the incoming light in a first half of the linear photodetector, and absorb a majority of the polarization-rotated second portion of the incoming light in a second half of the linear photodetector. In some of these embodiments, the method includes operating a first photocurrent detection circuit to detect photocurrent generated within the first half of the linear photodetector, and operating a second photocurrent detection circuit to detect photocurrent generated within the second half of the linear photodetector. In this manner, the method provides for determination of how much optical power is conveyed into the linear photodetector from each of the first polarization and the second polarization of the original incoming optical signal. Correspondingly, in this manner, the method provides for determination of how much optical power was received in the original incoming optical signal in each of the first polarization and the second polarization.

Figure 8:
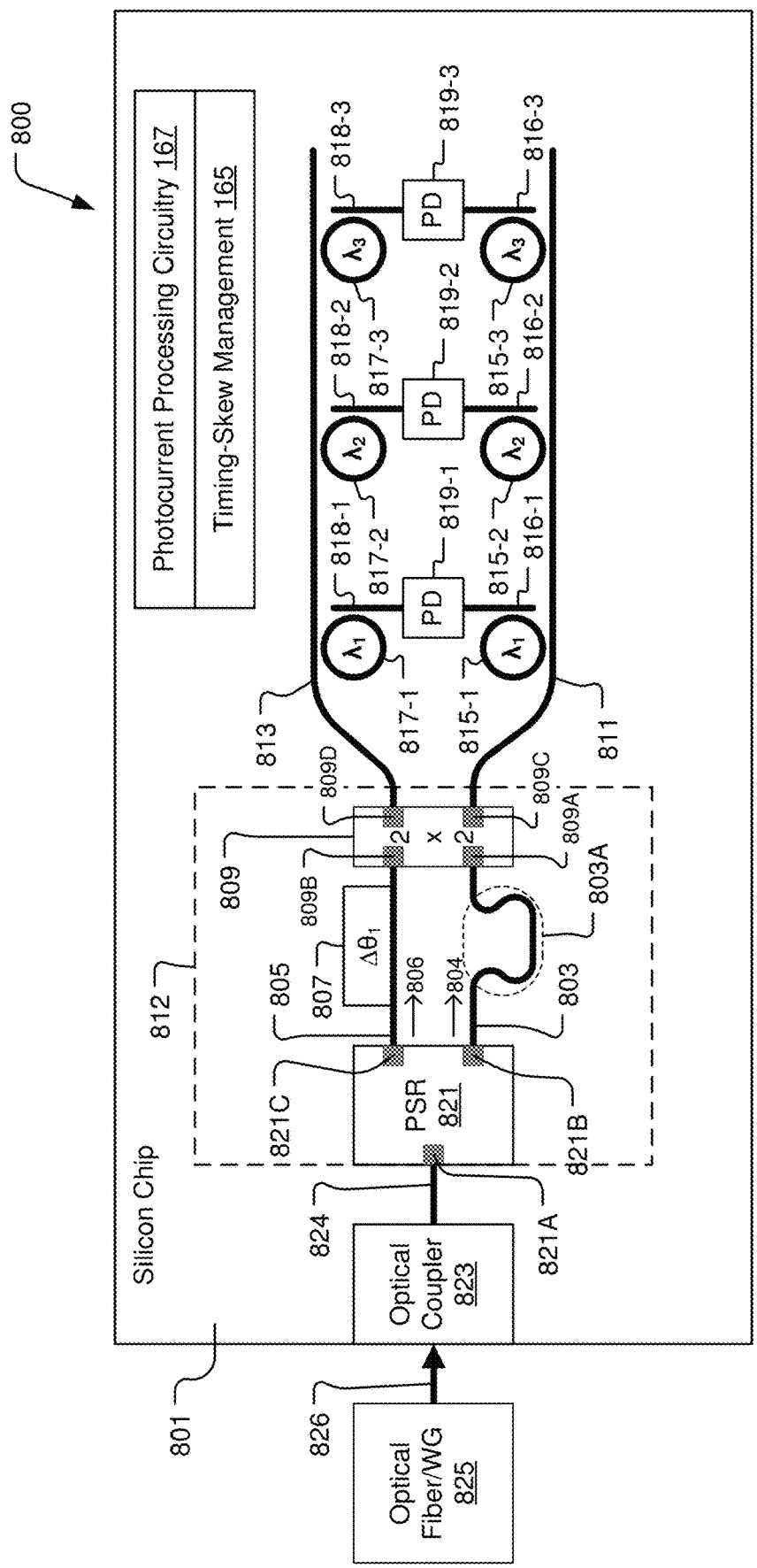
FIG. 8 shows an example configuration of an electro-optic receiver implemented within a PIC, in accordance with some embodiments.

FIG. 8 shows an example configuration of an electro-optic receiver 800 implemented within a PIC 801, in accordance with some embodiments. The electro-optic receiver 800 includes a PSR 821 that has an optical input 821A optically connected to receive incoming light from an optical coupler 823, by way of an optical waveguide 824. In some embodiments, the optical input 821A of the PSR 821 is directly optically coupled to the optical coupler 823, such that the optical waveguide 824 is not required. In some embodiments, the optical coupler 823 is implemented as an edge coupler. However, in other embodiments, the optical coupler 823 is implemented as a vertical grating coupler, or as another type of optical coupling device that provides for optical coupling of the PIC 801 to an optical fiber/waveguide 825. Incoming light is transmitted from the optical fiber/waveguide 825 into the optical coupler 823, as indicated by arrow 826. The PSR 821 has a first optical output 821B and a second optical output 821C. The PSR 821 is configured to direct a first portion of the incoming light having a first polarization (TE or TM) through the first optical output 821B. The PSR 821 is also configured to rotate a polarization of a second portion of the incoming light from a second polarization (opposite of the first polarization) to the first polarization. In this manner, the PSR 821 turns the second portion of the incoming light into a polarization-rotated second portion of the incoming light. The PSR 821 is configured to direct the polarization-rotated second portion of the incoming light through the second optical output 821C. In some embodiments, the first portion of the incoming light having a first polarization is transmitted through the second optical output 821C, and the polarization-rotated second portion of the incoming light is transmitted through the first optical output 821B.

The electro-optic receiver 800 includes a first optical waveguide 803 optically connected to the first optical output 821B of the PSR 821. The electro-optic receiver 800 also includes a second optical waveguide 805 optically connected to the second optical output 821C of the PSR 821. The first optical waveguide 803 and the second optical waveguide 805 are formed of a material through which light can be in-coupled, out-coupled, and guided. Each of the first optical waveguide 803 and the second optical waveguide 805 is formed within a surrounding material that has an optical index of refraction sufficiently different from that of the first optical waveguide 803 and the second optical waveguide 805, respectively, to enable guiding of light within the first optical waveguide 803 and the second optical waveguide 805. In some embodiments, first optical waveguide 803 and the second optical waveguide 805 are formed of a same material. In some embodiments, the first portion of the incoming light is transmitted through the first optical output 821B of the PSR 821 and into the first optical waveguide 803, and travels along the first optical waveguide 803, as indicated by arrow 804. Also, in these embodiments, the polarization-rotated second portion of the incoming light is transmitted through the second optical output 821C of the PSR 821 and into the second optical waveguide 805, and travels along the second optical waveguide 805, as indicated by arrow 806. Alternatively, in some embodiments, the first portion of the incoming light is transmitted through the second optical output 821C of the PSR 821 and into the second optical waveguide 805, and travels along the second optical waveguide 805, as indicated by arrow 806. Also, in these alternative embodiments, the polarization-rotated second portion of the incoming light is transmitted through the first optical output 821B of the PSR 821 and into the first optical waveguide 803, and travels along the first optical waveguide 803, as indicated by arrow 804.

The electro-optic receiver 800 also includes a two-by-two optical splitter 809 that has a first optical input 809A optically connected to the second end of the first optical waveguide 803. The two-by-two optical splitter 809 has a second optical input 809B optically connected to the second end of the second optical waveguide 805. The two-by-two optical splitter 809 has a first optical output 809C and a second optical output 809D. The two-by-two optical splitter 809 is configured to output some of the first portion of the incoming light and some of the polarization-rotated second portion of the incoming light through each of the first optical output 809C and the second optical output 809D of the two-by-two optical splitter 809. In some embodiments, the two-by-two optical splitter 809 is an even 50-50 optical splitter. However, in other embodiments, the two-by-two optical splitter 809 is not an even 50-50 optical splitter. The optical splitting ratio of the two-by-two optical splitter 809 defines how much optical power is transmitted to each of the first optical output 809C and the second optical output 809D from each of the first optical input 809A and the second optical input 809B. The optical splitting ratio provided by the two-by-two optical splitter 809 is set and/or controlled to ensure that very low optical power transmission through either the first optical output 809C or the second optical output 809D is avoided for any of the wavelength channels of the incoming light received through the first optical input 809A and the second optical input 809B. Also, in some embodiments, the two-by-two optical splitter 809 is a non-broadband optical splitter.

In some embodiments, a phase shifter 807 is optically coupled to either the first optical waveguide 803 or the second optical waveguide 805. The example electro-optic receiver 800 has the phase shifter 807 optically coupled to the second optical waveguide 805. In some embodiments, the phase shifter 807 is implemented as a thermal tuner (e.g., heating device) positioned over the second optical waveguide 805, which operates by exploiting the thermo-optic effect of the second optical waveguide 805 material. In some embodiments, the phase shifter 807 is implemented as an electro-optic device (e.g., diode) built into the second optical waveguide 805, which operates by exploiting electro-optic effects within the second optical waveguide 805. In some embodiments, the phase shifter 807 is implemented as one or more ring resonator phase shifters.

In these embodiments, either the first optical waveguide 803 is longer than the second optical waveguide 805, or the second optical waveguide 805 is longer than the first optical waveguide 803, in order to compensate for a timing delay between the first portion of the incoming light exiting the PSR 821 and the polarization-rotated second portion of the incoming light exiting the PSR 821, so as to minimize a timing-skew (timing difference) between arrival of the first portion of the incoming light into the two-by-two optical splitter 809 and arrival of the polarization-rotated second portion of the incoming light into the two-by-two optical splitter 809. In the example electro-optic receiver 800, the first optical waveguide 803 includes a delay section 803A configured so that the optical path length through the first optical waveguide 803 is longer than the optical path length through the second optical waveguide 805. The delay section 803A is configured to compensate for the timing delay between the first portion of the incoming light exiting the PSR 821 and the polarization-rotated second portion of the incoming light exiting the PSR 821. In some embodiments, the phase shifter 807 is optically coupled to a shorter one of the first optical waveguide 803 and the second optical waveguide 805.

In some embodiments, the delay section 803A is defined to compensate/minimize the timing-skew between arrival of the first portion of the incoming light and the polarization-rotated second portion of the incoming light at the two-by-two optical splitter 809 when the electro-optic receiver 800 is implemented to operate over a broad range of optical wavelengths, rather than just at a single optical wavelength. If a group delay difference between the two polarizations is not sufficiently compensated/minimized, a phase difference between the first portion of the incoming light in the first optical waveguide 803 and the polarization-rotated second portion of the incoming light in the second optical waveguide 805 will depend on the wavelength of the light, such that the single phase shifter 807 may not be able to set an appropriate phase for all wavelengths of interest. The delay section 803A is defined to ensure that the group delay difference between the two polarizations is sufficiently compensated/minimized so that the phase difference between the first portion of the incoming light in the first optical waveguide 803 and the polarization-rotated second portion of the incoming light in the second optical waveguide 805 does not vary as a function of the wavelength of the light, which allows the single phase shifter 807 to set an appropriate phase for all channel wavelengths of interest within the incoming optical signal received through the optical coupler 823. The combination of the PSR 821, the first optical waveguide 803 with the delay section 803A, the second optical waveguide 805, the two-by-two optical splitter 809, the phase shifter 807 constitutes a polarization equalizer 812.

The electro-optic receiver 800 includes a third optical waveguide 811 optically connected to the first optical output 809C of the two-by-two optical splitter 809. The electro-optic receiver 800 also includes a fourth optical waveguide 813 optically connected to the second optical output 809D of the two-by-two optical splitter 809. In the electro-optic receiver 800, the third optical waveguide 811 and the fourth optical waveguide 813 are not optically connected/coupled to each other. The third optical waveguide 811 and the fourth optical waveguide 813 are formed of a material through which light can be in-coupled, out-coupled, and guided. Each of the third optical waveguide 811 and the fourth optical waveguide 813 is formed within a surrounding material that has an optical index of refraction sufficiently different from that of the third optical waveguide 811 and the fourth optical waveguide 813, respectively, to enable guiding of light within the third optical waveguide 811 and the fourth optical waveguide 813. In some embodiments, third optical waveguide 811 and the fourth optical waveguide 813 are formed of a same material. Some of the first portion of the incoming light (having the first polarization) is directed/conveyed through the first optical output 809C of the two-by-two optical splitter 809 and into a third optical waveguide 811. Also, some of the first portion of the incoming light (having the first polarization) is directed/conveyed through the second optical output 809D of the two-by-two optical splitter 809 and into a fourth optical waveguide 813. Some of the polarization-rotated second portion of the incoming light (having the first polarization) is directed/conveyed through the first optical output 809C of the two-by-two optical splitter 809 and into the third optical waveguide 811. Also, some of the polarization-rotated second portion of the incoming light (having the first polarization) is directed/conveyed through the second optical output 809D of the two-by-two optical splitter 809 and into the fourth optical waveguide 813.

The electro-optic receiver 800 includes a first plurality of ring resonators 815-1 to 815-3 positioned along the third optical waveguide 811 and within an evanescent optical coupling distance of the third optical waveguide 811. While the example electro-optic receiver 800 shows three ring resonators 815-1 to 815-3 for purposes of description, it should be understood that there is no limit on the number of the first plurality of ring resonators that can be positioned along the third optical waveguide 811, so long as the first plurality of ring resonators and associated signal processing circuitry can be spatially and electrically accommodated on the chip. Each of the ring resonators 815-1 to 815-3 is configured to operate at a respective resonant wavelength $\lambda_1$ to $\lambda_3$, such that the first portion of the incoming light and the polarization-rotated second portion of the incoming light having a wavelength ($\lambda_1$, $\lambda_2$, or $\lambda_3$) substantially equal to the respective resonant wavelength ($\lambda_1$, $\lambda_2$, or $\lambda_3$) of a given one of the ring resonators 815-1 to 815-3 optically couples into the given one of the ring resonators 815-1 to 815-3 from the third optical waveguide 811. In some embodiments, the ring resonators 815-1 to 815-3 are implemented as annular-shaped waveguides having circuitous configuration, e.g., circular, oval, race-track, or another arbitrary circuitous shape. In some embodiments, the ring resonators 815-1 to 815-3 are implemented as circular discs. The ring resonators 815-1 to 815-3 are formed of a material through which light can be in-coupled, out-coupled, and guided. Each of the ring resonators 815-1 to 815-3 is formed within a surrounding material that has an optical index of refraction sufficiently different from that of the ring resonators 815-1 to 815-3 to enable guiding of light within the ring resonators 815-1 to 815-3 and around the circuitous path defined by each of the ring resonators 815-1 to 815-3. In some embodiments, each of the ring resonators 815-1 to 815-3 is configured to have an annular-shape or disc-shape with an outer diameter of less than about 50 micrometers. In some embodiments, each of the ring resonators 815-1 to 815-3 is configured to have an annular-shape or disc-shape with an outer diameter of less than about 10 micrometers.

The electro-optic receiver 800 includes a second plurality of ring resonators 817-1 to 817-3 positioned along the fourth optical waveguide 813 and within an evanescent optical coupling distance of the fourth optical waveguide 813. While the example electro-optic receiver 800 shows three ring resonators 817-1 to 817-3 for purposes of description, it should be understood that there is no limit on the number of the second plurality of ring resonators that can be positioned along the second optical waveguide 813, so long as the second plurality of ring resonators and associated signal processing circuitry can be spatially and electrically accommodated on the chip. Each of the ring resonators 817-1 to 817-3 is configured to operate at a respective resonant wavelength $\lambda_1$ to $\lambda_3$, such that the polarization-rotated second portion of the incoming light having a wavelength ($\lambda_1$, $\lambda_2$, or $\lambda_3$) substantially equal to the respective resonant wavelength ($\lambda_1$, $\lambda_2$, or $\lambda_3$) of a given one of the ring resonators 609-1 to 609-3 optically couples into the given one of the ring resonators 817-1 to 817-3 from the fourth optical waveguide 813. The number of the second plurality of ring resonators 817-1 to 817-3 is equal to the number of the first plurality of ring resonators 815-1 to 815-3. Also, the respective resonant wavelengths ($\lambda_1$, $\lambda_2$, $\lambda_3$) of the ring resonators 817-1 to 817-3 substantially match the respective resonant wavelengths ($\lambda_1$, $\lambda_2$, $\lambda_3$) of the ring resonators 815-1 to 815-3. In some embodiments, the ring resonators 817-1 to 817-3 are implemented as annular-shaped waveguides having circuitous configuration, e.g., circular, oval, race-track, or another arbitrary circuitous shape. In some embodiments, the ring resonators 817-1 to 817-3 are implemented as circular discs. In some embodiments, each of the second plurality of ring resonators 817-1 to 817-3 is formed to have a same shape and size as the corresponding one (with respect to resonant wavelength ($\lambda_1$, $\lambda_2$, $\lambda_3$)) of the first plurality of ring resonators 815-1 to 815-3. The ring resonators 817-1 to 817-3 are formed of a material through which light can be in-coupled, out-coupled, and guided. Each of the ring resonators 817-1 to 817-3 is formed within a surrounding material that has an optical index of refraction sufficiently different from that of the ring resonators 817-1 to 817-3 to enable guiding of light within the ring resonators 817-1 to 817-3 and around the circuitous path defined by each of the ring resonators 817-1 to 817-3. In some embodiments, each of the second plurality of ring resonators 817-1 to 817-3 is formed of a same material as the corresponding one (with respect to resonant wavelength ($\lambda_1$, $\lambda_2$, $\lambda_3$)) of the first plurality of ring resonators 815-1 to 815-3. In some embodiments, each of the ring resonators 817-1 to 817-3 is configured to have an annular-shape or disc-shape with an outer diameter of less than about 50 micrometers. In some embodiments, each of the ring resonators 817-1 to 817-3 is configured to have an annular-shape or disc-shape with an outer diameter of less than about 10 micrometers.

The electro-optic receiver 800 includes a first plurality of output optical waveguides 816-1 to 816-3 respectively positioned within an evanescent optical coupling distance of the first plurality of ring resonators 815-1 to 815-3. The electro-optic receiver 800 also includes a second plurality of output optical waveguides 818-1 to 818-3 respectively positioned within an evanescent optical coupling distance of the second plurality of ring resonators 817-1 to 817-3. The electro-optic receiver 800 also includes a plurality of photodetectors 819-1 to 819-3. Each of the photodetectors 819-1 to 819-3 is optically connected to receive light from a respective one of the first plurality of output optical waveguides 816-1 to 816-3 and from a respective one of the second plurality of output optical waveguides 818-1 to 818-3, where the respective one of the first plurality of output optical waveguides 816-1 to 816-3 is optically coupled to one of the first plurality of ring resonators 815-1 to 815-3 having a given resonant wavelength ($\lambda_1$, $\lambda_2$, or $\lambda_3$), and where the respective one of the second plurality of output optical waveguides 818-1 to 818-3 is optically coupled to one of the second plurality of ring resonators 817-1 to 817-3 having the same given resonant wavelength ($\lambda_1$, $\lambda_2$, or $\lambda_3$). In this manner, each of the photodetectors 819-1 to 819-3 receives incoming light of the substantially same wavelength from a corresponding one of the first plurality of output optical waveguides 816-1 to 816-3 and from a corresponding one of the second plurality of output optical waveguides 818-1 to 818-3.

In some embodiments, each of the photodetectors 819-1 to 819-3 is configured like the linear photodetector described with regard to FIG. 4, such that the corresponding one of the first plurality of output optical waveguides 816-1 to 816-3 is connected to one end of the photodetector 819-1 to 819-3, and the corresponding one of the second plurality of output optical waveguides 818-1 to 818-3 is connected to the other end of the photodetector 819-1 to 819-3. In this manner, the photodetector 819-1 to 819-3 is configured to absorb a majority of the first portion of the incoming light (having the first polarization) in a first linear half of the photodetector 819-1 to 819-3, and absorb a majority of the polarization-rotated second portion of the incoming light (also having the first polarization) in a second linear half of the photodetector 819-1 to 819-3. In some embodiments, one or more electrical contacts (e.g., 407) positioned along the first linear half of the photodetector 819-1 to 819-3 are electrically connected to a first photocurrent detection circuit within the photocurrent processing circuitry 167, and one or more electrical contacts (e.g., 407) positioned along the second linear half of the photodetector 819-1 to 819-3 are electrically connected to a second photocurrent detection circuit within the photocurrent processing circuitry 167. Also, in some embodiments, the electro-optic receiver 800 includes the timing-skew management system 165 to electronically compensate for a temporal difference in photocurrent generation by a given one of the plurality of photodetectors 819-1 to 819-3 caused by a difference between the arrival time of the first portion of the incoming light at the corresponding one of the plurality of photodetectors 819-1 to 819-3, respectively, and the arrival time of the polarization-rotated second portion of the incoming light at the corresponding one of the plurality of photodetectors 819-1 to 819-3, respectively.

The electro-optic receiver 800 addresses a possible problematic situation in which either the first optical waveguide 803 or the second optical waveguide 805 conveys very little light due to most or all of the incoming light, as received through the optical coupler 823, having one polarization (either mostly TE or mostly TM). In this situation, if the two-by-two optical splitter 809 were not implemented, it would be very difficult for any ring tuning algorithm to keep the operating resonant wavelengths of the ring resonators 815-1 to 815-3 and 817-1 to 817-3 aligned with the corresponding channel wavelengths, respectively, in the incoming light signal, as received through the optical coupler 823. Also, the above-mentioned situation is even more problematic when the polarization in the optical fiber/waveguide 825 evolves over time, because the ring resonators 815-1 to 815-3 and 817-1 to 817-3 will have to re-lock to the channel wavelengths as the optical power ramps up. If the ring resonators 815-1 to 815-3 and 817-1 to 817-3 have to re-lock to changing channel wavelengths, an interruption will occur in the data signal output by the electro-optic receiver 800. To address the above-mentioned situation, the electro-optic receiver 800 implements the two-by-two optical splitter 809 and the phase shifter 807 to ensure non-negligible optical power in each of the third optical waveguide 811 and the fourth optical waveguide 813 before the light reaches the ring resonators 815-1 to 815-3 and 817-1 to 817-3. The two-by-two optical splitter 809 ensures that each of the third optical waveguide 811 and the fourth optical waveguide 813 conveys enough light of the first polarization to ensure that the ring resonators 815-1 to 815-3 and 817-1 to 817-3 can lock onto and maintain respective resonant wavelengths that substantially align with the channel wavelengths in the incoming light signal. In some embodiments, the phase shifter 807 uses active control as the polarization in the optical fiber/waveguide 825 drifts over time. The active control of the phase shifter 807 is implemented by active control circuitry (feedback circuitry 1015). For example, in some embodiments, active control of the phase shifter 807 is implemented by active control circuitry that measures optical power in the ring resonators 815-1 to 815-3 and 817-1 to 817-3, and uses that measured optical power as feedback signals to adjust the operation of the phase shifter 807 as needed to track with the polarization in the optical fiber/waveguide 825.

Figure 9:
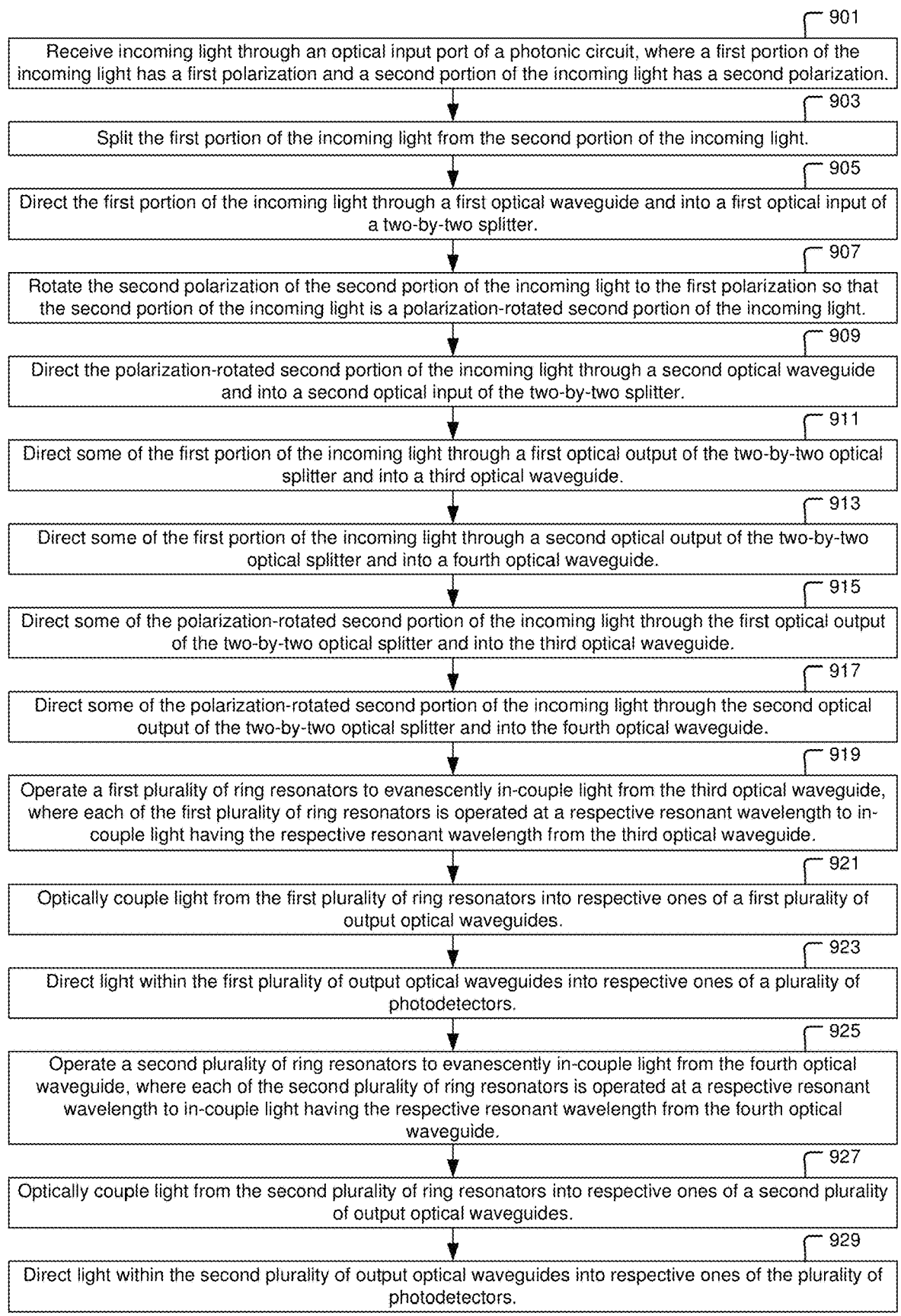
FIG. 9 shows a flowchart of a method for operating a photonic integrated circuit, in accordance with some embodiments.

FIG. 9 shows a flowchart of a method for operating a photonic integrated circuit, in accordance with some embodiments. In some embodiments, the method of FIG. 9 is practiced using the electro-optic receiver 800. The method includes an operation 901 for receiving incoming light through an optical input port (e.g., optical coupler 823) of the photonic circuit (e.g., PIC 801). A first portion of the incoming light has a first polarization and a second portion of the incoming light has a second polarization. The method also includes an operation 903 for splitting the first portion of the incoming light from the second portion of the incoming light. In some embodiments, the operation 903 is performed by the PSR 821. The method also includes an operation 905 for directing the first portion of the incoming light through a first optical waveguide (e.g., optical waveguide 803) and into a first optical input (e.g., 809A) of a two-by-two splitter (e.g., 809). In some embodiments, the operation 905 is performed by the PSR 821. The method also includes an operation 907 for rotating the second polarization of the second portion of the incoming light to the first polarization so that the second portion of the incoming light is a polarization-rotated second portion of the incoming light. In some embodiments, the operation 907 is performed by the PSR 821. The method also includes an operation 909 for directing the polarization-rotated second portion of the incoming light through a second optical waveguide (e.g., optical waveguide 805) and into a second optical input (e.g., 809B) of the two-by-two splitter. In some embodiments, the operation 909 is performed by the PSR 821. The method also includes an operation 911 for directing some of the first portion of the incoming light through a first optical output (e.g., 809C) of the two-by-two optical splitter and into a third optical waveguide (e.g., optical waveguide 811). The method also includes an operation 913 for directing some of the first portion of the incoming light through a second optical output (e.g., 809D) of the two-by-two optical splitter and into a fourth optical waveguide (e.g., optical waveguide 813). The method also includes an operation 915 for directing some of the polarization-rotated second portion of the incoming light through the first optical output of the two-by-two optical splitter and into the third optical waveguide. The method also includes an operation 917 for directing some of the polarization-rotated second portion of the incoming light through the second optical output of the two-by-two optical splitter and into the fourth optical waveguide. In some embodiments, the operations 911 through 917 are performed by the two-by-two optical splitter 809.

The method of FIG. 9 also includes an operation 919 for operating a first plurality of ring resonators (e.g., ring resonators 815-1 to 815-3) to evanescently in-couple light from the third optical waveguide, where each of the first plurality of ring resonators is operated at a respective resonant wavelength to in-couple light having the respective resonant wavelength from the third optical waveguide. The method also includes an operation 921 for optically coupling light from the first plurality of ring resonators into respective ones of a first plurality of output optical waveguides (e.g., optical waveguides 816-1 to 816-3). The method also includes an operation 923 for directing light within the first plurality of output optical waveguides into respective ones of a plurality of photodetectors (e.g., photodetectors 819-1 to 819-3). The method also includes an operation 925 for operating a second plurality of ring resonators (e.g., ring resonators 817-1 to 817-3) to evanescently in-couple light from the fourth optical waveguide, where each of the second plurality of ring resonators is operated at a respective resonant wavelength to in-couple light having the respective resonant wavelength from the fourth optical waveguide. The method also includes an operation 927 for optically coupling light from the second plurality of ring resonators into respective ones of a second plurality of output optical waveguides (e.g., optical waveguides 818-1 to 818-3). The method also includes an operation 929 for directing light within the second plurality of output optical waveguides into respective ones of the plurality of photodetectors.

In some embodiments, the method of FIG. 9 also includes operating a phase shifter in optical coupling with either the first optical waveguide or the second optical waveguide to apply a controlled amount of shift to a phase of light traveling through either the first optical waveguide or the second optical waveguide to which the phase shifter is optically coupled. In some embodiments, the first optical waveguide is longer than the second optical waveguide, or the second optical waveguide is longer than the first optical waveguide. In these embodiments, the method of FIG. 9 includes defining a length of the first optical waveguide and a length of the second optical waveguide to reduce a difference in arrival time of the first portion of the incoming light and the polarization-rotated second portion of the incoming light at the two-by-two optical splitter. In some embodiments, the method includes electronically compensating for a temporal difference in photocurrent generation by a given one of the plurality of photodetectors caused by a difference in arrival time of the first portion of the incoming light and the polarization-rotated second portion of the incoming light at the given one of the plurality of photodetectors. In some embodiments, the length of the first optical waveguide and the length of the second optical waveguide are defined to compensate for a temporal difference between directing the first portion of the incoming light into the first optical waveguide and directing the polarization-rotated second portion of the incoming light into the second optical waveguide.

In some embodiments, the each of the plurality of photodetectors used in the method of FIG. 9 is a linear photodetector (e.g., linear photodetector 400) that has a first end optically connected to a respective one of the first plurality of output optical waveguides and a second end optically connected to a respective one of the second plurality of output optical waveguides. In some of these embodiments, the method of FIG. 9 includes operating the linear photodetector to absorb a majority of the first portion of the incoming light in a first half of the linear photodetector, and absorb a majority of the polarization-rotated second portion of the incoming light in a second half of the linear photodetector. In some of these embodiments, the method of FIG. 9 includes operating a first photocurrent detection circuit to detect photocurrent generated within the first half of the linear photodetector, and operating a second photocurrent detection circuit to detect photocurrent generated within the second half of the linear photodetector. In this manner, the method of FIG. 9 provides for determination of how much optical power is conveyed into the linear photodetector from each of the first polarization and the second polarization of the original incoming optical signal. Correspondingly, in this manner, the method provides for determination of how much optical power was received in the incoming optical signal in each of the first polarization and the second polarization.

Figure 10A:
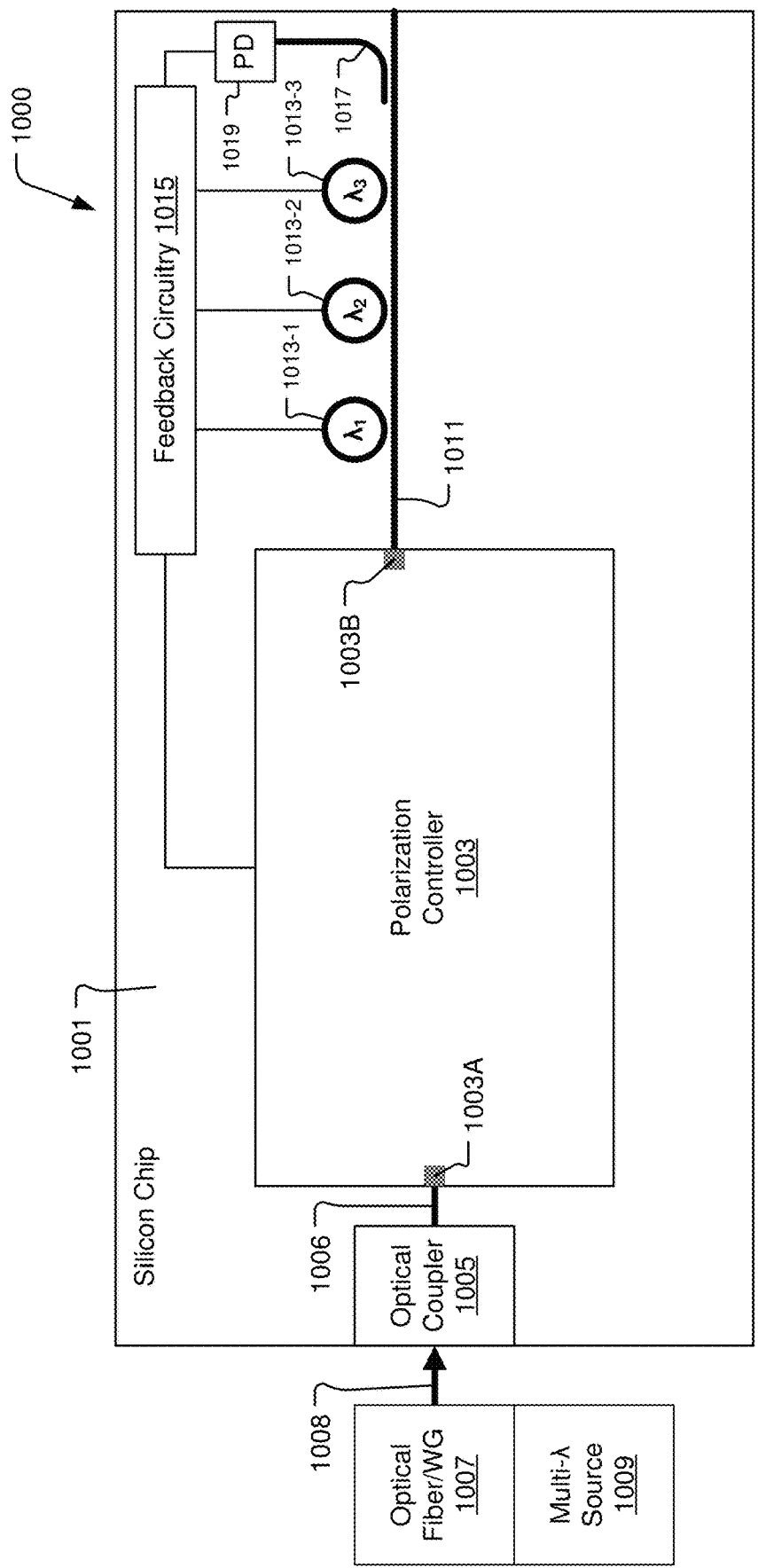
FIG. 10A shows an example configuration of an optical input polarization management device implemented within a PIC, in accordance with some embodiments.

FIG. 10A shows an example configuration of an optical input polarization management device 1000 implemented within a PIC 1001, in accordance with some embodiments. The optical input polarization management device 1000 includes a polarization controller 1003 that has an optical input 1003A optically connected to receive incoming light from an optical coupler 1005, by way of an optical waveguide 1006. In some embodiments, the optical input 1003A of the polarization controller 1003 is directly optically coupled to the optical coupler 1005, such that the optical waveguide 1006 is not required. In some embodiments, the optical coupler 1005 is implemented as an edge coupler. However, in other embodiments, the optical coupler 1005 is implemented as a vertical grating coupler, or as another type of optical coupling device that provides for optical coupling of the polarization controller 1003 to an optical fiber/waveguide 1007. Incoming light is transmitted from the optical fiber/waveguide 1007 into the optical coupler 1005, as indicated by arrow 1008. The optical fiber/waveguide 1007 is optically connected to receive and convey light from a multi-wavelength light source 1009. In some embodiments, the multi-wavelength light source 1009 is configured to transmit multiple wavelengths of continuous wave laser light through the optical fiber/waveguide 1007. In some embodiments, a polarization of the light transmitted by the multi-wavelength light source 1009 through the optical fiber/waveguide 1007 is uncontrolled and possibly varies over time.

The on-chip polarization controller 1003 is configured to combine the two polarizations of the incoming light as received through the optical input 1003A as a single polarization of light and output the single polarization of light through an optical output 1003B of the polarization controller 1003 in a low loss manner. For example, in some embodiments, the polarization controller 1003 is configured to receive both TE and TM polarizations of light through the optical input 1003A, rotate the TE polarized light to TM polarized light, and transmit essentially all of the light received through the optical input 1003A as TM polarized light through the optical output 1003B. Conversely, in some embodiments, the polarization controller 1003 is configured to receive both TE and TM polarizations of light through the optical input 1003A, rotate the TM polarized light to TE polarized light, and transmit essentially all of the light received through the optical input 1003A as TE polarized light through the optical output 1003B. In some embodiments, the polarization controller 1003 is electronically tunable to accommodate a power difference and a phase difference between the two polarizations (TE and TM) within the incoming light that are unknown and possibly varying with time.

The optical input polarization management device 1000 includes an output optical waveguide 1011 optically connected to the optical output of the polarization controller 1003. In some embodiments, feedback circuitry 1015 is configured to control the polarization controller 1003 based on the light transmitted through the optical output waveguide 1011. A small fraction of the optical power in the output waveguide 1011 is optically tapped and measured to serve as an input signal to the feedback circuitry 1015. In some embodiments, a directional optical coupler is implemented as an optical tap to transfer a small fraction of the optical power in the optical waveguide 1011 to a tap-off waveguide 1017, which is then incident on a photodetector 1019, e.g., linear photodetector. In some embodiments, the photodetector 1019 is configured to detect a fraction of the optical power in all wavelength channels. In some embodiments, a series of ring resonator filters 1013-1 to 1013-1 are designed to tap a small fraction of optical power from a single wavelength channel in the output waveguide 1011 and detect it, either by a photodetector placed within the ring resonator filter 1013-1 to 1013-3 itself, or by sending the optical signal to an output waveguide connected to a linear detector, such as previously described with regard to the ring resonators 815-1 to 815-3, output optical waveguides 816-1 to 816-3, and photodetectors 819-1 to 819-3 in the electro-optic receiver 800. In this embodiment, the optical power in each wavelength channel ($\lambda_1$, $\lambda_2$, $\lambda_3$) can be measured separately, which enables the feedback circuitry 1015 to separately and independently optimize the operation of the polarization controller 1003 for each wavelength channel in the incoming optical signal as received through the optical input 1003A of the polarization controller 1003.

While the example optical input polarization management device 1000 shows three ring resonator filters 1013-1 to 1013-3 for purposes of description, it should be understood that there is no limit on the number of the ring resonator filters that can be positioned along the output waveguide 1011, so long as the ring resonator filters 1013-1 to 1013-3 and associated signal processing circuitry can be spatially and electrically accommodated on the chip. Each of the ring resonator filters 1013-1 to 1013-3 is configured to operate at a respective resonant wavelength $\lambda_1$ to $\lambda_3$, such that light within the output waveguide 1011 having a wavelength ($\lambda_1$, $\lambda_2$, or $\lambda_3$) substantially equal to the respective resonant wavelength ($\lambda_1$, $\lambda_2$, or $\lambda_3$) of a given one of the ring resonator filters 1013-1 to 1013-3 optically couples into the given one of the ring resonator filters 1013-1 to 1013-3 from the output waveguide 1011. In some embodiments, the ring resonator filters 1013-1 to 1013-3 are implemented as annular-shaped waveguides having circuitous configuration, e.g., circular, oval, race-track, or another arbitrary circuitous shape. In some embodiments, the ring resonator filters 1013-1 to 1013-3 are implemented as circular discs. The ring resonator filters 1013-1 to 1013-3 are formed of a material through which light can be in-coupled, out-coupled, and guided. Each of the ring resonator filters 1013-1 to 1013-3 is formed within a surrounding material that has an optical index of refraction sufficiently different from that of the ring resonator filters 1013-1 to 1013-3 to enable guiding of light within the ring resonator filters 1013-1 to 1013-3 and around the circuitous path defined by each of the ring resonator filters 1013-1 to 1013-3. In some embodiments, each of the ring resonator filters 1013-1 to 1013-3 is configured to have an annular-shape or disc-shape with an outer diameter of less than about 50 micrometers. In some embodiments, each of the ring resonator filters 1013-1 to 1013-3 is configured to have an annular-shape or disc-shape with an outer diameter of less than about 10 micrometers.

Figure 10B:
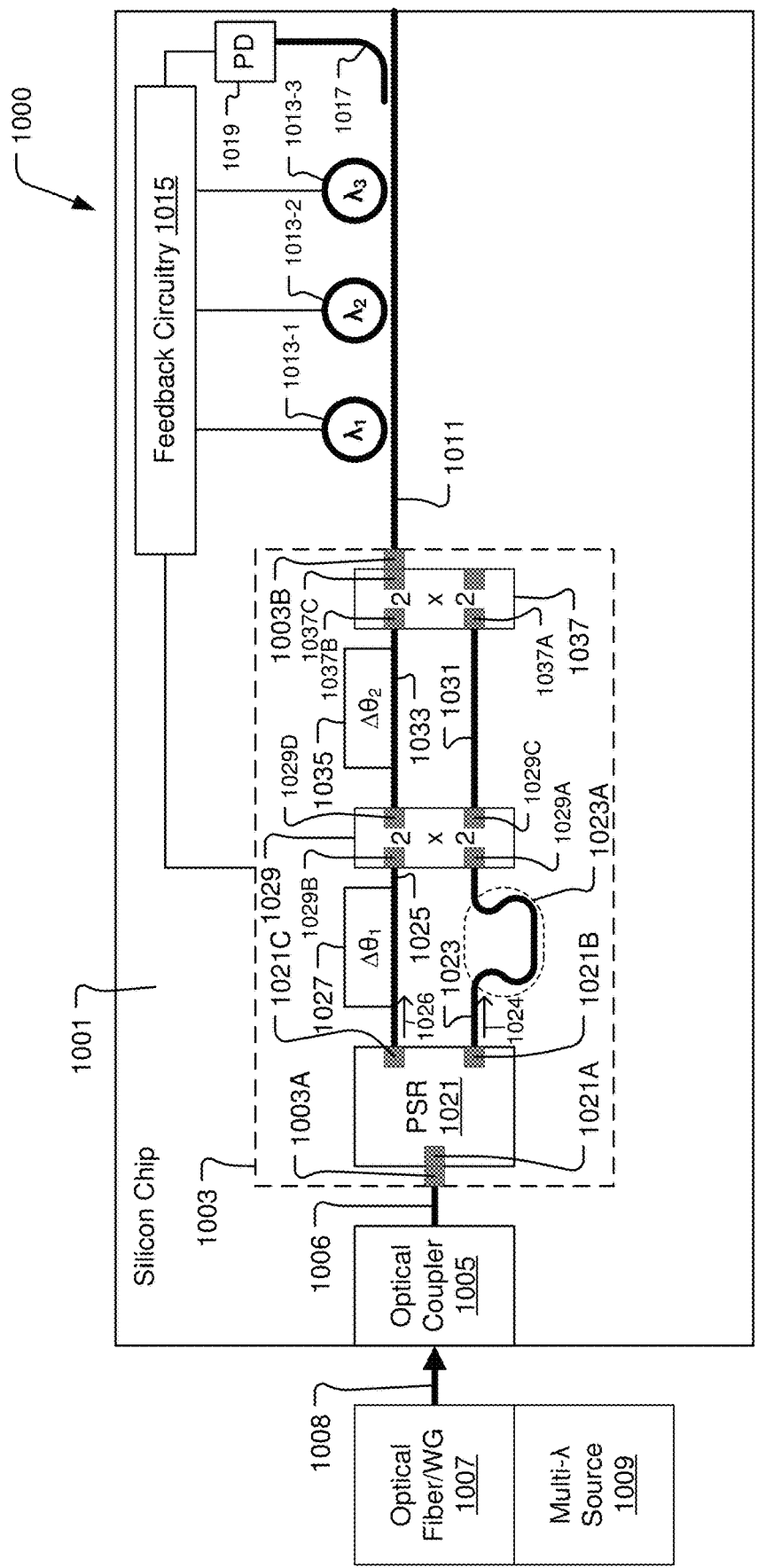
FIG. 10B shows the optical input polarization management device of FIG. 10A, with an example implementation of the polarization controller, in accordance with some embodiments.

FIG. 10B shows the optical input polarization management device 1000 of FIG. 10A, with an example implementation of the polarization controller 1003, in accordance with some embodiments. The polarization controller 1003 includes a PSR 1021 that has an optical input 1021A optically connected to receive incoming light from the optical input 1003A of the polarization controller 1003. In some embodiments, the optical input 1021A of the PSR 1021 is the optical input 1003A of the polarization controller 1003. The PSR 1021 has a first optical output 1021B and a second optical output 1021C. The PSR 1021 is configured to direct a first portion of the incoming light having a first polarization (TE or TM) through the first optical output 1021B. The PSR 1021 is also configured to rotate a polarization of a second portion of the incoming light from a second polarization (opposite of the first polarization) to the first polarization. In this manner, the PSR 1021 turns the second portion of the incoming light into a polarization-rotated second portion of the incoming light. The PSR 1021 is configured to direct the polarization-rotated second portion of the incoming light through the second optical output 1021C. In some alternative embodiments, the first portion of the incoming light having a first polarization is transmitted through the second optical output 1021C, and the polarization-rotated second portion of the incoming light is transmitted through the first optical output 1021B.

The polarization controller 1003 includes a first optical waveguide 1023 optically connected to the first optical output 1021B of the PSR 1021. The polarization controller 1021 also includes a second optical waveguide 1025 optically connected to the second optical output 1021C of the PSR 1021. The first optical waveguide 1023 and the second optical waveguide 1025 are formed of a material through which light can be in-coupled, out-coupled, and guided. Each of the first optical waveguide 1023 and the second optical waveguide 1025 is formed within a surrounding material that has an optical index of refraction sufficiently different from that of the first optical waveguide 1023 and the second optical waveguide 1025, respectively, to enable guiding of light within the first optical waveguide 1023 and the second optical waveguide 1025. In some embodiments, first optical waveguide 1023 and the second optical waveguide 1025 are formed of a same material. In some embodiments, the first portion of the incoming light is transmitted through the first optical output 1021B of the PSR 1021 and into the first optical waveguide 1023, and travels along the first optical waveguide 1023, as indicated by arrow 1024. Also, in these embodiments, the polarization-rotated second portion of the incoming light is transmitted through the second optical output 1021C of the PSR 1021 and into the second optical waveguide 1025, and travels along the second optical waveguide 1025, as indicated by arrow 1026. Conversely, in some alternative embodiments, the first portion of the incoming light is transmitted through the second optical output 1021C of the PSR 1021 and into the second optical waveguide 1025, and travels along the second optical waveguide 1025, as indicated by arrow 1026. Also, in these alternative embodiments, the polarization-rotated second portion of the incoming light is transmitted through the first optical output 1021B of the PSR 1021 and into the first optical waveguide 1023, and travels along the first optical waveguide 1023, as indicated by arrow 1024.

The polarization controller 1003 also includes a first two-by-two optical splitter 1029 that has a first optical input 1029A optically connected to the second end of the first optical waveguide 1023. The first two-by-two optical splitter 1029 has a second optical input 1029B optically connected to the second end of the second optical waveguide 1025. The first two-by-two optical splitter 1029 has a first optical output 1029C and a second optical output 1029D. The first two-by-two optical splitter 1029 is configured to output some of the first portion of the incoming light and some of the polarization-rotated second portion of the incoming light through each of the first optical output 1029C and the second optical output 1029D of the first two-by-two optical splitter 1029. In some embodiments, the first two-by-two optical splitter 1029 is an even 50-50 optical splitter. However, in other embodiments, the first two-by-two optical splitter 1029 is not an even 50-50 optical splitter. The optical splitting ratio of the first two-by-two optical splitter 1029 defines how much optical power is transmitted to each of the first optical output 1029C and the second optical output 1029D from each of the first optical input 1029A and the second optical input 1029B. The optical splitting ratio provided by the first two-by-two optical splitter 1029 is set and/or controlled to ensure that very low optical power transmission through either the first optical output 1029C or the second optical output 1029D is avoided for any of the wavelength channels of the incoming light received through the first optical input 1029A and the second optical input 1029B. Also, in some embodiments, the first two-by-two optical splitter 1029 is a non-broadband optical splitter. In some embodiments, the first two-by-two optical splitter 1029 is implemented using a multi-mode interference device (MMI) or a directional waveguide coupler, e.g., an adiabatic directional coupler.

In some embodiments, a first phase shifter 1027 is optically coupled to either the first optical waveguide 1023 or the second optical waveguide 1025. The example polarization controller 1003 has the first phase shifter 1027 optically coupled to the second optical waveguide 1025. In some embodiments, the first phase shifter 1027 is implemented as a thermal tuner (e.g., heating device) positioned over the second optical waveguide 1025, which operates by exploiting the thermo-optic effect of the second optical waveguide 1025 material. In some embodiments, the first phase shifter 1027 is implemented as an electro-optic device (e.g., diode) built into the second optical waveguide 1025, which operates by exploiting electro-optic effects within the second optical waveguide 1025. In some embodiments, the first phase shifter 1027 is implemented as one or more ring resonators, in which each of these ring resonators operates at a particular wavelength to shift the phase of light at the particular wavelength within the optical waveguide to which the first phase shifter 1027 is optically coupled.

In these embodiments, either the first optical waveguide 1023 is longer than the second optical waveguide 1025, or the second optical waveguide 1025 is longer than the first optical waveguide 1023, in order to compensate for a timing delay between the first portion of the incoming light exiting the PSR 1021 and the polarization-rotated second portion of the incoming light exiting the PSR 1021, so as to minimize a timing-skew (timing difference) between arrival of the first portion of the incoming light into the first two-by-two optical splitter 1029 and arrival of the polarization-rotated second portion of the incoming light into the first two-by-two optical splitter 1029. In the example polarization controller 1003, the first optical waveguide 1023 includes a delay section 1023A configured so that the optical path length through the first optical waveguide 1023 is longer than the optical path length through the second optical waveguide 1025. The delay section 1023A is configured to compensate for the timing delay between the first portion of the incoming light exiting the PSR 1021 and the polarization-rotated second portion of the incoming light exiting the PSR 1021. In some embodiments, the phase shifter 1027 is optically coupled to a shorter one of the first optical waveguide 1023 and the second optical waveguide 1025.

In some embodiments, the delay section 1023A is defined to compensate/minimize the timing-skew between arrival of the first portion of the incoming light and the polarization-rotated second portion of the incoming light at the first two-by-two optical splitter 1029 when the polarization controller 1003 is implemented to operate over a broad range of optical wavelengths, rather than just at a single optical wavelength. If a group delay difference between the two polarizations is not sufficiently compensated/minimized, a phase difference between the first portion of the incoming light in the first optical waveguide 1023 and the polarization-rotated second portion of the incoming light in the second optical waveguide 1025 will depend on the wavelength of the light, such that the single phase shifter 1027 may not be able to set an appropriate phase for all wavelengths of interest. The delay section 1023A is defined to ensure that the group delay difference between the two polarizations is sufficiently compensated/minimized so that the phase difference between the first portion of the incoming light in the first optical waveguide 1023 and the polarization-rotated second portion of the incoming light in the second optical waveguide 1025 does not vary as a function of the wavelength of the light, which allows the phase shifter 1027 to set an appropriate phase for all channel wavelengths of interest within the incoming optical signal received through the optical coupler 1005.

The polarization controller 1003 includes a third optical waveguide 1031 optically connected to the first optical output 1029C of the first two-by-two optical splitter 1029. The polarization controller 1003 also includes a fourth optical waveguide 1033 optically connected to the second optical output 1029D of the first two-by-two optical splitter 1029. The third optical waveguide 1031 and the fourth optical waveguide 1033 are formed of a material through which light can be in-coupled, out-coupled, and guided. Each of the third optical waveguide 1031 and the fourth optical waveguide 1033 is formed within a surrounding material that has an optical index of refraction sufficiently different from that of the third optical waveguide 1031 and the fourth optical waveguide 1033, respectively, to enable guiding of light within the third optical waveguide 1031 and the fourth optical waveguide 1033. In some embodiments, third optical waveguide 1031 and the fourth optical waveguide 1033 are formed of a same material. Some of the first portion of the incoming light (having the first polarization) is directed/conveyed through the first optical output 1029C of the first two-by-two optical splitter 1029 and into a third optical waveguide 1031. Also, some of the first portion of the incoming light (having the first polarization) is directed/conveyed through the second optical output 1029D of the first two-by-two optical splitter 1029 and into a fourth optical waveguide 1033. Some of the polarization-rotated second portion of the incoming light (having the first polarization) is directed/conveyed through the first optical output 1029C of the first two-by-two optical splitter 1029 and into the third optical waveguide 1031. Also, some of the polarization-rotated second portion of the incoming light (having the first polarization) is directed/conveyed through the second optical output 1029D of the first two-by-two optical splitter 1029 and into the fourth optical waveguide 1033.

The polarization controller 1003 also includes a second two-by-two optical splitter 1037 that has a first optical input 1037A optically connected to the second end of the third optical waveguide 1031. The second two-by-two optical splitter 1037 has a second optical input 1037B optically connected to the second end of the fourth optical waveguide 1033. The second two-by-two optical splitter 1037 has at least one optical output 1037C optically connected to the optical output 1003B of the polarization controller 1003. In some embodiments, the at least one optical output 1037C of the second two-by-two optical splitter 1037 is the optical output 1003B of the polarization controller 1003. The second two-by-two optical splitter 1037 is configured to output some of the first portion of the incoming light and some of the polarization-rotated second portion of the incoming light through the optical output 1037C. The second two-by-two optical splitter 1037 is not required to be an even 50-50 optical splitter. The optical splitting ratio of the second two-by-two optical splitter 1037 defines how much optical power is transmitted to the optical output 1037C from each of the first optical input 1037A and the second optical input 1037B. The optical splitting ratio provided by the second two-by-two optical splitter 1037 is set and/or controlled to ensure that optical power transmission through the optical output 1037C is optimized for the wavelength channels of the incoming light received through the first optical input 1037A and the second optical input 1037B. Also, in some embodiments, the second two-by-two optical splitter 1037 is a non-broadband optical splitter. In some embodiments, the second two-by-two optical splitter 1037 is implemented using an MMI device or a directional waveguide coupler, e.g., an adiabatic directional coupler.

In some embodiments, a second phase shifter 1035 is optically coupled to either the third optical waveguide 1031 or the fourth optical waveguide 1033. The example polarization controller 1003 has the second phase shifter 1035 optically coupled to the second optical waveguide 1033. In some embodiments, the second phase shifter 1035 is implemented as a thermal tuner (e.g., heating device) positioned over the fourth optical waveguide 1033, which operates by exploiting the thermo-optic effect of the fourth optical waveguide 1033 material. In some embodiments, the second phase shifter 1035 is implemented as an electro-optic device (e.g., diode) built into the fourth optical waveguide 1033, which operates by exploiting electro-optic effects within the fourth optical waveguide 1033. In some embodiments, the second phase shifter 1035 is implemented as one or more ring resonators, in which each of these ring resonators operates at a particular wavelength to shift the phase of light at the particular wavelength within the optical waveguide to which the second phase shifter 1033 is optically coupled. In some embodiments, the relative phase between the two phase shifters 1027 and 1035 is controlled by placing phase shifters on the two optical waveguides 1025 and 1033, respectively, instead of on just one of the optical waveguides. This provides for faster tuning of the relative phase, especially for thermal phase shifters.

In some embodiments, the polarization controller 1003 functions as an effective electro-optic combiner by using the PSR 1021 and the cascaded configuration of the first two-by-two optical splitter 1029 and the second two-by-two optical splitter 1037, with the first phase shifter 1027 on one of the two waveguides 1023, 1025 entering the first two-by-two optical splitter 1029, and with the second phase shifter 1035 on one of the two waveguides 1031, 1033 entering the second two-by-two optical splitter 1037. The first phase shifter 1027 and the second phase shifter 1035 are tuned to account for the phase and intensity imbalance of the two respective optical waveguides over time. The first phase shifter 1027 and the second phase shifter 1035 are used to optimize the optical power in the output waveguide 1011 as the input fiber/waveguide 1007 polarization changes over time. In some embodiments, the first phase shifter 1027 and/or the second phase shifter 1035 are/is implement as a heater placed near the respective optical waveguide or as a diode built into the respective optical waveguide. Also, in some embodiments, the first phase shifter 1027 and/or the second phase shifter 1035 are/is implemented as a ring resonator phase shifter, in which each of a plurality of ring resonators is operated to shift the phase of a single respective wavelength channel of the light within the optical waveguide. Implementation of the first phase shifter 1027 and the second phase shifter 1035 as ring resonator phase shifters provides for higher optical power transmission to the output waveguide 1011 over a wide range of wavelength channels. In some situations, as the input fiber/waveguide 1007 polarization drifts enough over time, the first phase shifter 1027 and the second phase shifter 1035 may have to "reset" by abruptly changing the phase by a 2π amount to avoid reaching the end of its range. Such a "reset" would take time and cause an interruption in signal. In some embodiments, to avoid having a "reset" of the phase shifters 1027, 1035, the polarization controller 1003 includes more than two cascaded two-by-two optical splitters with corresponding preceding phase shifters. Also, in some embodiments, the feedback circuitry 1015 is configured to control the first phase shifter 1027 and the second phase shifter 1035, and any other phase shifters in the polarization controller 1003, based on the light transmitted through the optical output waveguide 1011.

The optical input polarization management device 1000 functions to convert an incoming light signal that has unknown polarization characteristics (and possibly uncontrolled polarization states that vary over time) into a corresponding input light signal of known polarization. Because the optical outputs of the PSR 1021 are combined into the single output waveguide 1011, with the same polarization, it is possible to simplify optical circuits and electrical circuits for detection and/or modulation of the light within the output waveguide 1011. In some embodiments, the optical input polarization management device 1000 is implemented as an electro-optic combiner to combine two optical signals having relative phase and relative intensities that are unknown and that may vary over time, with low loss, over a range of wavelength channels. In some embodiments, when the optical input polarization management device 1000 is used to combine modulated light signals for output to a detection system, optical timing-skew management and/or electrical timing-skew management can be implemented in conjunction with the optical input polarization management device 1000 to support receipt of the incoming optical signal.

Figure 10C:
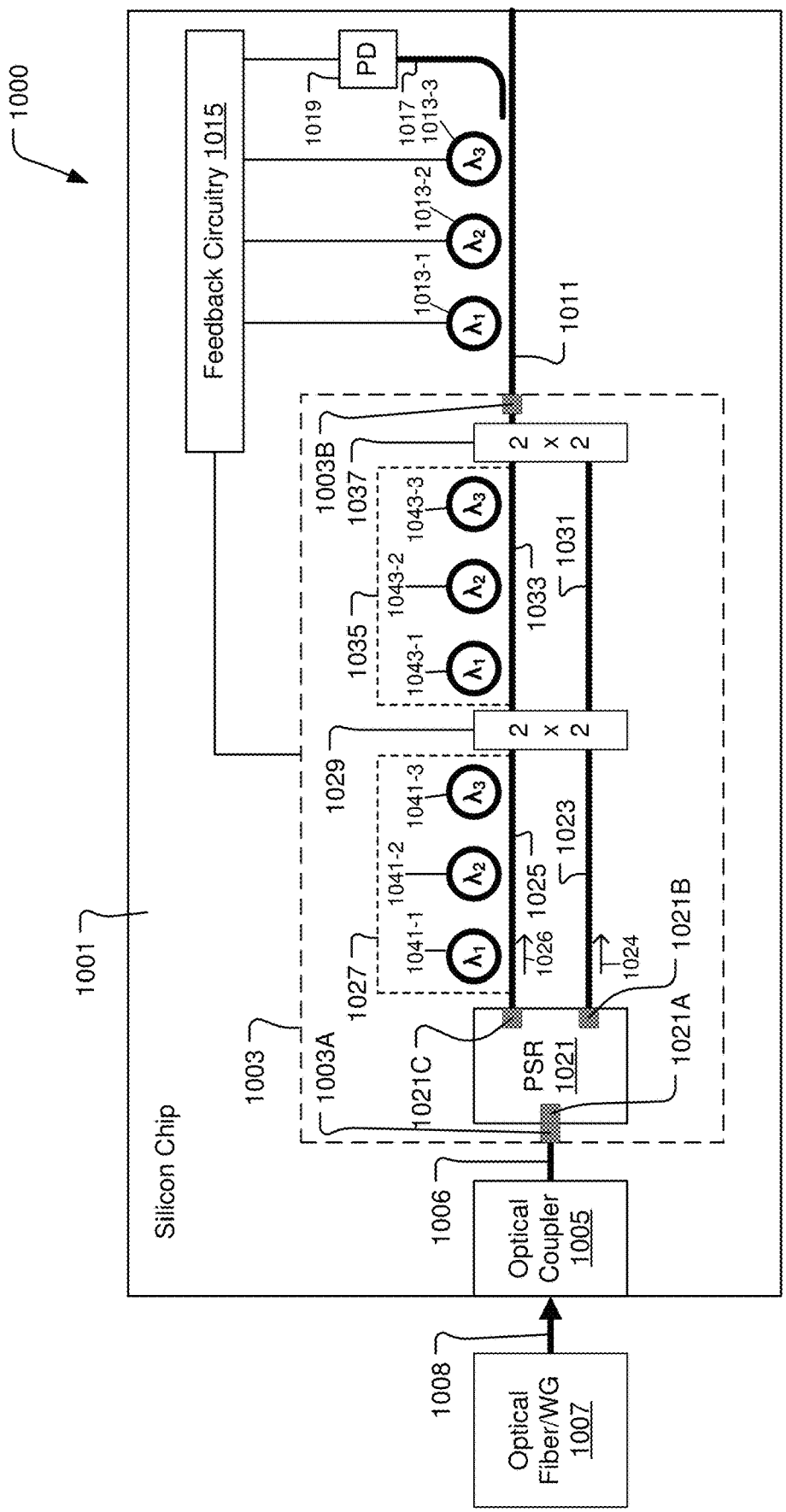
FIG. 10C shows an example implementation of the optical input polarization management device in which the first phase shifter is implemented as a first plurality of ring resonator phase shifters and the second phase shifter is implemented as a second plurality of ring resonator phase shifters, in accordance with some embodiments.

FIG. 10C shows an example implementation of the optical input polarization management device 1000 in which the first phase shifter 1027 is implemented as a first plurality of ring resonator phase shifters 1041-1 to 1041-3 and the second phase shifter 1035 is implemented as a second plurality of ring resonator phase shifters 1043-1 to 1043-3, in accordance with some embodiments. Each of the first plurality of ring resonator phase shifters 1043-1 to 1043-3 is positioned along the optical waveguide 1025 and within an evanescent optical coupling distance of the optical waveguide 1025. Each of the second plurality of ring resonator phase shifters 1043-1 to 1043-3 is positioned along the optical waveguide 1033 and within an evanescent optical coupling distance of the optical waveguide 1033. Each of the first plurality of ring resonator phase shifters 1041-1 to 1041-3 is operated to provide a controlled amount of shift in the phase of a single, respective wavelength channel of the light within the optical waveguide 1025. Each of the second plurality of ring resonator phase shifters 1043-1 to 1043-3 is operated to provide a controlled amount of shift in the phase of a single, respective wavelength channel of the light within the optical waveguide 1033. A number of ring resonators within the first plurality of ring resonator phase shifters 1041-1 to 1041-3 is equal to a number of ring resonators within the second plurality of ring resonator phase shifters 1043-1 to 1043-3. Also, for feedback control purposes, the number of ring resonator filters (photodetectors) 1013-1 to 1013-3 is equal to the number of first plurality of ring resonator phase shifters 1041-1 to 1041-3, and the number of ring resonator filters (photodetectors) 1013-1 to 1013-3 is also equal to the number of the second plurality of ring resonator phase shifters 1043-1 to 1043-3.

In some embodiments, the ring resonators within the first plurality of ring resonator phase shifters 1041-1 to 1041-3 and the second plurality of ring resonator phase shifters 1043-1 to 1043-3 are implemented as annular-shaped waveguides having circuitous configuration, e.g., circular, oval, race-track, or another arbitrary circuitous shape. In some embodiments, the ring resonators within the first plurality of ring resonator phase shifters 1041-1 to 1041-3 and the second plurality of ring resonator phase shifters 1043-1 to 1043-3 are implemented as circular discs. The ring resonators within the first plurality of ring resonator phase shifters 1041-1 to 1041-3 and the second plurality of ring resonator phase shifters 1043-1 to 1043-3 are formed of a material through which light can be in-coupled, out-coupled, and guided. Each of the ring resonators within the first plurality of ring resonator phase shifters 1041-1 to 1041-3 and the second plurality of ring resonator phase shifters 1043-1 to 1043-3 is formed within a surrounding material that has an optical index of refraction sufficiently different from that of the ring resonators to enable guiding of light within the ring resonators and around the circuitous path defined by each of the ring resonators. In some embodiments, each of the first plurality of ring resonator phase shifters 1041-1 to 1041-3 and the second plurality of ring resonator phase shifters 1043-1 to 1043-3 is configured to have an annular-shape or disc-shape with an outer diameter of less than about 50 micrometers. In some embodiments, each of the first plurality of ring resonator phase shifters 1041-1 to 1041-3 and the second plurality of ring resonator phase shifters 1043-1 to 1043-3 is configured to have an annular-shape or disc-shape with an outer diameter of less than about 10 micrometers.

While the example of FIG. 10C shows three ring resonators within each of the first plurality of ring resonator phase shifters 1041-1 to 1041-3 and the second plurality of ring resonator phase shifters 1043-1 to 1043-3 for purposes of description, it should be understood that there is no limit on the number of ring resonators within each of the first plurality of ring resonator phase shifters 1041-1 to 1041-3 and the second plurality of ring resonator phase shifters 1043-1 to 1043-3, so long as the first plurality of ring resonator phase shifters 1041-1 to 1041-3 and the second plurality of ring resonator phase shifters 1043-1 to 1043-3 and associated signal processing circuitry can be spatially and electrically accommodated on the chip. Each ring resonator within the first plurality of ring resonator phase shifters 1041-1 to 1041-3 and the second plurality of ring resonator phase shifters 1043-1 to 1043-3 is configured to operate at a respective resonant wavelength $\lambda_1$ to $\lambda_3$, such that light having a wavelength ($\lambda_1$, $\lambda_2$, or $\lambda_3$) substantially equal to the respective resonant wavelength ($\lambda_1$, $\lambda_2$, or $\lambda_3$) of a given one of the ring resonators optically couples into the given one of the ring resonators from the optical waveguide 1025, 1033. Each of the first plurality of ring resonator phase shifters 1041-1 to 1041-3, the second plurality of ring resonator phase shifters 1043-1 to 1043-3, and the ring resonator filters 1013-1 to 1013-3 includes at least one ring resonator configured to operate at a same resonant wavelength ($\lambda_1$, $\lambda_2$, or $\lambda_3$) corresponding to a channel wavelength within the incoming light signal. Also, each of the first plurality of ring resonator phase shifters 1041-1 to 1041-3, the second plurality of ring resonator phase shifters 1043-1 to 1043-3, and the ring resonator filters 1013-1 to 1013-3 includes at least one ring resonator configured to operate at each of multiple different resonant wavelengths ($\lambda_1$, $\lambda_2$, or $\lambda_3$) corresponding to the channel wavelengths within the incoming light signal. It should be appreciated that first plurality of ring resonators 1041-1 to 1041-3 and the second plurality of ring resonators 1043-1 to 1043-3 enables different wavelength channels to be phase shifted separately to accommodate unique phase and intensity imbalances among the different wavelength channels of the incoming light signal.

Figure 11:
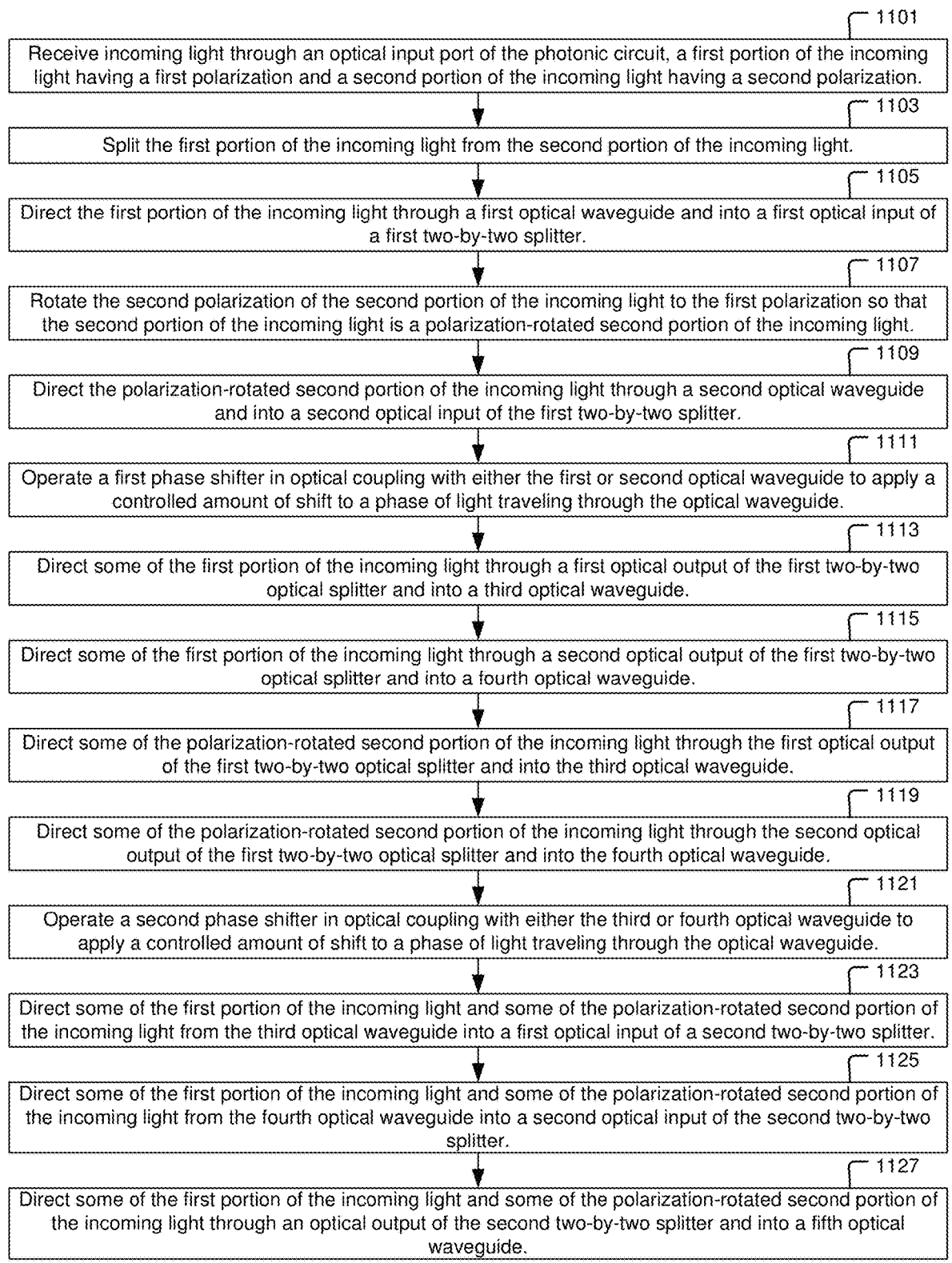
FIG. 11 shows a flowchart of a method for optical input polarization management, in accordance with some embodiments.

FIG. 11 shows a flowchart of a method for optical input polarization management, in accordance with some embodiments. In some embodiments, the method of FIG. 11 is practiced using the optical input polarization management device 1000 of FIGS. 10A to 10C. The method includes an operation 1101 for receiving incoming light through an optical input port (e.g., 1003A) of a PIC (e.g., 1001). A first portion of the incoming light has a first polarization and a second portion of the incoming light has a second polarization. The method also includes an operation 1103 for splitting the first portion of the incoming light from the second portion of the incoming light. The method also includes an operation 1105 for directing the first portion of the incoming light through a first optical waveguide (e.g., 1023) and into a first optical input (e.g., 1029A) of a first two-by-two splitter (e.g., 1029). The method also includes an operation 1107 for rotating the second polarization of the second portion of the incoming light to the first polarization so that the second portion of the incoming light is a polarization-rotated second portion of the incoming light. The method also includes an operation 1109 for directing the polarization-rotated second portion of the incoming light through a second optical waveguide (e.g., 1025) and into a second optical input (e.g., 1029B) of the first two-by-two splitter.

The method also includes an operation 1111 for operating a first phase shifter (e.g., 1027) in optical coupling with either the first optical waveguide or the second optical waveguide to apply a controlled amount of shift to a phase of light traveling through either the first optical waveguide or the second optical waveguide to which the phase shifter is optically coupled.

The method also includes an operation 1113 for directing some of the first portion of the incoming light through a first optical output (e.g., 1029C) of the first two-by-two optical splitter and into a third optical waveguide (e.g., 1031). The method also includes an operation 1115 for directing some of the first portion of the incoming light through a second optical output (e.g., 1029D) of the first two-by-two optical splitter and into a fourth optical waveguide (e.g., 1033). The method also includes an operation 1117 for directing some of the polarization-rotated second portion of the incoming light through the first optical output of the first two-by-two optical splitter and into the third optical waveguide. The method also includes an operation 1119 for directing some of the polarization-rotated second portion of the incoming light through the second optical output of the first two-by-two optical splitter and into the fourth optical waveguide. The method also includes an operation 1121 for operating a second phase shifter (e.g., 1035) in optical coupling with either the third optical waveguide or the fourth optical waveguide to apply a controlled amount of shift to a phase of light traveling through either the third optical waveguide or the fourth optical waveguide to which the phase shifter is optically coupled.

The method also includes an operation 1123 for directing some of the first portion of the incoming light and some of the polarization-rotated second portion of the incoming light from the third optical waveguide into a first optical input (e.g., 1037A) of a second two-by-two splitter (e.g., 1037). The method also includes an operation 1125 for directing some of the first portion of the incoming light and some of the polarization-rotated second portion of the incoming light from the fourth optical waveguide into a second optical input (e.g., 1037B) of the second two-by-two splitter. The method also includes an operation 1127 for directing some of the first portion of the incoming light and some of the polarization-rotated second portion of the incoming light through an optical output (e.g., 1037C) of the second two-by-two splitter and into a fifth optical waveguide (e.g., into the output optical waveguide 1011).

In some embodiments, the method of FIG. 11 includes operating a plurality of ring resonator photodetectors (e.g., 1013-1 to 1013-3) to evanescently in-couple light from the fifth optical waveguide, where each of the plurality of ring resonator photodetectors is operated at a respective resonant wavelength to in-couple a fraction of the first portion of the incoming light having the respective resonant wavelength and a fraction of the polarization-rotated second portion of the incoming light having the respective resonant wavelength. In some embodiments of the method of FIG. 11, the first phase shifter includes a first plurality of ring resonator phase shifters (e.g., 1041-1 to 1041-3), and the second phase shifter includes a second plurality of ring resonator phase shifters (e.g., 1043-1 to 1043-3). In these embodiments, the ring resonator photodetectors are used to generate feedback signals to control respective ones of the ring resonator phase shifters in the first phase shifter and the second phase shifter.

Figure 12:
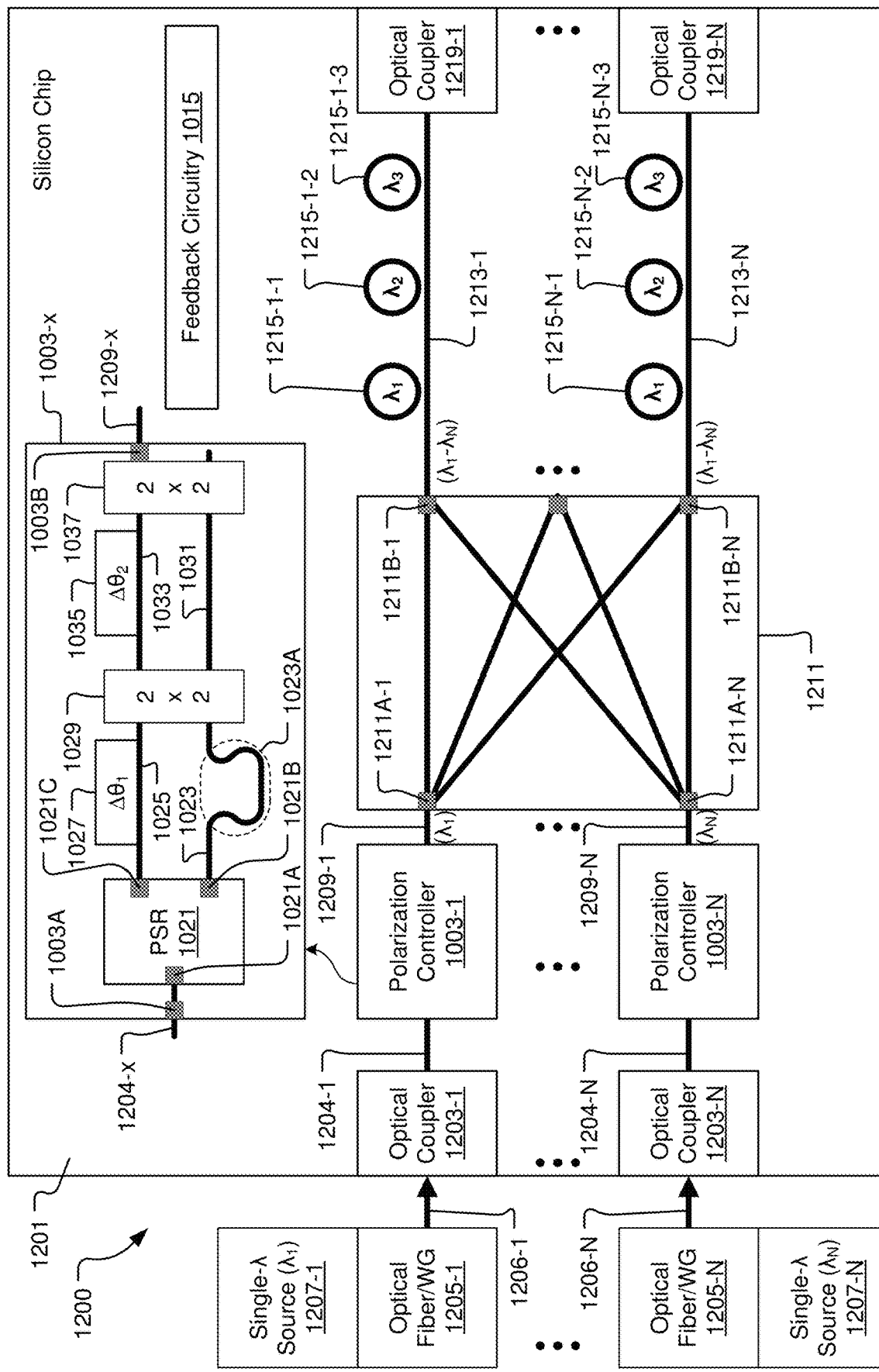
FIG. 12 shows an example configuration of an electro-optic transmitter implemented within a PIC, in accordance with some embodiments.

FIG. 12 shows an example configuration of an electro-optic transmitter 1200 implemented within a PIC 1201, in accordance with some embodiments. The electro-optic transmitter 1200 implements multiple (N) instances of the polarization controller 1003 as previously described with regard to FIGS. 10A-10C and 11. Each instance of the polarization controller 1003-x, where x is 1 to N, has the optical input 1003A optically connected to receive incoming light from a respective optical coupler 1203-x, where x is 1 to N, by way of an optical waveguide 1204-x, where x is 1 to N. In some embodiments, the optical input 1003A of each instance of the polarization controller 1003-x is directly optically coupled to the respective optical coupler 1203-x, such that the optical waveguide 1204-x is not required. In some embodiments, the optical coupler 1203-x is implemented as an edge coupler. However, in other embodiments, the optical coupler 1203-x is implemented as a vertical grating coupler, or as another type of optical coupling device that provides for optical coupling of the polarization controller 1003-x to a respective optical fiber/waveguide 1205-x, where x is 1 to N. Incoming light is transmitted from the optical fiber/waveguide 1205-x into the optical coupler 1203-x, as indicated by arrow 1206-x, where x is 1 to N. Each of the optical fiber/waveguides 1205-1 to 1205-N is optically connected to receive and convey light from a respective single-wavelength light source 1207-1 to 1207-N. In some embodiments, the different single-wavelength light sources 1207-1 to 1207-N are configured to supply respectively different wavelengths of continuous wave laser light. In some embodiments, a polarization of the light transmitted by the single-wavelength light sources 1207-1 to 1207-N through the respective optical fibers/waveguides 1205-1 to 1205-N is uncontrolled.

Each of the on-chip polarization controllers 1003-1 to 1003-N is configured to combine the two polarizations (TE and TM) of the incoming light as received through the respective optical coupler 1203-1 to 1203-N as a single polarization of light and output the single polarization of light through a respective optical waveguide 1209-1 to 1209-N in a low loss manner. For example, in some embodiments, a given instance of the polarization controller 1003-x is configured to receive both TE and TM polarizations of light through the optical coupler 1203-x, rotate the TE polarized light to TM polarized light, and transmit essentially all of the light received through the optical coupler 1203-x as TM polarized light through the optical waveguide 1209-x. Alternatively, in some embodiments, a given instance of the polarization controller 1003-x is configured to receive both TE and TM polarizations of light through the optical coupler 1203-x, rotate the TM polarized light to TE polarized light, and transmit essentially all of the light received through the optical coupler 1203-x as TE polarized light through the optical waveguide 1209-x. In some embodiments, each instance of the polarization controller 1003-x is electronically tunable to accommodate a power difference and a phase difference between the two polarizations (TE and TM) within the incoming light that are unknown and possibly varying with time. It should be appreciated that because each of the polarization controllers 1003-1 to 1003-N can be optimized for a single wavelength, the configuration of the electro-optic transmitter 1200 advantageously overcomes any limitation associated with individual ones of the polarization controllers 1003-1 to 1003-N having a finite optical bandwidth.

The electro-optic transmitter 1200 also includes an optical multiplexer 1211 having a plurality of optical inputs 1211A-1 to 1211A-N respectively optically connected to the optical waveguides 1209-1 to 1209-N corresponding to the plurality of polarization controllers 1003-1 to 1003-N. The optical multiplexer 1211 also has a plurality of optical outputs 1211B-1 to 1211B-N. The optical multiplexer 1211 is configured to convey a portion of the light received through any given one of the optical inputs 1211A-1 to 1211A-N to each of the optical outputs 1211B-1 to 1211B-N. In this manner, a portion of the light received through each of the optical inputs 1211A-1 to 1211A-N is conveyed to each of the optical outputs 1211B-1 to 1211B-N. Therefore, with the single-wavelength light sources 1207-1 to 1207-N respectively supplying N different wavelengths ($\lambda_1$ to $\lambda_N$) of light, each of the optical inputs 1211A-1 to 1211A-N receives a different one of the N different wavelengths ($\lambda_1$ to $\lambda_N$) of light (having a single, controlled polarization (either TE or TM)), and the optical multiplexer 1211 functions to convey a portion of each of the N different wavelengths ($\lambda_1$ to $\lambda_N$) of light from each of the optical inputs 1211A-1 to 1211A-N to each of the optical outputs 1211B-1 to 1211B-N, such that all of the N different wavelengths ($\lambda_1$ to $\lambda_N$) of light (having the single, controlled polarization (either TE or TM)) are conveyed through each of the optical outputs 1211B-1 to 1211B-N. In some embodiments, the optical multiplexer 1211 is implemented as a star coupler. In some embodiments, the optical multiplexer 1211 is implemented as a series of cascaded two-by-two optical splitters. It should be understood, however, that in other embodiments, the optical multiplexer 1211 can be implemented in other ways so long as the above-mentioned functionality of the optical multiplexer 1211 is achieved.

The electro-optic transmitter 1200 also includes a plurality of optical waveguides 1213-1 to 1213-N, where each of the optical waveguides 1213-1 to 1213-N has a first end optically connected to a respective one of the plurality of optical outputs 1211B-1 to 1211B-N of the optical multiplexer 1211, and where each of the optical waveguides 1213-1 to 1213-N has a second end optically connected to a respective optical output port of the electro-optic transmitter 1200. In some embodiments, the optical output ports of the electro-optic transmitter 1200 are implemented as optical couplers 1219-1 to 1219-N. In some embodiments, each instance of the optical coupler 1219-$x$, where x is 1 to N, is implemented as an edge coupler. However, in other embodiments, the optical coupler 1219-$x$ is implemented as a vertical grating coupler, or as another type of optical coupling device that provides for optical coupling of the corresponding optical waveguide 1213-1 to 1213-N to a respective output optical fiber/waveguide connected/couple to the electro-optic transmitter 1200.

In some embodiments, the electro-optic transmitter 1200 includes a plurality of ring resonator modulators 1215-$x$-$y$ positioned along and within an evanescent optical coupling distance of each of the plurality of optical waveguides 1213-1 to 1213-N, where x is 1 to N, and y is 1 to Y. While the example electro-optic transmitter 1200 shows three ring resonator modulators 1215-$x$-1 to 1215-$x$-3 along each of the optical waveguides 1213-1 to 1213-N for purposes of description, it should be understood that there is no limit on the number of ring resonator modulators that can be positioned along each of the optical waveguides 1213-1 to 1213-N, so long as the ring resonator modulators and associated signal processing circuitry can be spatially and electrically accommodated on the chip. In some embodiments, the ring resonator modulators 1215-$x$-$y$ are implemented as annular-shaped waveguides having circuitous configuration, e.g., circular, oval, race-track, or another arbitrary circuitous shape. In some embodiments, the ring resonator modulators 1215-$x$-$y$ are implemented as circular discs. The ring resonator modulators 1215-$x$-$y$ are formed of a material through which light can be in-coupled, out-coupled, and guided. Each of the ring resonator modulators 1215-$x$-$y$ is formed within a surrounding material that has an optical index of refraction sufficiently different from that of the ring resonator modulators 1215-$x$-$y$ to enable guiding of light within the ring resonator modulators 1215-$x$-$y$ and around the circuitous path defined by each of the ring resonator modulators 1215-$x$-$y$. In some embodiments, each of the ring resonator modulators 1215-$x$-$y$ is configured to have an annular-shape or disc-shape with an outer diameter of less than about 50 micrometers. In some embodiments, each of the ring resonator modulators 1215-$x$-$y$ is configured to have an annular-shape or disc-shape with an outer diameter of less than about 10 micrometers.

Each of the ring resonator modulators 1215-$x$-1 to 1215-$x$-3 is configured to operate at a respective resonant wavelength $\lambda_1$ to $\lambda_3$, such that the first portion of the incoming light and the polarization-rotated second portion of the incoming light having a wavelength ($\lambda_1$, $\lambda_2$, or $\lambda_3$) substantially equal to the respective resonant wavelength ($\lambda_1$, $\lambda_2$, or $\lambda_3$) of a given one of the ring resonator modulators 1215-$x$-1 to 1215-$x$-3 optically couples into the given one of the ring resonator modulators 1215-$x$-1 to 1215-$x$-3 from the corresponding optical waveguide 1213-$x$. Each of the ring resonator modulators 1215-$x$-$y$ operates to modulate light of a particular wavelength within the corresponding optical waveguide 1213-$x$ to convey a digital data. In some embodiments, the ring resonator modulators 1215-$x$-$y$ include photodetector devices to enable monitoring of the optical power coupled into each of the ring resonator modulators 1215-$x$-$y$. In some embodiments, the optical power measured by photodetectors within the ring resonator modulators 1215-$x$-$y$ is by the feedback circuitry 1015 to control the polarization controllers 1003-1 to 1003-N.

Figure 13:
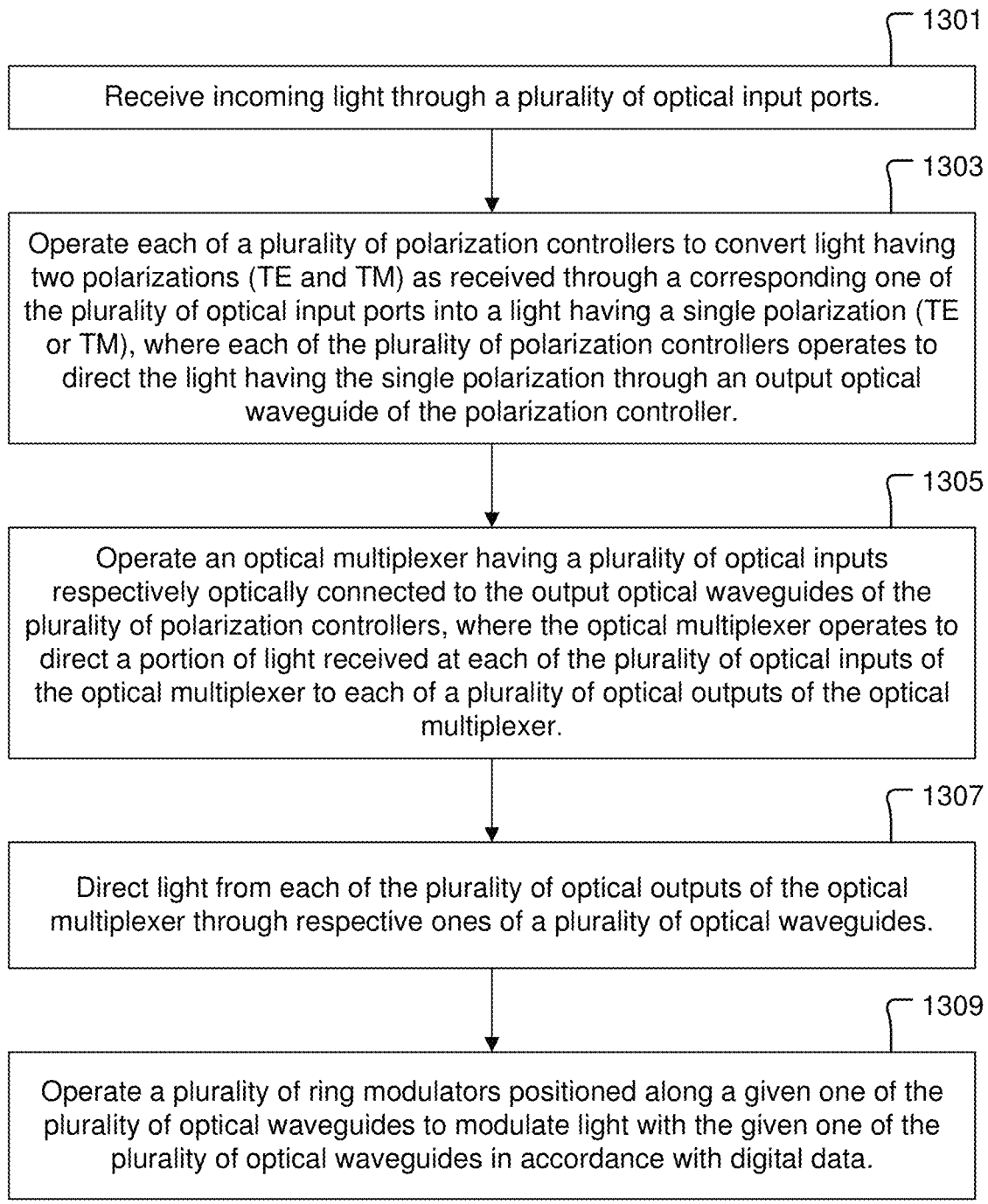
FIG. 13 shows a flowchart of a method for operating an electro-optic transmitter, in accordance with some embodiments.

FIG. 13 shows a flowchart of a method for operating an electro-optic transmitter, in accordance with some embodiments. In some embodiments, the method of FIG. 13 is practiced using the electro-optic transmitter 1200 of FIG. 12. The method includes an operation 1301 for receiving incoming light through a plurality of optical input ports (e.g., optical couplers 1203-1 to 1203-N). In some embodiments, the incoming light received through any given one of the plurality of optical input ports is continuous wave laser light of a single wavelength (e.g., any one of wavelengths $\lambda_1$ to $\lambda_N$). Also, the incoming light received through different ones of the plurality of optical input ports has different wavelengths. In this manner, each of the different optical input ports receives a different wavelength of continuous wave laser light. The method also includes an operation 1303 for operating a plurality of polarization controllers (e.g., polarization controllers 1003-1 to 1003-N). Each of the plurality of polarization controllers has an optical input respectively optically connected to the plurality of optical input ports. Each of the plurality of polarization controllers operates to convert light having two polarizations (TE and TM) as received through a corresponding one of the plurality of optical input ports into a light having a single polarization (TE or TM). Each of the plurality of polarization controllers operates to direct the light having the single polarization through an output optical waveguide (e.g., 1209-1 to 1209-N) of the polarization controller. In some embodiments, each of the plurality of polarization controllers is operated in accordance with the method of FIG. 11.

The method also includes an operation 1305 for operating an optical multiplexer (e.g., 1211) having a plurality of optical inputs (e.g., 1211A-1 to 1211A-N) respectively optically connected to the output optical waveguides of the plurality of polarization controllers. The optical multiplexer has a plurality of optical outputs (e.g., 1211B-1 to 1211B-N).

The optical multiplexer operates to direct a portion of light received at each of the plurality of optical inputs of the optical multiplexer to each of the plurality of optical outputs of the optical multiplexer. The method also includes an operation 1307 for directing light from each of the plurality of optical outputs of the optical multiplexer through respective ones of a plurality of optical waveguides (e.g., optical waveguides 1213-1 to 1213-N). Each of the plurality of optical waveguides has a first end and second end. The first end of each of the plurality of optical waveguides is respectively optically connected to the plurality of optical outputs of the optical multiplexer. The second end of each of the plurality of optical waveguides is respectively optically connected to a plurality of optical output ports (e.g., 1219-1 to 1219-N). The method also includes an operation 1309 for operating a plurality of ring resonator modulators (e.g., 1215-x-y) positioned along a given one of the plurality of optical waveguides to modulate light within the given one of the plurality of optical waveguides in accordance with digital data. In some embodiments, a separate plurality of ring resonator modulators is positioned along each of the plurality of optical waveguides, where each of the separate pluralities of ring resonator modulators are operated to modulate light within the corresponding optical waveguide in accordance with digital data.

Figure 14:
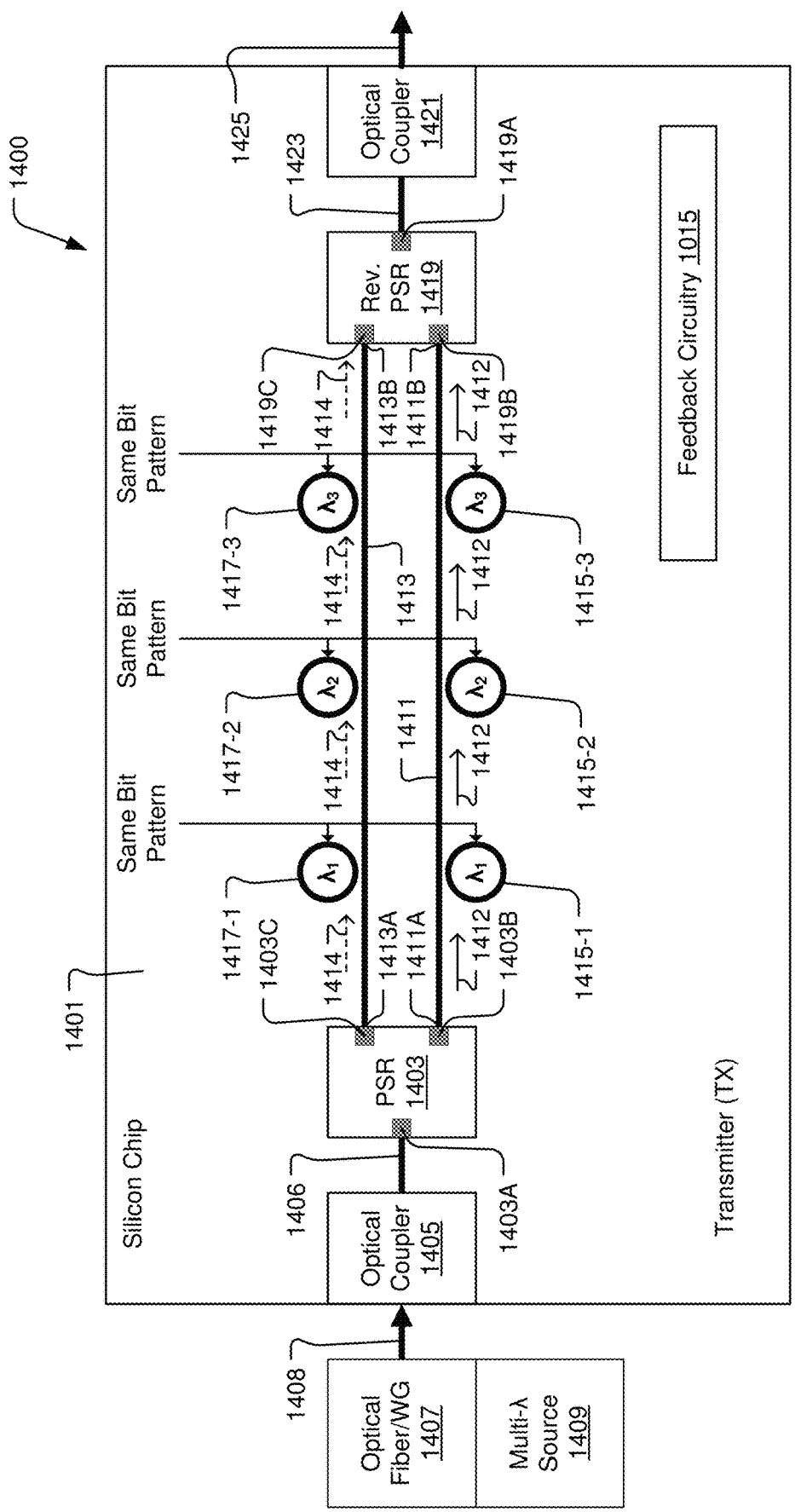
FIG. 14 shows an example configuration of an electro-optic transmitter implemented within a PIC, in accordance with some embodiments.

FIG. 14 shows an example configuration of an electro-optic transmitter 1400 implemented within a PIC 1401, in accordance with some embodiments. The electro-optic transmitter 1400 includes a first PSR 1403 that has an optical input 1403A optically connected to receive incoming light from an optical coupler 1405 through an optical waveguide 1406. In some embodiments, the optical input 1403A of the PSR 1403 is directly optically coupled to the optical coupler 1405, such that the optical waveguide 1406 is not required. In some embodiments, the optical coupler 1405 is implemented as an edge coupler. However, in other embodiments, the optical coupler 1405 is implemented as a vertical grating coupler, or as another type of optical coupling device that provides for optical coupling of the PIC 1401 to an optical fiber/waveguide 1407. Incoming light is transmitted from the optical fiber/waveguide 1407 into the optical coupler 1405, as indicated by arrow 1408. The optical fiber/waveguide 1407 is optically connected to receive and convey light from a multi-wavelength light source 1409. In some embodiments, the multi-wavelength light source 1409 is configured to transmit multiple wavelengths of continuous wave laser light through the optical fiber/waveguide 1407. In some embodiments, a polarization of the light transmitted by the multi-wavelength light source 1409 through the optical fiber/waveguide 1407 is uncontrolled and possibly varies over time.

The PSR 1403 has a first optical output 1403B and a second optical output 1403C. The PSR 1403 is configured to direct a first portion of the incoming light having a first polarization (TE or TM) through the first optical output 1403B. The PSR 1403 is also configured to rotate a polarization of a second portion of the incoming light from a second polarization (opposite of the first polarization) to the first polarization. In this manner, the PSR 1403 turns the second portion of the incoming light into a polarization-rotated second portion of the incoming light. The PSR 1403 is configured to direct the polarization-rotated second portion of the incoming light through the second optical output 1403C.

The electro-optic transmitter 1400 includes a first optical waveguide 1411 optically connected to the first optical output 1403B of the PSR 1403. The electro-optic transmitter 1400 also includes a second optical waveguide 1413 optically connected to the second optical output 1403C of the PSR 1403. The first optical waveguide 1411 and the second optical waveguide 1413 are formed of a material through which light can be in-coupled, out-coupled, and guided. Each of the first optical waveguide 1411 and the second optical waveguide 1413 is formed within a surrounding material that has an optical index of refraction sufficiently different from that of the first optical waveguide 1411 and the second optical waveguide 1413, respectively, to enable guiding of light within the first optical waveguide 1411 and the second optical waveguide 1413. In some embodiments, first optical waveguide 1411 and the second optical waveguide 1413 are formed of a same material. In some embodiments, the first portion of the incoming light is transmitted through the first optical output 1403B of the PSR 1403 and into the first optical waveguide 1411, and travels along the first optical waveguide 1411, as indicated by arrows 1412. Also, in these embodiments, the polarization-rotated second portion of the incoming light is transmitted through the second optical output 1403C of the PSR 1403 and into the second optical waveguide 1413, and travels along the second optical waveguide 1413, as indicated by arrows 1414. Alternatively, in some embodiments, the first portion of the incoming light is transmitted through the second optical output 1403C of the PSR 1403 and into the second optical waveguide 1413, and travels along the second optical waveguide 1413, as indicated by arrows 1414. Also, in these alternative embodiments, the polarization-rotated second portion of the incoming light is transmitted through the first optical output 1403B of the PSR 1403 and into the first optical waveguide 1411, and travels along the first optical waveguide 1411, as indicated by arrows 1412.

The electro-optic transmitter 1400 includes a first plurality (array) of ring resonator modulators 1415-1 to 1415-3 positioned along the first optical waveguide 1411 and within an evanescent optical coupling distance of the first optical waveguide 1411. While the example electro-optic transmitter 1400 shows three ring resonator modulators 1415-1 to 1415-3 for purposes of description, it should be understood that there is no limit on the number of ring resonator modulators in the first plurality of ring resonator modulators 1415-1 to 1415-3 that can be positioned along the first optical waveguide 1411, so long as the first plurality of ring resonator modulators 1415-1 to 1415-3 and associated signal processing circuitry can be spatially and electrically accommodated on the chip. Each of the ring resonator modulators 1415-1 to 1415-3 is configured to operate at a respective resonant wavelength $\lambda_1$ to $\lambda_3$, such that the first portion of the incoming light having a wavelength ($\lambda_1$, $\lambda_2$, or $\lambda_3$) substantially equal to the respective resonant wavelength ($\lambda_1$, $\lambda_2$, or $\lambda_3$) of a given one of the ring resonator modulators 1415-1 to 1415-3 optically couples into the given one of the ring resonator modulators 1415-1 to 1415-3 from the first optical waveguide 1411. In some embodiments, the ring resonator modulators 1415-1 to 1415-3 are implemented as annular-shaped waveguides having circuitous configuration, e.g., circular, oval, race-track, or another arbitrary circuitous shape. In some embodiments, the ring resonator modulators 1415-1 to 1415-3 are implemented as circular discs. The ring resonator modulators 1415-1 to 1415-3 are formed of a material through which light can be in-coupled, out-coupled, and guided. Each of the ring resonator modulators 1415-1 to 1415-3 is formed within a surrounding material that has an optical index of refraction sufficiently different from that of the ring resonator modulators 1415-1 to 1415-3 to enable guiding of light within the ring resonator modulators 1415-1 to 1415-3 and around the circuitous path defined by each of the ring resonators resonator modulators 1415-1 to 1415-3. In some embodiments, each of the ring resonator modulators 1415-1 to 1415-3 is configured to have an annular-shape or disc-shape with an outer diameter of less than about 50 micrometers. In some embodiments, each of the ring resonator modulators 1415-1 to 1415-3 is configured to have an annular-shape or disc-shape with an outer diameter of less than about 10 micrometers.

The electro-optic transmitter 1400 also includes a second plurality (array) of ring resonator modulators 1417-1 to 1417-3 positioned along the second optical waveguide 1413 and within an evanescent optical coupling distance of the second optical waveguide 1413. While the example electro-optic transmitter 1400 shows three ring resonator modulators 1417-1 to 1417-3 for purposes of description, it should be understood that there is no limit on the number of ring resonator modulators in the second plurality of ring resonator modulators 1417-1 to 1417-3 that can be positioned along the second optical waveguide 1413, so long as the second plurality of ring resonator modulators 1417-1 to 1417-3 and associated signal processing circuitry can be spatially and electrically accommodated on the chip. Each of the ring resonator modulators 1417-1 to 1417-3 is configured to operate at a respective resonant wavelength $\lambda_1$ to $\lambda_3$, such that the polarization-rotated second portion of the incoming light having a wavelength ($\lambda_1$, $\lambda_2$, or $\lambda_3$) substantially equal to the respective resonant wavelength ($\lambda_1$, $\lambda_2$, or $\lambda_3$) of a given one of the ring resonator modulators 1417-1 to 1417-3 optically couples into the given one of the ring resonator modulators 1417-1 to 1417-3 from the second optical waveguide 1413. In some embodiments, the ring resonator modulators 1417-1 to 1417-3 are implemented as annular-shaped waveguides having circuitous configuration, e.g., circular, oval, race-track, or another arbitrary circuitous shape. In some embodiments, the ring resonator modulators 1417-1 to 1417-3 are implemented as circular discs. The ring resonator modulators 1417-1 to 1417-3 are formed of a material through which light can be in-coupled, out-coupled, and guided. Each of the ring resonator modulators 1417-1 to 1417-3 is formed within a surrounding material that has an optical index of refraction sufficiently different from that of the ring resonator modulators 1417-1 to 1417-3 to enable guiding of light within the ring resonator modulators 1417-1 to 1417-3 and around the circuitous path defined by each of the ring resonators resonator modulators 1417-1 to 1417-3. In some embodiments, each of the ring resonator modulators 1417-1 to 1417-3 is configured to have an annular-shape or disc-shape with an outer diameter of less than about 50 micrometers. In some embodiments, each of the ring resonator modulators 1417-1 to 1417-3 is configured to have an annular-shape or disc-shape with an outer diameter of less than about 10 micrometers.

The first plurality of ring resonator modulators 1415-1 to 1415-3 and the second plurality of ring resonator modulators 1417-1 to 1417-3 form a plurality of ring resonator modulator pairs positioned along the first optical waveguide 1411 and the second optical waveguide 1413. Each ring resonator modulator pair of the plurality of ring resonator modulator pairs includes one ring resonator modulator (one of 1415-1 to 1415-3) positioned within an evanescent optical coupling distance of the first optical waveguide 1411 and one ring resonator modulator (one of 1417-1 to 1417-3) positioned within an evanescent optical coupling distance of the second optical waveguide 1413, where each of the plurality of ring resonator modulator pairs is configured to operate at a specified resonant wavelength (one of $\lambda_1$ to $\lambda_3$). Each ring resonator modulator within a given one of the plurality of ring resonator modulator pairs is configured to modulate a same bit pattern. For example, the pair of ring resonator modulators 1415-1 and 1417-1 is configured to modulate a same bit pattern. The pair of ring resonator modulators 1415-2 and 1417-2 is configured to modulate a same bit pattern. And, the pair of ring resonator modulators 1415-3 and 1417-3 is configured to modulate a same bit pattern, and so on.

The electro-optic transmitter 1400 includes a second PSR 1419 that has a reverse-connected optical input 1419A, a first reverse-connected optical output 1419B, and a second reverse-connected optical output 1419C. The second PSR 1419 is connected in a reversed manner in the electro-optic transmitter 1400, such that the first reverse-connected optical output 1419B and the second reverse-connected optical output 1419C are connected to function as respective optical inputs, and such that the reverse-connected optical input 1419A is connected to function as an optical output. In this manner, the second PSR 1419 functions as a polarization rotator and optical combiner. Specifically, the first reverse-connected optical output 1419B of the second PSR 1419 is optically connected to a second end of the first optical waveguide 1411, such that light conveyed through the first optical waveguide 1411 is received as input light into the first reverse-connected optical output 1419B. Also, the second reverse-connected optical output 1419C of the second PSR 1419 is optically connected to a second end of the second optical waveguide 1413, such that light conveyed through the second optical waveguide 1413 is received as input light into the second reverse-connected optical output 1419C. The reverse-connected optical input 1419A of the PSR 1419 is optically connected to output coupler 1421 of the electro-optic transmitter 1400 through an optical waveguide 1423. In this manner, the reverse-connected optical input 1419A actually operates as an optical output through which light is transmitted from the PSR 1419 through the optical waveguide 1423 to the output coupler 1421. Modulated output light is transmitted through the optical coupler 1421, as indicated by arrow 1425. In some embodiments, the reverse-connected optical input 1419A of the PSR 1419 is directly optically coupled to the optical coupler 1421, such that the optical waveguide 1423 is not required. In some embodiments, the optical coupler 1421 is implemented as an edge coupler. However, in other embodiments, the optical coupler 1421 is implemented as a vertical grating coupler, or as another type of optical coupling device that provides for optical coupling of the PIC 1401 to an optical fiber/waveguide.

In a reverse functional manner, the PSR 1419 is configured to direct modulated light based on the first portion of the incoming light (having the first polarization) as received from the first optical waveguide 1411 through the first reverse-connected optical output 1419B to the reverse-connected optical input 1419A and on to the optical coupler 1421. Also, in a reverse functional manner, the PSR 1419 is configured to rotate a polarization of modulated light based on the polarization-rotated second portion of the incoming light (having the first polarization), as received from the second optical waveguide 1413 through the second reverse-connected optical output 1419C, from the first polarization back to the second polarization (opposite of the first polarization). In this manner, the PSR 1419 turns the modulated light based on the polarization-rotated second portion of the incoming light (having the first polarization) into a polarization-derotated modulated light (having the second polarization). The PSR 1419 is configured to direct the polarization-derotated modulated light through the reverse-connected optical input 1419A and on to the optical coupler 1421. The reverse-implemented PSR 1419 allows optical signals to be combined without active phase control, as each optical signal is in a different polarization state when it gets combined and transmitted through the reverse-connected optical input 1419A of the PSR 1419 as a combined optical output signal which is then output through the optical coupler 1421 to an optical fiber/waveguide.

Figure 15:
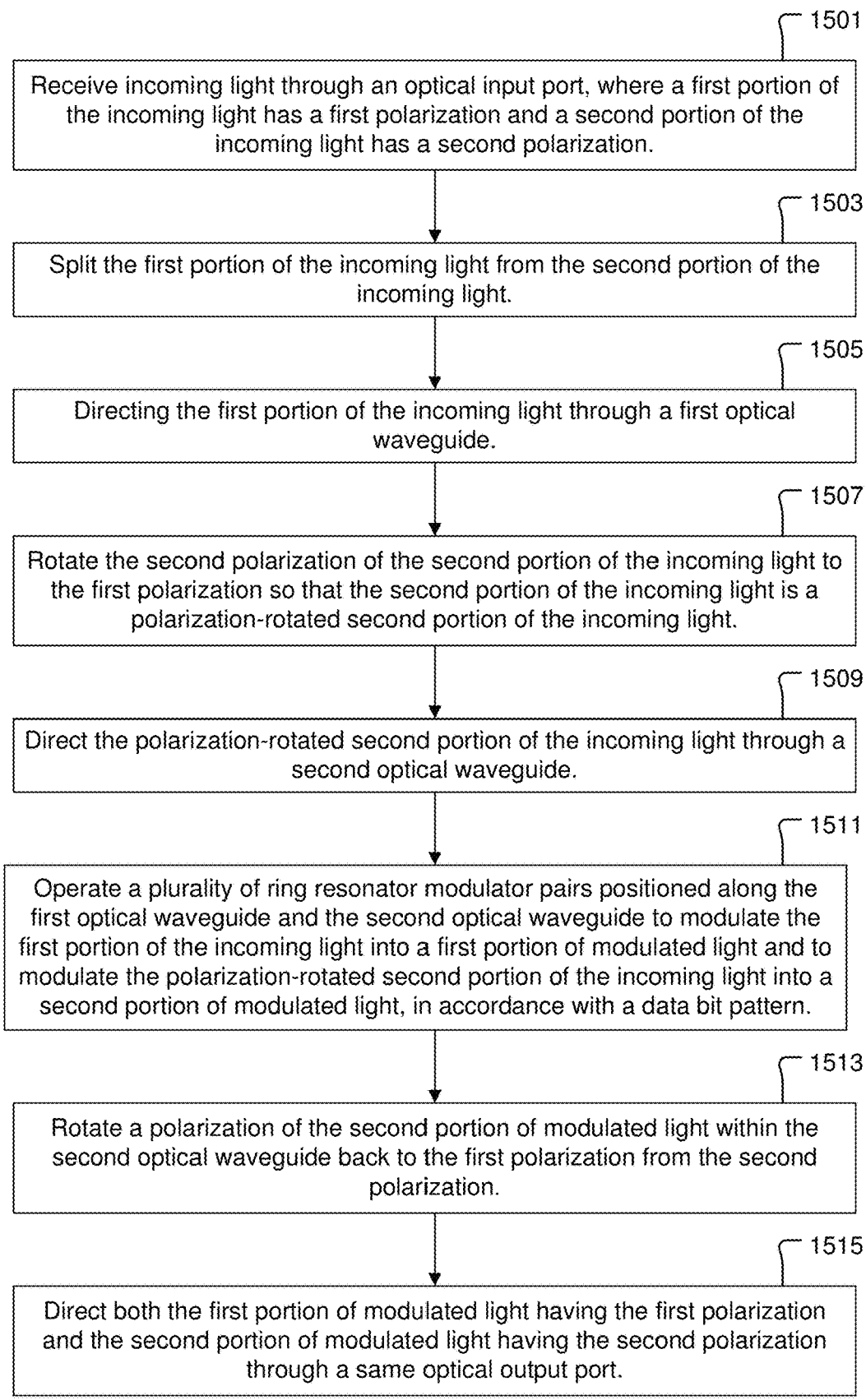
FIG. 15 shows a flowchart of a method for optical modulation, in accordance with some embodiments.

FIG. 15 shows a flowchart of a method for optical modulation, in accordance with some embodiments. In some embodiments, the method of FIG. 15 is practiced using the electro-optic transmitter 1400 of FIG. 14. The method includes an operation 1501 for receiving incoming light through an optical input port, where a first portion of the incoming light has a first polarization and a second portion of the incoming light has a second polarization. In some embodiments, the method of FIG. 15 is practiced using the electro-optic transmitter 1400 of FIG. 14. In some embodiments, the incoming light has an unknown polarization. In some embodiments, a polarization of the incoming light is uncontrolled and can possibly vary over time. The method includes an operation 1503 for splitting the first portion of the incoming light from the second portion of the incoming light. The method includes an operation 1505 for directing the first portion of the incoming light through a first optical waveguide (e.g., optical waveguide 1411). The method includes an operation 1507 for rotating the second polarization of the second portion of the incoming light to the first polarization so that the second portion of the incoming light is a polarization-rotated second portion of the incoming light. The method includes an operation 1509 for directing the polarization-rotated second portion of the incoming light through a second optical waveguide (e.g., optical waveguide 1413). In some embodiments, the operations 1501 through 1509 are performed by the PSR 1403.

The method includes an operation 1511 for operating a plurality of ring resonator modulator pairs (e.g., pairs of ring resonator modulators 1415-1 to 1415-3 and 1417-1 to 1417-3) positioned along the first optical waveguide and the second optical waveguide. Each ring resonator modulator pair of the plurality of ring resonator modulator pairs includes one ring resonator modulator positioned within an evanescent optical coupling distance of the first optical waveguide and one ring resonator modulator positioned within an evanescent optical coupling distance of the second optical waveguide. Each of the plurality of ring resonator modulator pairs is configured to operate at a specified resonant wavelength to modulate a same bit pattern onto light traveling through the first optical waveguide and the second optical waveguide to create a first portion of modulated light having the first polarization within the first optical waveguide and to create a second portion of modulated light having the first polarization within the second optical waveguide. The method includes an operation 1513 for rotating a polarization of the second portion of modulated light within the second optical waveguide back to the second polarization from the first polarization. The method also includes an operation 1515 for directing both the first portion of modulated light having the first polarization and the second portion of modulated light having the second polarization through a same optical output port (e.g., optical coupler 1421). In some embodiments, the operations 1513 and 1515 are performed by the reverse-implemented PSR 1419.

Figure 16:
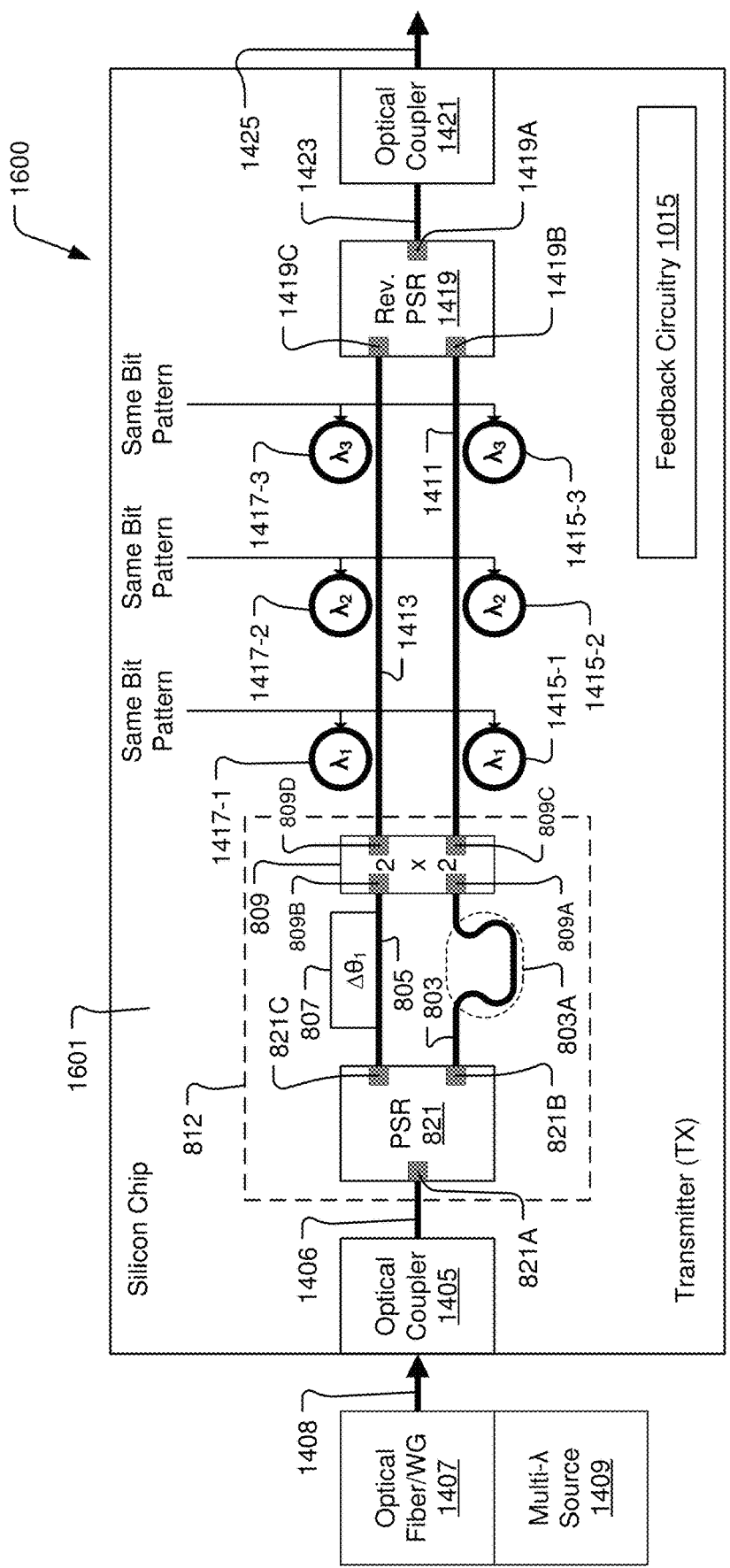
FIG. 16 shows an example configuration of an electro-optic transmitter implemented within a PIC, in accordance with some embodiments.

FIG. 16 shows an example configuration of an electro-optic transmitter 1600 implemented within a PIC 1601, in accordance with some embodiments. The electro-optic transmitter 1600 is a variation of the electro-optic transmitter 1400 of FIG. 14. Specifically, in the electro-optic transmitter 1600, the PSR 1403 of the electro-optic transmitter 1400 is replaced by the polarization equalizer 812 as previously described with regard to electro-optic receiver 800 of FIG. 8. The optical input 821A of the PSR 821 is optically connected to receive the incoming light from the optical coupler 1405, either through the optical waveguide 1406 or through direct optical coupling of the optical input 821A with the optical coupler 1405. The first optical output 809C of the two-by-two optical splitter 809 is optically connected to the first end of the first optical waveguide 1411. The second optical output 809D of the two-by-two optical splitter 809 is optically connected to the first end of the second optical waveguide 1413.

The electro-optic transmitter 1600 addresses a possible problematic situation in which either the first optical waveguide 803 or the second optical waveguide 805 conveys very little light due to most or all of the incoming light, as received through the optical coupler 1405, having one polarization (either mostly TE or mostly TM). In this situation, if the two-by-two optical splitter 809 were not implemented, it would be very difficult for any ring tuning algorithm to keep the operating resonant wavelengths of the ring resonator modulators 1415-1 to 1415-3 and 1417-1 to 1417-3 aligned with the corresponding channel wavelengths, respectively, in the incoming light signal, as received through the optical coupler 1405. Also, the above-mentioned situation is even more problematic when the polarization in the optical fiber/waveguide 1407 evolves over time, because the ring resonator modulators 1415-1 to 1415-3 and 1417-1 to 1417-3 will have to re-lock to the channel wavelengths as the optical power ramps up. If the ring resonator modulators 1415-1 to 1415-3 and 1417-1 to 1417-3 have to re-lock to changing channel wavelengths, an interruption will occur in the signal output by the electro-optic transmitter 1600. To address the above-mentioned situation, the electro-optic transmitter 1600 implements the polarization equalizer 812 that includes the two-by-two optical splitter 809 and the phase shifter 807 to ensure non-negligible optical power in each of the first optical waveguide 1411 and the second optical waveguide 1413 before the light reaches the ring resonator modulators 1415-1 to 1415-3 and 1417-1 to 1417-3. The two-by-two optical splitter 809 ensures that each of the first optical waveguide 1411 and the second optical waveguide 1413 conveys enough light of the first polarization to ensure that the ring resonators 1415-1 to 1415-3 and 1417-1 to 1417-3 can lock onto and maintain respective resonant wavelengths that substantially align with the channel wavelengths in the incoming light signal. In some embodiments, the phase shifter 807 uses active control as the polarization in the optical fiber/waveguide 1407 drifts over time. The active control of the phase shifter 807 is implemented by active control circuitry (feedback circuitry 1015). For example, in some embodiments, active control of the phase shifter 807 is implemented by active control circuitry that measures optical power in the ring resonator modulators 1415-1 to 1415-3 and 1417-1 to 1417-3, and uses that measured optical power as feedback signals to adjust the operation of the phase shifter 807 as needed to track with the polarization in the optical fiber/waveguide 1407.

Figure 17:
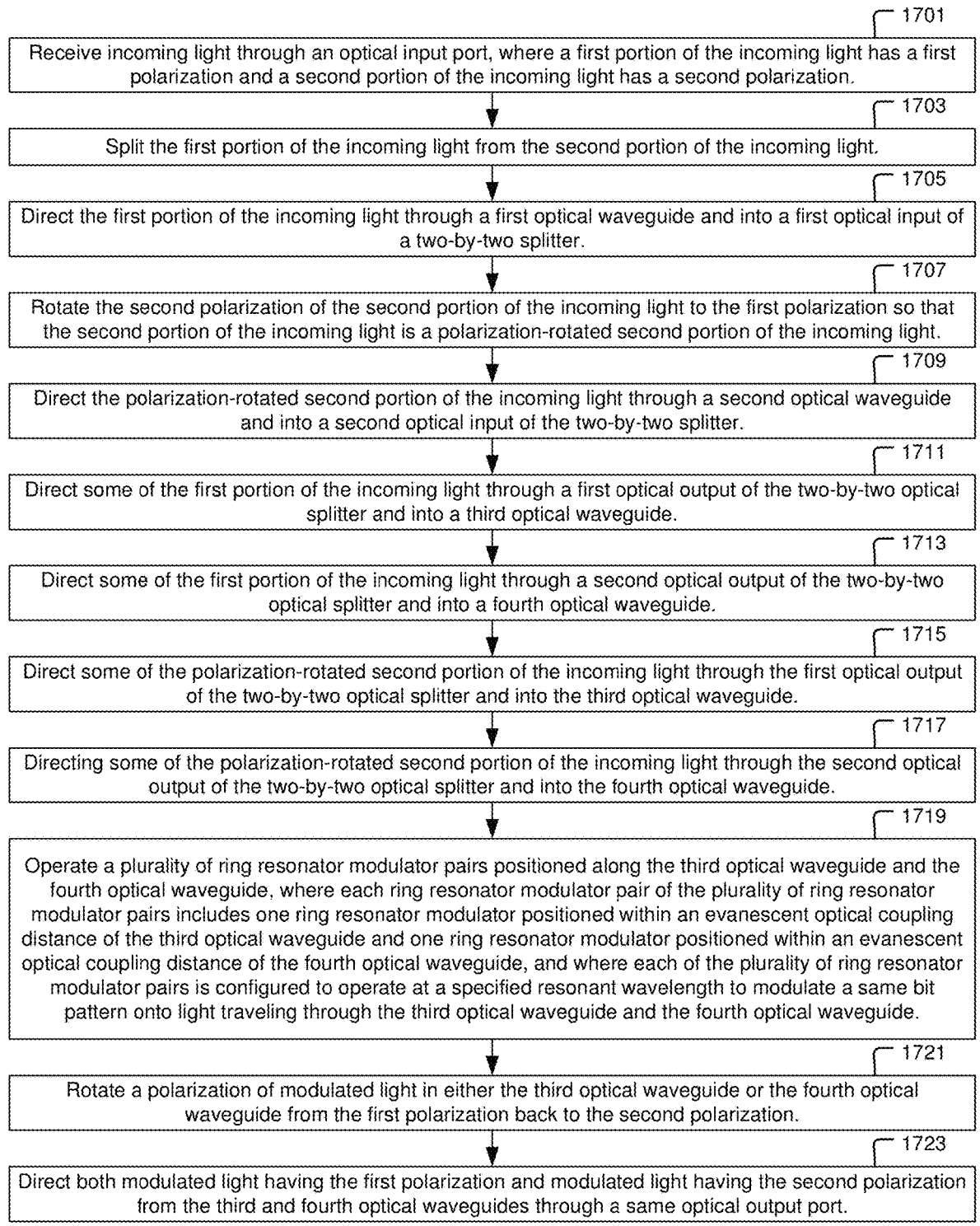
FIG. 17 shows a flowchart of a method for optical modulation, in accordance with some embodiments.

FIG. 17 shows a flowchart of a method for optical modulation, in accordance with some embodiments. In some embodiments, the method of FIG. 17 is practiced using the electro-optic transmitter 1600 of FIG. 16. The method includes an operation 1701 for receiving incoming light through an optical input port (e.g., optical coupler 1405), where a first portion of the incoming light has a first polarization and a second portion of the incoming light has a second polarization. The method also includes an operation 1703 for splitting the first portion of the incoming light from the second portion of the incoming light. The method also includes an operation 1705 for directing the first portion of the incoming light through a first optical waveguide (e.g., optical waveguide 1411) and into a first optical input (e.g., 809A) of a two-by-two splitter (e.g., 809). The method also includes an operation 1707 for rotating the second polarization of the second portion of the incoming light to the first polarization so that the second portion of the incoming light is a polarization-rotated second portion of the incoming light. The method also includes an operation 1709 for directing the polarization-rotated second portion of the incoming light through a second optical waveguide (e.g., optical waveguide 805) and into a second optical input (e.g., 809B) of the two-by-two splitter. In some embodiments, the operations 1701 through 1709 are performed by the PSR 821.

The method also includes an operation 1711 for directing some of the first portion of the incoming light through a first optical output (e.g., 809C) of the two-by-two optical splitter and into a third optical waveguide (e.g., the optical waveguide 1411). The method also includes an operation 1713 for directing some of the first portion of the incoming light through a second optical output (e.g., 809D) of the two-by-two optical splitter and into a fourth optical waveguide (e.g., the optical waveguide 1413). The method also includes an operation 1715 for directing some of the polarization-rotated second portion of the incoming light through the first optical output (e.g., 809C) of the two-by-two optical splitter and into the third optical waveguide (e.g., 1411). The method also includes an operation 1717 for directing some of the polarization-rotated second portion of the incoming light through the second optical output (e.g., 809D) of the two-by-two optical splitter and into the fourth optical waveguide (e.g., 1413).

The method also includes an operation 1719 for operating a plurality of ring resonator modulator pairs (e.g., ring resonator modulators 1415-1 to 1415-3 and 1417-1 to 1417-3) positioned along the third optical waveguide (e.g., 1411) and the fourth optical waveguide (e.g., 1413), where each ring resonator modulator pair of the plurality of ring resonator modulator pairs includes one ring resonator modulator positioned within an evanescent optical coupling distance of the third optical waveguide (e.g., 1411) and one ring resonator modulator positioned within an evanescent optical coupling distance of the fourth optical waveguide (e.g., 1413). Each of the plurality of ring resonator modulator pairs is configured to operate at a specified resonant wavelength to modulate a same bit pattern onto light traveling through the third optical waveguide (e.g., 1411) and the fourth optical waveguide (e.g., 1413). The method also includes an operation 1721 for rotating a polarization of modulated light in either the third optical waveguide (e.g., 1411) or the fourth optical waveguide (e.g., 1413) from the first polarization back to the second polarization. The method also includes an operation 1723 for directing both modulated light having the first polarization and modulated light having the second polarization from the third and fourth optical waveguides through a same optical output port (e.g., optical coupler 1421). In some embodiments, the operations 1721 through 1723 are performed by the reverse-implemented PSR 1419.

Figure 18:
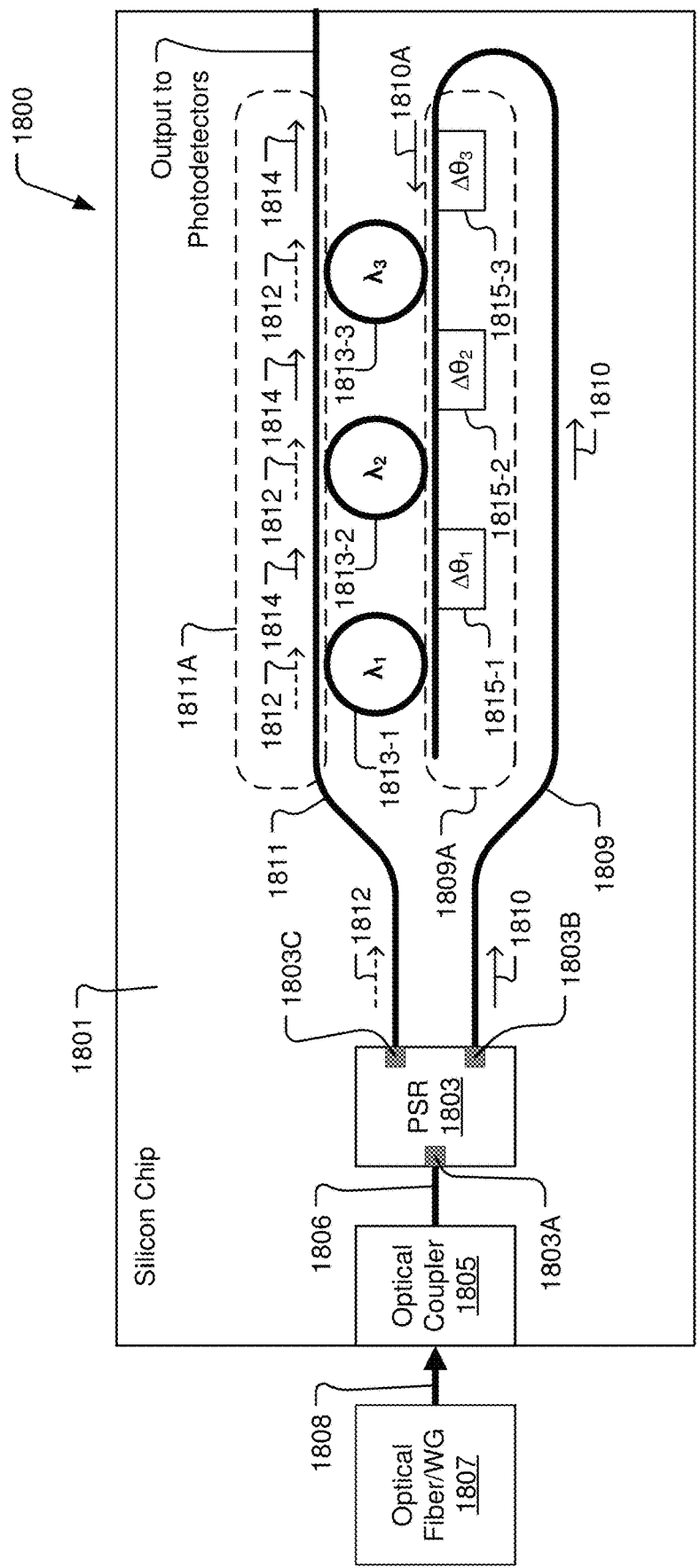
FIG. 18 shows an example configuration of an electro-optic combiner implemented within a PIC, in accordance with some embodiments.

FIG. 18 shows an example configuration of an electro-optic combiner 1800 implemented within a PIC 1801, in accordance with some embodiments. The electro-optic combiner 1800 includes a PSR 1803 that has an optical input 1803A optically connected to receive incoming light from an optical coupler 1805, by way of an optical waveguide 1806. In some embodiments, the optical input 1803A of the PSR 1803 is directly optically coupled to the optical coupler 1805, such that the optical waveguide 1806 is not required. In some embodiments, the optical coupler 1805 is implemented as an edge coupler. However, in other embodiments, the optical coupler 1805 is implemented as a vertical grating coupler, or as another type of optical coupling device that provides for optical coupling of the PIC 1801 to an optical fiber/waveguide 1807. Incoming light is transmitted from the optical fiber/waveguide 1807 into the optical coupler 1805, as indicated by arrow 1808. The PSR 1803 has a first optical output 1803B and a second optical output 1803C. The PSR 1803 is configured to direct a first portion of the incoming light having a first polarization (TE or TM) through the first optical output 1803B. The PSR 1803 is also configured to rotate a polarization of a second portion of the incoming light from a second polarization (opposite of the first polarization) to the first polarization. In this manner, the PSR 1803 turns the second portion of the incoming light into a polarization-rotated second portion of the incoming light. The PSR 1803 is configured to direct the polarization-rotated second portion of the incoming light through the second optical output 1803C. Alternatively, in some embodiments, the first portion of the incoming light having a first polarization is transmitted through the second optical output 1803C, and the polarization-rotated second portion of the incoming light is transmitted through the first optical output 1803B.

The electro-optic combiner 1800 includes a first optical waveguide 1809 optically connected to the first optical output 1803B of the PSR 1803. The electro-optic combiner 1800 also includes a second optical waveguide 1811 optically connected to the second optical output 1803C of the PSR 1803. The first optical waveguide 1809 and the second optical waveguide 1811 are formed of a material through which light can be in-coupled, out-coupled, and guided. Each of the first optical waveguide 1809 and the second optical waveguide 1811 is formed within a surrounding material that has an optical index of refraction sufficiently different from that of the first optical waveguide 1809 and the second optical waveguide 1811, respectively, to enable guiding of light within the first optical waveguide 1809 and the second optical waveguide 1811. In some embodiments, first optical waveguide 1809 and the second optical waveguide 1811 are formed of a same material. In some embodiments, the first portion of the incoming light is transmitted through the first optical output 1803B of the PSR 1803 and into the first optical waveguide 1809, and travels along the first optical waveguide 1809, as indicated by arrow 1810. Also, the first polarization-rotated second portion of the incoming light is transmitted through the second optical output 1803C of the PSR 1803 and into the second optical waveguide 1811, and travels along the second optical waveguide 1811, as indicated by arrow 1812. The first optical waveguide 1809 is configured to reverse its direction into a combiner section 1809A of the first optical waveguide 1809. In this manner, light travels through the combiner section 1809A of the first optical waveguide 1809 in a direction, as indicated by arrow 1810A, that is opposite of the direction (arrow 1812) that light travels through the second optical waveguide 1811. Alternatively, in some embodiments, the first portion of the incoming light is transmitted through the second optical output 1803C of the PSR 1803 and into the second optical waveguide 1811, and travels along the second optical waveguide 1811, as indicated by arrow 1812. Also, in these alternative embodiments, the polarization-rotated second portion of the incoming light is transmitted through the first optical output 1803B of the PSR 1803 and into the first optical waveguide 1809, and travels along the first optical waveguide 1809 as indicated by arrow 1810, and back through the combiner section 1809A of the first optical waveguide 1809 as indicated by arrow 1810A.

The electro-optic combiner 1800 also includes a plurality of ring resonators 1813-1 to 1813-3 disposed between the combiner section 1809A of the first optical waveguide 1809 and a combiner section 1811A of the second optical waveguide 1811. While the example electro-optic combiner 1800 shows three ring resonators 815-1 to 815-3 for purposes of description, it should be understood that there is no limit on the number of these ring resonators, so long as the ring resonators and associated signal processing circuitry can be spatially and electrically accommodated on the chip. In some embodiments, the ring resonators 1813-1 to 1813-3 are implemented as annular-shaped waveguides having circuitous configuration, e.g., circular, oval, race-track, or another arbitrary circuitous shape. In some embodiments, the ring resonators 1813-1 to 1813-3 are implemented as circular discs. The ring resonators 1813-1 to 1813-3 are formed of a material through which light can be in-coupled, out-coupled, and guided. Each of the ring resonators 1813-1 to 1813-3 is formed within a surrounding material that has an optical index of refraction sufficiently different from that of the ring resonators 1813-1 to 1813-3 to enable guiding of light within the ring resonators 1813-1 to 1813-3 and around the circuitous path defined by each of the ring resonators 1813-1 to 1813-3. In some embodiments, each of the ring resonators 1813-1 to 1813-3 is configured to have an annular-shape or disc-shape with an outer diameter of less than about 50 micrometers. In some embodiments, each of the ring resonators 1813-1 to 1813-3 is configured to have an annular-shape or disc-shape with an outer diameter of less than about 10 micrometers.

Each of the plurality of ring resonators 1813-1 to 1813-3 is positioned within an evanescent optically coupling distance of both the combiner section 1809A of the first optical waveguide 1809 and the combiner section 1811A of the second optical waveguide 1811. A light propagation direction through the combiner section 1809A of the first optical waveguide 1809 is opposite of a light propagation direction through the combiner section 1811A of the second optical waveguide 1811. Each of the plurality of ring resonators 1813-1 to 1813-3 is configured to operate at a respective resonant wavelength ($\lambda_1$ to $\lambda_3$), such that light having a wavelength substantially equal to the respective resonant wavelength of a given one of the plurality of ring resonators 1813-1 to 1813-3 optically couples from the combiner section 1811A of the optical waveguide 1811 into the given one of the plurality of ring resonators 1813-1 to 1813-3. The light that is coupled into the ring resonators 1813-1 to 1813-3 travels around the ring resonators 1813-1 to 1813-3 in a clockwise direction and couples into the combiner section 1811A of the second optical waveguide 1811, as indicated by arrows 1814. In this manner, the light output from the PSR 1803 into the first optical waveguide 1809 is combined with the light output by the PSR 1803 into the second optical waveguide 1811. The combined light within the second optical waveguide 1811 after the combiner section 1811A of the second optical waveguide 1811 (with respect to the light propagations directions 1812 and 1814) is output from the electro-optic combiner 1800. In some embodiments, the combined light is output from the electro-optic combiner 1800 to photodetectors. However, in other embodiments, the combined light is output from the electro-optic combiner 1800 to essentially any type of photonic device, as needed. The ring resonators 1813-1 to 1813-3 function as passive filters to combine the light signals output by the PSR 1803.

Also, the electro-optic combiner 1800 includes a plurality of phase shifters 1815-1 to 1815-3 optically coupled to the first optical waveguide 1809. Each of the plurality of phase shifters 1815-1 to 1815-3 is positioned before a respective one of the plurality of ring resonators 1813-1 to 1813-3 with respect to the light propagation direction 1810A through the combiner section 1809A of the second optical waveguide 1809. In this manner, in some embodiments, a number of the plurality of phase shifters 1815-1 to 1815-3 is equal to a number of the plurality of ring resonators 1813-1 to 1813-3. In some embodiments, each of the phase shifters 1815-1 to 1815-3 is implemented as a thermal tuner (e.g., heating device) positioned over the combiner section 1809A of the first optical waveguide 1809, which operates by exploiting the thermo-optic effect of the first optical waveguide 1809 material. In some embodiments, each of the phase shifters 1815-1 to 1815-3 is implemented as an electro-optic device (e.g., diode) built into the combiner section 1809A of the first optical waveguide 1809, which operates by exploiting electro-optic effects within the first optical waveguide 1809. In some embodiments, each of the phase shifters 1815-1 to 1815-3 is implemented as a set of ring resonators. Each of the plurality of phase shifters 1815-1 to 1815-3 is configured to apply a controlled amount of shift to a phase of light traveling through the first optical waveguide 1809. The phase shifters 1815-1 to 1815-3 are controlled/operated to ensure proper phase matching between the light signals within the first optical waveguide 1809 and the second optical waveguide 1811. The phase shifters 1815-1 to 1815-3 are tuned along with the resonance wavelengths of the ring resonators 1813-1 to 1813-3 to account for phase and intensity imbalances over time within the first optical waveguide 1809 and the second optical waveguide 1811. In some embodiments, the electro-optic combiner 1800 does not require a timing-skew management system.

Figure 19:
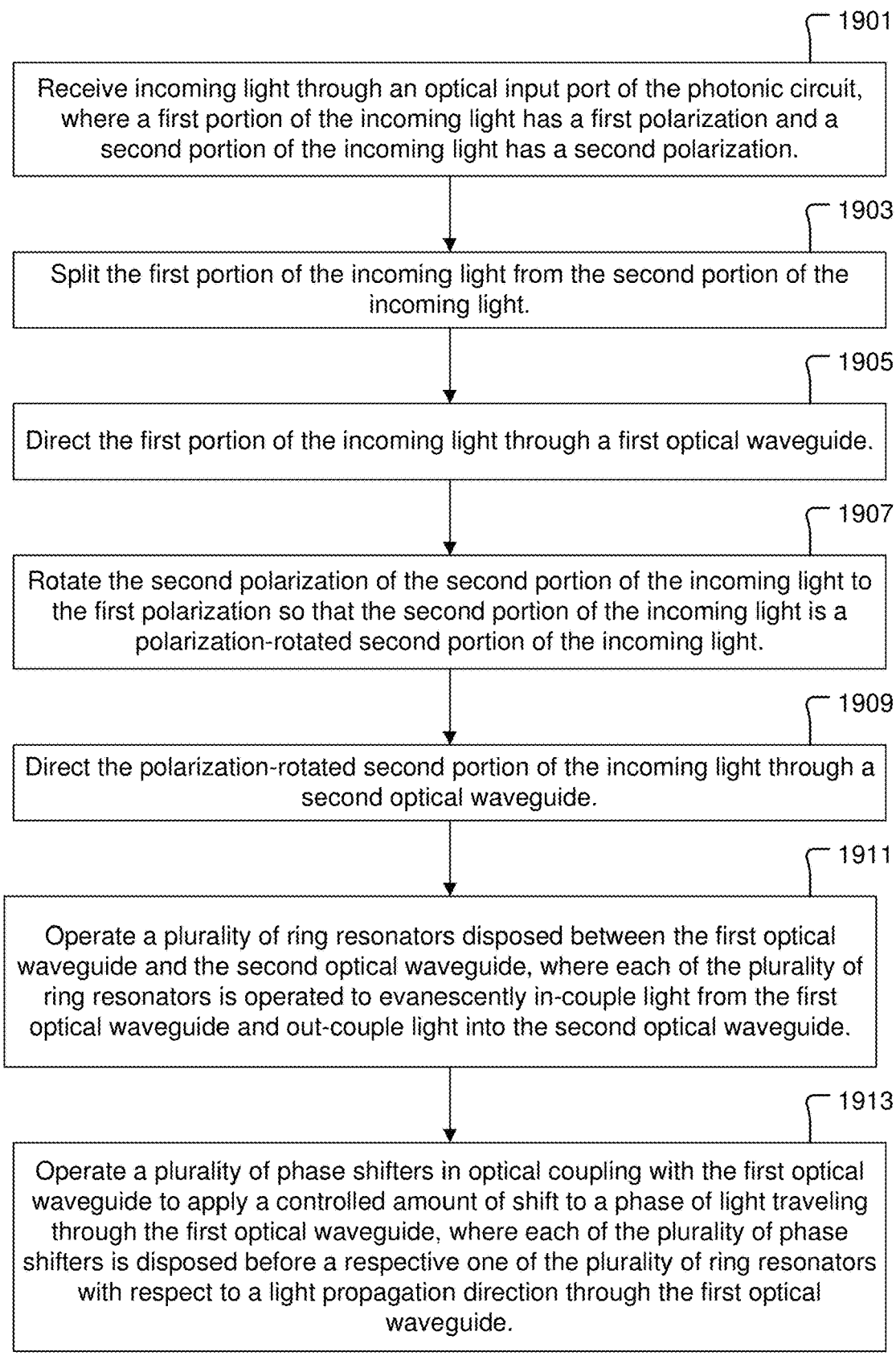
FIG. 19 shows a flowchart of a method for combination of optical signals, in accordance with some embodiments.

FIG. 19 shows a flowchart of a method for combination of optical signals, in accordance with some embodiments. In some embodiments, the method of FIG. 19 is practiced using the electro-optic combiner 1800 of FIG. 18. The method includes an operation 1901 for receiving incoming light through an optical input port (e.g., optical coupler 1805) of the photonic circuit (e.g., PIC 1801), where a first portion of the incoming light has a first polarization and a second portion of the incoming light has a second polarization. The method also includes an operation 1903 for splitting the first portion of the incoming light from the second portion of the incoming light. The method also includes an operation 1905 for directing the first portion of the incoming light through a first optical waveguide (e.g., optical waveguide 1809). The method also includes an operation 1907 for rotating the second polarization of the second portion of the incoming light to the first polarization so that the second portion of the incoming light is a polarization-rotated second portion of the incoming light. The method also includes an operation 1909 for directing the polarization-rotated second portion of the incoming light through a second optical waveguide (e.g., optical waveguide 1811). In some embodiments, the operations 1903 through 1909 are performed by the PSR 1803.

The method also includes an operation 1911 for operating a plurality of ring resonators (e.g., 1813-1 to 1813-3) disposed between the first optical waveguide and the second optical waveguide, where each of the plurality of ring resonators is operated to evanescently in-couple light from the first optical waveguide and out-couple light into the second optical waveguide. Each of the plurality of ring resonators is configured to operate at a respective resonant wavelength, such that light having a wavelength substantially equal to the respective resonant wavelength of a given one of the plurality of ring resonators optically couples from the first optical waveguide into the given one of the plurality of ring resonators. The method also includes an operation 1913 for operating a plurality of phase shifters (e.g., 1815-1 to 1815-3) in optical coupling with the first optical waveguide to apply a controlled amount of shift to a phase of light traveling through the first optical waveguide. Each of the plurality of phase shifters is disposed before a respective one of the plurality of ring resonators with respect to a light propagation direction through the first optical waveguide. In some embodiments, the method includes directing light from an output portion of the second optical waveguide to one or more photodetectors, where the output portion of the second optical waveguide is located after the plurality of ring resonators with respect to the light propagation direction through the second optical waveguide.

Figure 20:
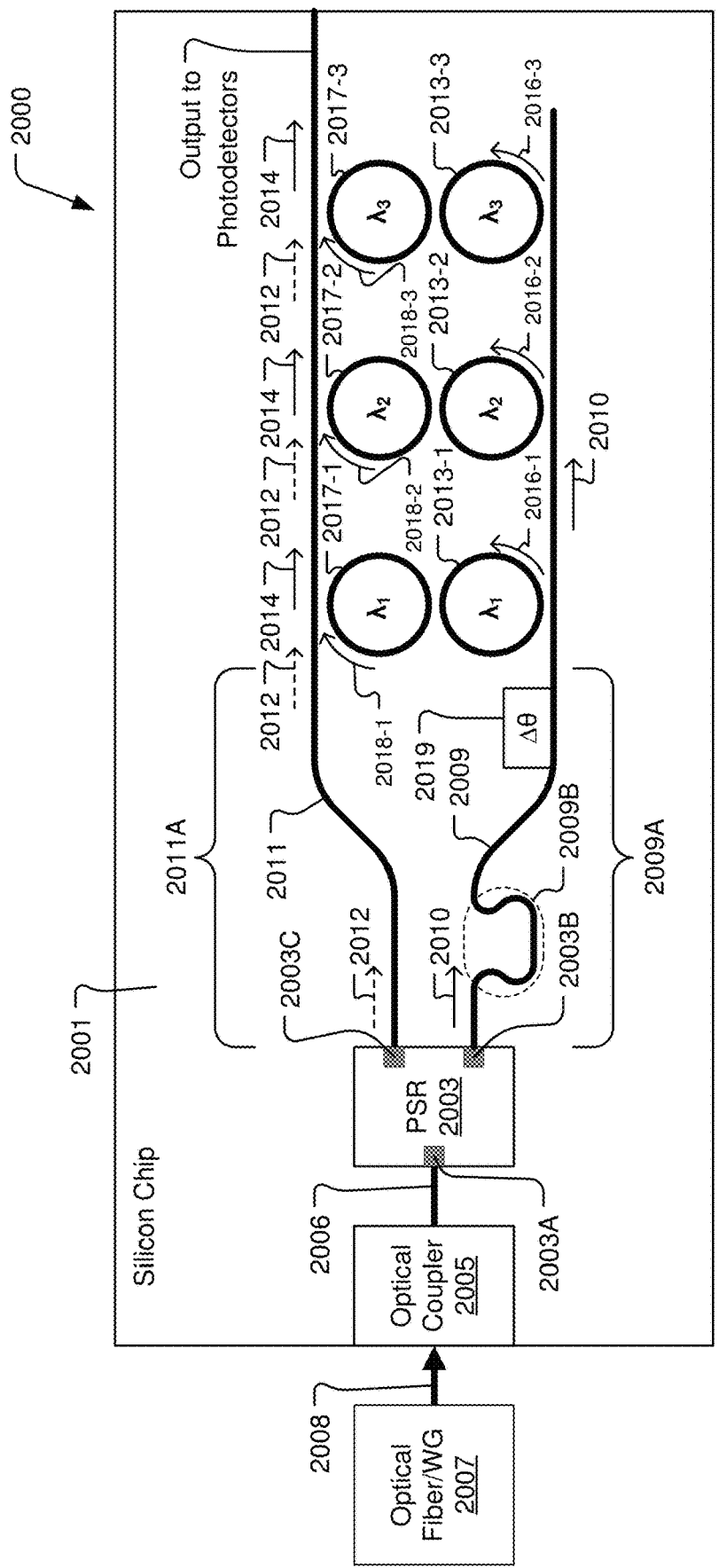
FIG. 20 shows an example configuration of an electro-optic combiner implemented within a PIC, in accordance with some embodiments.

FIG. 20 shows an example configuration of an electro-optic combiner 2000 implemented within a PIC 2001, in accordance with some embodiments. The electro-optic combiner 2000 includes a PSR 2003 that has an optical input 2003A optically connected to receive incoming light from an optical coupler 2005, by way of an optical waveguide 2006. In some embodiments, the optical input 2003A of the PSR 2003 is directly optically coupled to the optical coupler 2005, such that the optical waveguide 2006 is not required. In some embodiments, the optical coupler 2005 is implemented as an edge coupler. However, in other embodiments, the optical coupler 2005 is implemented as a vertical grating coupler, or as another type of optical coupling device that provides for optical coupling of the PIC 2001 to an optical fiber/waveguide 2007. Incoming light is transmitted from the optical fiber/waveguide 2007 into the optical coupler 2005, as indicated by arrow 2008. The PSR 2003 has a first optical output 2003B and a second optical output 2003C. The PSR 2003 is configured to direct a first portion of the incoming light having a first polarization (TE or TM) through the first optical output 2003B. The PSR 2003 is also configured to rotate a polarization of a second portion of the incoming light from a second polarization (opposite of the first polarization) to the first polarization. In this manner, the PSR 2003 turns the second portion of the incoming light into a polarization-rotated second portion of the incoming light. The PSR 2003 is configured to direct the polarization-rotated second portion of the incoming light through the second optical output 2003C. Alternatively, in some embodiments, the first portion of the incoming light having a first polarization is transmitted through the second optical output 2003C, and the polarization-rotated second portion of the incoming light is transmitted through the first optical output 2003B.

The electro-optic combiner 2000 includes a first optical waveguide 2009 optically connected to the first optical output 2003B of the PSR 2003. The electro-optic combiner 2000 also includes a second optical waveguide 2011 optically connected to the second optical output 2003C of the PSR 2003. The first optical waveguide 2009 and the second optical waveguide 2011 are formed of a material through which light can be in-coupled, out-coupled, and guided. Each of the first optical waveguide 2009 and the second optical waveguide 2011 is formed within a surrounding material that has an optical index of refraction sufficiently different from that of the first optical waveguide 2009 and the second optical waveguide 2011, respectively, to enable guiding of light within the first optical waveguide 2009 and the second optical waveguide 2011. In some embodiments, first optical waveguide 2009 and the second optical waveguide 2011 are formed of a same material. In some embodiments, the first portion of the incoming light is transmitted through the first optical output 2003B of the PSR 2003 and into the first optical waveguide 2009, and travels along the first optical waveguide 2009, as indicated by arrow 2010. Also, the polarization-rotated second portion of the incoming light is transmitted through the second optical output 2003C of the PSR 2003 and into the second optical waveguide 2011, and travels along the second optical waveguide 2011, as indicated by arrow 2012. Alternatively, in some embodiments, the first portion of the incoming light is transmitted through the second optical output 2003C of the PSR 2003 and into the second optical waveguide 2011, and travels along the second optical waveguide 2011, as indicated by arrow 2012. Also, in these alternative embodiments, the polarization-rotated second portion of the incoming light is transmitted through the first optical output 2003B of the PSR 2003 and into the first optical waveguide 2009, and travels along the first optical waveguide 2009 as indicated by arrow 2010.

The electro-optic combiner 2000 includes a first plurality of ring resonators 2013-1 to 2013-3 positioned along the first optical waveguide 2010 and within an evanescent optical coupling distance of the first optical waveguide 2010. The electro-optic combiner 2000 also includes a second plurality of ring resonators 2017-1 to 2017-3 positioned along the second optical waveguide 2011 and within an evanescent optical coupling distance of the second optical waveguide 2011. The first plurality of ring resonators 2013-1 to 2013-3 and the second plurality of ring resonators 2017-1 to 2017-3 are positioned between the first optical waveguide 2009 and the second optical waveguide 2011. Each of the second plurality of ring resonators 2017-1 to 2017-3 is positioned to optically in-couple light from a respective one of the first plurality of ring resonators 2013-1 to 2013-3. While the example electro-optic combiner 2000 shows three ring resonators 2013-1 to 2013-3 and three ring resonators 2017-1 to 2017-3 for purposes of description, it should be understood that there is no limit on the number of these ring resonators, so long as the ring resonators and associated signal processing circuitry can be spatially and electrically accommodated on the chip. Also, a number of the second plurality of ring resonators 2017-1 to 2017-3 is equal to a number of the first plurality of ring resonators 2013-1 to 2013-3, such that the first plurality of ring resonators 2013-1 to 2013-3 and the second plurality of ring resonators 2017-1 to 2017-3 collectively form a plurality of pairs of ring resonators, where each ring resonator within a given pair of ring resonators is operated at a same resonant wavelength. Each pair of ring resonators 2013-1/2017-1 to 2013-3/2017-3 is functions as a double-ring filter. The ring resonance wavelength of the double ring filter can be tuned relative to the channel wavelength to account for the phase and intensity imbalance of the first optical waveguide 2009 and the second optical waveguide 2011 over time.

In some embodiments, the ring resonators 2013-1 to 2013-3 and 2017-1 to 2017-3 are implemented as annular-shaped waveguides having circuitous configuration, e.g., circular, oval, race-track, or another arbitrary circuitous shape. In some embodiments, the ring resonators 2013-1 to 2013-3 and 2017-1 to 2017-3 are implemented as circular discs. The ring resonators 2013-1 to 2013-3 and 2017-1 to 2017-3 are formed of a material through which light can be in-coupled, out-coupled, and guided. Each of the ring resonators 2013-1 to 2013-3 and 2017-1 to 2017-3 is formed within a surrounding material that has an optical index of refraction sufficiently different from that of the ring resonators 2013-1 to 2013-3 and 2017-1 to 2017-3 to enable guiding of light within the ring resonators 2013-1 to 2013-3 and 2017-1 to 2017-3 and around the circuitous path defined by each of the ring resonators 2013-1 to 2013-3 and 2017-1 to 2017-3. In some embodiments, each of the ring resonators 2013-1 to 2013-3 and 2017-1 to 2017-3 is configured to have an annular-shape or disc-shape with an outer diameter of less than about 50 micrometers. In some embodiments, each of the ring resonators 2013-1 to 2013-3 and 2017-1 to 2017-3 is configured to have an annular-shape or disc-shape with an outer diameter of less than about 10 micrometers.

The first plurality of ring resonators 2013-1 to 2013-3 in-couples light from the first optical waveguide 2009 and out-couples light into respective ones of the second plurality of ring resonators 2017-1 to 2017-3. The second plurality of ring resonators 2017-1 to 2017-3 in-couples light from respective ones of the first plurality of ring resonators 2013-1 to 2013-3 and out-couples light into the second optical waveguide 2011. In this manner, the first plurality of ring resonators 2013-1 to 2013-3 and the second plurality of ring resonators 2017-1 to 2017-3 collectively operate to couple light from the first optical waveguide 2009 to the second optical waveguide 2011, as indicated by arrows 2014. A light propagation direction through the first plurality of ring resonators 2013-1 to 2013-3 is opposite of a light propagation direction through the second plurality of ring resonators 2017-1 to 2017-3. In the example electro-optic combiner 2000, light propagates in a counter-clockwise direction, as indicated by arrows 2016-1 to 2016-3, within each of the first plurality of ring resonators 2013-1 to 2013-3, and light propagates in a clockwise direction, as indicated by arrows 2018-1 to 2018-3, within each of the second plurality of ring resonators 2017-1 to 2017-3.

Each of the first plurality of ring resonators 2013-1 to 2013-3 is configured to operate at a respective resonant wavelength ($\lambda_1$ to $\lambda_3$), such that light having a wavelength substantially equal to the respective resonant wavelength of a given one of the first plurality of ring resonators 2013-1 to 2013-3 optically couples from the first optical waveguide 2009 into the given one of the plurality of ring resonators 2013-1 to 2013-3. Each of the second plurality of ring resonators 2017-1 to 2017-3 is configured to operate at a respective resonant wavelength ($\lambda_1$ to $\lambda_3$), such that light having a wavelength substantially equal to the respective resonant wavelength of a given one of the second plurality of ring resonators 2017-1 to 2017-3 optically couples from the corresponding one of the first plurality of ring resonators 2013-1 to 2013-3 into the given one of the second plurality of ring resonators 2017-1 to 2017-3. The light that is coupled into the second plurality of ring resonators 2017-1 to 2017-3 travels around the second plurality of ring resonators 2017-1 to 2017-3 in a clockwise direction and couples into the second optical waveguide 2011, as indicated by arrows 2014. In this manner, the light output from the PSR 2003 into the first optical waveguide 2009 is combined with the light output by the PSR 2003 into the second optical waveguide 2011. The combined light within the second optical waveguide 2011 after the second plurality of ring resonators 2017-1 to 2017-3 (with respect to the light propagations directions 2012 and 2014) is output from the electro-optic combiner 2000. In some embodiments, the combined light is output from the electro-optic combiner 2000 to photodetectors. However, in other embodiments, the combined light is output from the electro-optic combiner 2000 to essentially any type of photonic device, as needed. The ring resonators 2013-1 to 2013-3 and 2017-1 to 2017-3 function as passive filters to combine the light signals output by the PSR 2003.

In some embodiments, the first optical waveguide 2009 includes a first section 2009A extending from the first optical output 2003B of the PSR 2003 to a nearest one (2013-1) of the first plurality of ring resonators 2013-1 to 2013-3 to the PSR 2003. Also, the second optical waveguide 2011 includes a first section 2011A extending from the second optical output 2003C of the PSR 2003 to a nearest one (2017-1) of the second plurality of ring resonators 2017-1 to 2017-3 to the PSR 2003. In these embodiments, either the first section 2009A of the first optical waveguide 2009 is longer than the first section 2011A of the second optical waveguide 2011, or the first section 2011A of the second optical waveguide 2011 is longer than the first section 2009A of the first optical waveguide 2009, in order to compensate for a timing delay between the first portion of the incoming light exiting the PSR 2003 and the polarization-rotated second portion of the incoming light exiting the PSR 2003, so as to minimize a timing-skew (timing difference) between transmission of the first portion of the incoming light into the first optical waveguide 2009 and transmission of the polarization-rotated second portion of the incoming light into the second optical waveguide 2011. In the example electro-optic combiner 2000, the first section 2009A of the first optical waveguide 2009 includes a delay section 2009B configured so that the optical path length through the first section 2009A of the first optical waveguide 2009 is longer than the optical path length through the first section 2011A of the second optical waveguide 2011. The delay section 2009B is configured to compensate for the timing delay between the first portion of the incoming light exiting the PSR 2003 and the polarization-rotated second portion of the incoming light exiting the PSR 2003. The delay section 2009B is configured to ensure broadband operation of the electro-optic combiner 2000. The delay section 2009B is designed to compensate for the differential group delay between the two polarizations accumulated when propagating through PIC 2001 components such as the optical coupler 2005, the PSR 2003, and routing waveguides 2006, 2009, 2011. In the absence of the delay section 2009B, a plurality of independent phase shifters can be optically coupled to the first optical waveguide 2009, such that one of the plurality of independent phase shifters is positioned before a respective one of the first plurality of ring resonators 2013-1 to 2013-3 (similar to the phase shifters 1815-1 to 1815-3 described with regard to FIG. 18).

With the delay section 2009B provided with the first section 2009A of the first optical waveguide 2009, the electro-optic combiner 2000 is able to implement a single phase shifter 2019 on either the first optical waveguide 2009 or the second optical waveguide 2011 at a position before the ring resonator pairs 2013-1/2017-1 to 2013-3/2017-3. In the example electro-optic combiner 2000, the phase shifter 2019 is implemented on the first optical waveguide 2009 before the first ring resonator 2013-1 of the first plurality of ring resonators 2013-1 to 2013-3. The phase shifter 2019 is tuned along with the resonance wavelength of each of the ring resonator pairs 2013-1/2017-1 to 2013-3/2017-3, relative to the wavelength of the channel of the incoming light signal to which the ring resonator pair couples, to ensure low-loss combining of the optical signals into the second optical waveguide 2011 (the output waveguide). In some embodiments, the phase shifter 2019 is implemented as a thermal tuner (e.g., heating device) positioned over the first optical waveguide 2009, which operates by exploiting the thermo-optic effect of the first optical waveguide 2009 material. In some embodiments, the phase shifter 2019 is implemented as an electro-optic device (e.g., diode) built into the first optical waveguide 2009, which operates by exploiting electro-optic effects within the first optical waveguide 2009. In some embodiments, the phase shifter 2019 is implemented as a set of ring resonators.

Figure 21:
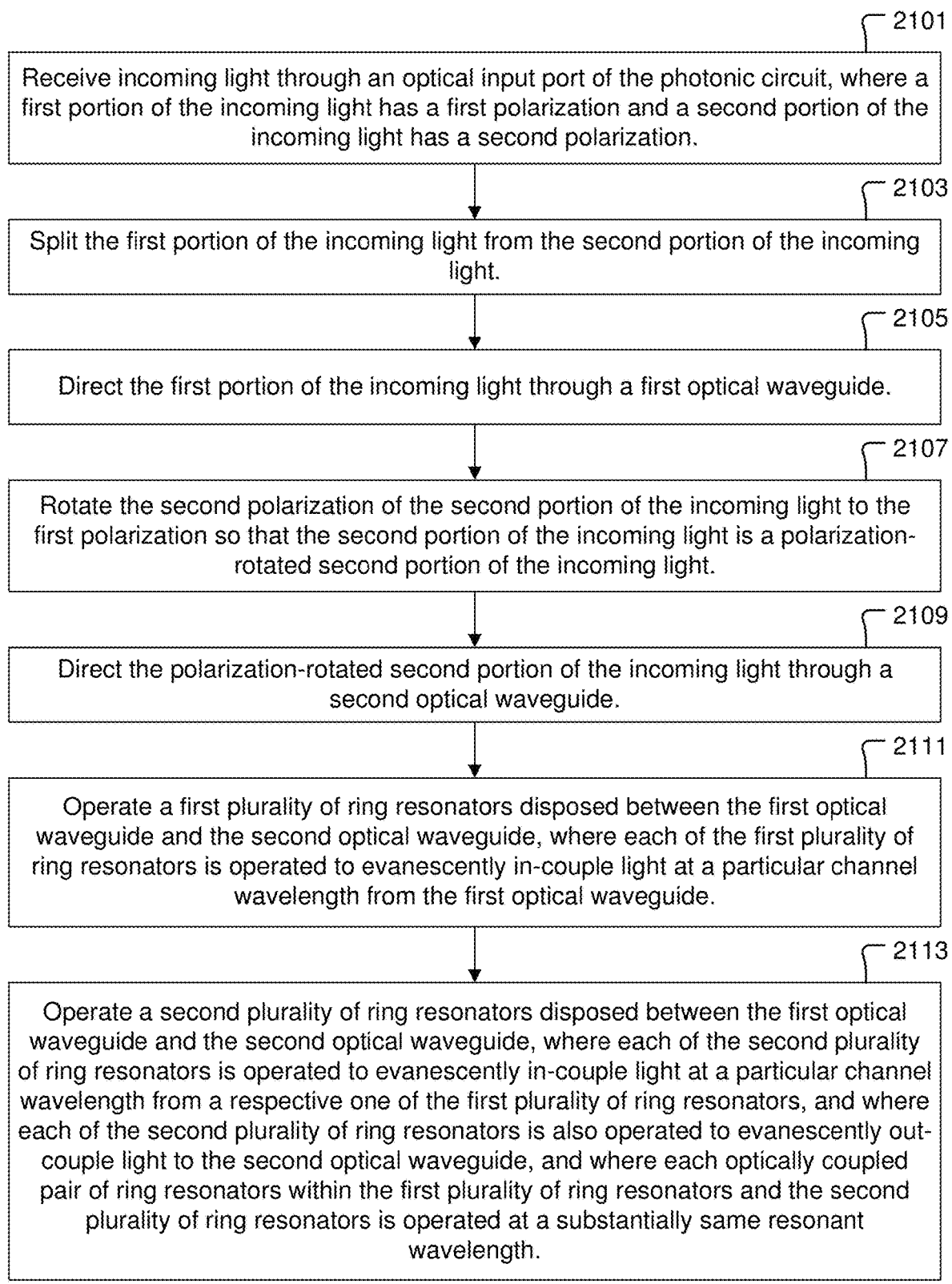
FIG. 21 shows a flowchart of a method for combination of optical signals, in accordance with some embodiments.

FIG. 21 shows a flowchart of a method for combination of optical signals, in accordance with some embodiments. In some embodiments, the method of FIG. 21 is practiced using the electro-optic combiner 2000 of FIG. 20. The method includes an operation 2101 for receiving incoming light through an optical input port (e.g., optical coupler 2005) of the photonic circuit (e.g., PIC 2001), where a first portion of the incoming light has a first polarization and a second portion of the incoming light has a second polarization. The method includes an operation 2103 for splitting the first portion of the incoming light from the second portion of the incoming light. The method includes an operation 2105 for directing the first portion of the incoming light through a first optical waveguide (e.g., optical waveguide 2009). The method includes an operation 2107 for rotating the second polarization of the second portion of the incoming light to the first polarization so that the second portion of the incoming light is a polarization-rotated second portion of the incoming light. The method includes an operation 2109 for directing the polarization-rotated second portion of the incoming light through a second optical waveguide (e.g., optical waveguide 2011). In some embodiments, the operations 2103 through 2109 are performed by the PSR 2003. The method includes an operation 2111 for operating a first plurality of ring resonators (e.g., 2013-1 to 2013-3) disposed between the first optical waveguide and the second optical waveguide, where each of the first plurality of ring resonators is operated to evanescently in-couple light at a particular channel wavelength from the first optical waveguide. The method includes an operation 2113 for operating a second plurality of ring resonators (e.g., 2017-1 to 2017-3) disposed between the first optical waveguide and the second optical waveguide, where each of the second plurality of ring resonators is operated to evanescently in-couple light at a particular channel wavelength from a respective one of the first plurality of ring resonators. Each of the second plurality of ring resonators is also operated to evanescently out-couple light to the second optical waveguide. Each optically coupled pair of ring resonators within the first plurality of ring resonators and the second plurality of ring resonators is operated at a substantially same resonant wavelength. Also, each optically coupled pair of ring resonators within the first plurality of ring resonators and the second plurality of ring resonators has an opposite light propagation direction. In some embodiments, the method includes operating a phase shifter (e.g., phase shifter 2019) in optical coupling with the first optical waveguide to apply a controlled amount of shift to a phase of light traveling through the first optical waveguide. Also, in some embodiments, the method also includes routing light from a output section of the second optical waveguide to one or more photodetectors, wherein the output section of the second optical waveguide is located after the second plurality of ring resonators with respect to a light propagation direction through the second optical waveguide.

Figure 22:
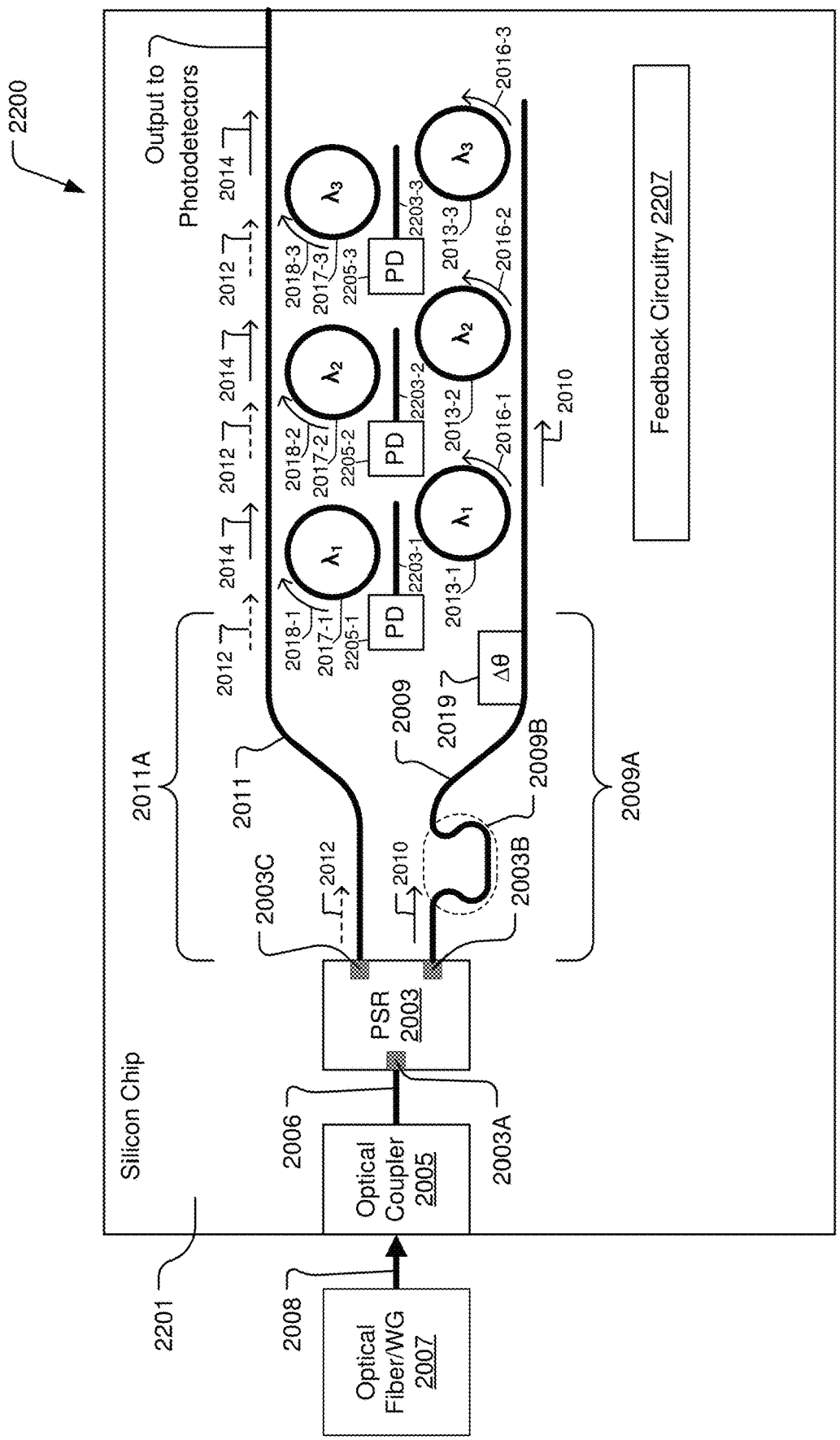
FIG. 22 shows an example configuration of an electro-optic combiner implemented within a PIC, in accordance with some embodiments.

FIG. 22 shows an example configuration of an electro-optic combiner 2200 implemented within a PIC 2201, in accordance with some embodiments. The electro-optic combiner 2200 is a modification of the electro-optic combiner 2000 of FIG. 20. Specifically, the electro-optic combiner 2200 includes all of the components of the electro-optic combiner 2000, and further includes a plurality of intermediate optical waveguides 2203-1 to 2203-3 respectively disposed between the first plurality of ring resonators 2013-1 to 2013-3 and the second plurality of ring resonators 2017-1 to 2017-3. Each of the plurality of intermediate optical waveguides 2203-1 to 2203-3 is positioned between a corresponding one of the first plurality of ring resonators 2013-1 to 2013-3 configured to operate at a specified resonant wavelength and a corresponding one of the second plurality of ring resonators 2017-1 to 2017-3 configured to operate at the same specified resonant wavelength. Light having the specified resonant wavelength optically couples from the first optical waveguide 2009 to the corresponding one of the first plurality of ring resonators 2013-1 to 2013-3, and from the corresponding one of the first plurality of ring resonators 2013-1 to 2013-3 to the corresponding one of the plurality of intermediate optical waveguide 2203-1, and from the intermediate optical waveguide 2203-1 to 2203-3 to the corresponding one of the second plurality of ring resonators 2017-1 to 2017-3, and from the corresponding one of the second plurality of ring resonators 2017-1 to 2017-3 to the second optical waveguide 2011. In some embodiments, each of the plurality of intermediate optical waveguides 2203-1 to 2203-3 has a substantially linear shape and is oriented to have a substantially same lengthwise direction of extent. In some embodiments, such as shown in FIG. 22, the first plurality of ring resonators 2013-1 to 2013-3 and the second plurality of ring resonators 2017-1 to 2017-3 are offset with respect to each other in a direction substantially parallel to the lengthwise direction of extent of the plurality of intermediate optical waveguides 2203-1 to 2203-3.

The electro-optic combiner 2200 also includes a plurality of photodetectors 2205-1 to 2205-3 respectively optically connected to the plurality of intermediate optical waveguides 2203-1 to 2203-3, such that some of the light that optically couples into a given one of the plurality of intermediate optical waveguides 2203-1 to 2203-3 from the corresponding one of the first plurality of ring resonators 2013-1 to 2013-3 is conveyed into one of the plurality of photodetectors 2205-1 to 2205-3 that is optically connected to the given one of the plurality of intermediate optical waveguides 2203-1 to 2203-3. In some embodiments, the electro-optic combiner 2200 includes feedback circuitry 2207 configured to control the resonant wavelengths of the first plurality of ring resonators 2013-1 to 2013-3 and the second plurality of ring resonators 2017-1 to 2017-3 using electrical signals (photocurrent signals) output from corresponding ones of the plurality of photodetectors 2205-1 to 2205-3. Also, in some embodiments, the feedback circuitry 2207 is configured to control the phase shifter 2019 using electrical signals output from the plurality of photodetectors 2205-1 to 2205-3. The plurality of intermediate optical waveguides 2203-1 to 2203-3 advantageously provide for better control over the evanescent optical coupling between the first plurality of ring resonators 2013-1 to 2013-3 and respective ones of the second plurality of ring resonators 2017-1 to 2017-3. The plurality of intermediate optical waveguides 2203-1 to 2203-3 also advantageously provide a linear optical tap to feed into a feedback control system (feedback circuitry 2207) for the first plurality of ring resonators 2013-1 to 2013-3, the second plurality of ring resonators 2017-1 to 2017-3, and the phase shifter 2019. In some embodiments, the optimal tuning of the first plurality of ring resonators 2013-1 to 2013-3 and the second plurality of ring resonators 2017-1 to 2017-3, and the optimum phase shift in the first optical waveguide 2009 by the phase shifter 2019 will result in a minimum amount of optical power entering each of the plurality of photodetectors 2205-1 to 2205-3, which allows a control system to separately and independently optimize the output transmission for each wavelength channel in the incoming light signal.

Figure 23:
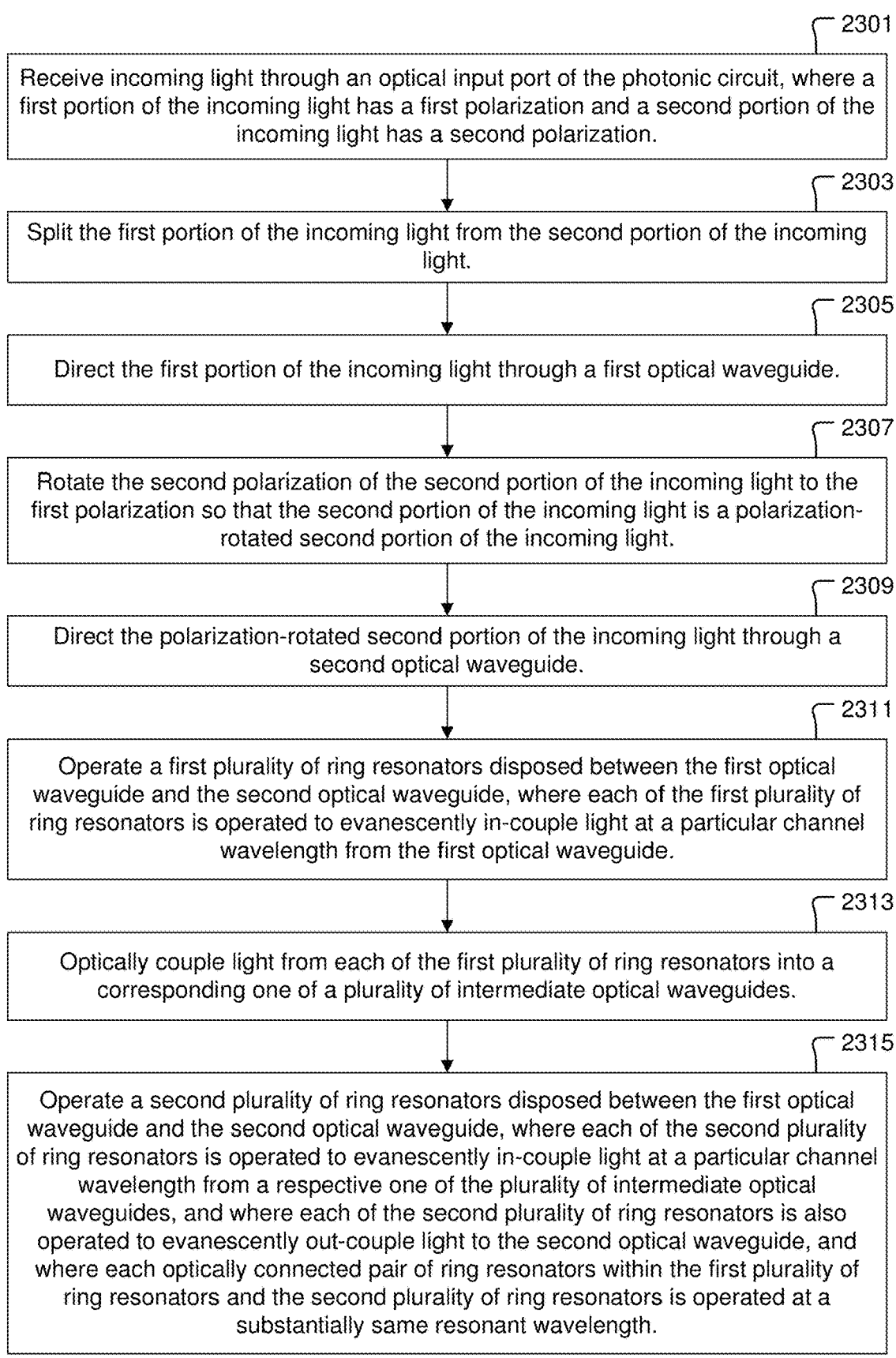
FIG. 23 shows a flowchart of a method for combination of optical signals, in accordance with some embodiments.

FIG. 23 shows a flowchart of a method for combination of optical signals, in accordance with some embodiments. In some embodiments, the method of FIG. 23 is practiced using the electro-optic combiner 2200 of FIG. 22. The method includes an operation 2301 for receiving incoming light through an optical input port (e.g., optical coupler 2005) of the photonic circuit (e.g., PIC 2001), where a first portion of the incoming light has a first polarization and a second portion of the incoming light has a second polarization. The method includes an operation 2303 for splitting the first portion of the incoming light from the second portion of the incoming light. The method includes an operation 2305 for directing the first portion of the incoming light through a first optical waveguide (e.g., optical waveguide 2009). The method includes an operation 2307 for rotating the second polarization of the second portion of the incoming light to the first polarization so that the second portion of the incoming light is a polarization-rotated second portion of the incoming light. The method includes an operation 2309 for directing the polarization-rotated second portion of the incoming light through a second optical waveguide (e.g., optical waveguide 2011). In some embodiments, the operations 2303 through 2309 are performed by the PSR 2003. The method includes an operation 2311 for operating a first plurality of ring resonators (e.g., 2013-1 to 2013-3) disposed between the first optical waveguide and the second optical waveguide, where each of the first plurality of ring resonators is operated to evanescently in-couple light at a particular channel wavelength from the first optical waveguide.

The method also includes an operation 2313 for optically coupling light from each of the first plurality of ring resonators into a corresponding one of a plurality of intermediate optical waveguides (e.g., optical waveguides 2203-1 to 2203-3). The method includes an operation 2315 for operating a second plurality of ring resonators (e.g., 2017-1 to 2017-3) disposed between the first optical waveguide and the second optical waveguide, where each of the second plurality of ring resonators is operated to evanescently in-couple light at a particular channel wavelength from a respective one of the plurality of intermediate optical waveguides. Each of the second plurality of ring resonators is also operated to evanescently out-couple light to the second optical waveguide. Each optically connected pair of ring resonators within the first plurality of ring resonators and the second plurality of ring resonators is operated at a substantially same resonant wavelength. Also, each optically connected pair of ring resonators within the first plurality of ring resonators and the second plurality of ring resonators has an opposite light propagation direction. In some embodiments, the method includes operating a phase shifter (e.g., phase shifter 2019) in optical coupling with the first optical waveguide to apply a controlled amount of shift to a phase of light traveling through the first optical waveguide. Also, in some embodiments, the method includes routing light from a output section of the second optical waveguide to one or more photodetectors, wherein the output section of the second optical waveguide is located after the second plurality of ring resonators with respect to a light propagation direction through the second optical waveguide.

In some embodiments, the method includes operating a plurality of photodetectors (e.g., photodetectors 2205-1 to 2205-3) to detect an amount light optically coupled into a respective ones of the plurality of intermediate optical waveguides. In some embodiments, the method includes controlling resonant wavelengths of the first plurality of ring resonators and the second plurality of ring resonators in accordance with photocurrents generated by corresponding ones of the plurality of photodetectors to optimize an amount of optical power conveyed from the first optical waveguide to the second optical waveguide by way of the first plurality of ring resonators, the plurality of intermediate waveguides, and the second plurality of ring resonators. In some embodiments, the method includes controlling operation of the phase shifter in accordance with photocurrents generated by the plurality of photodetectors.

Figure 24A:
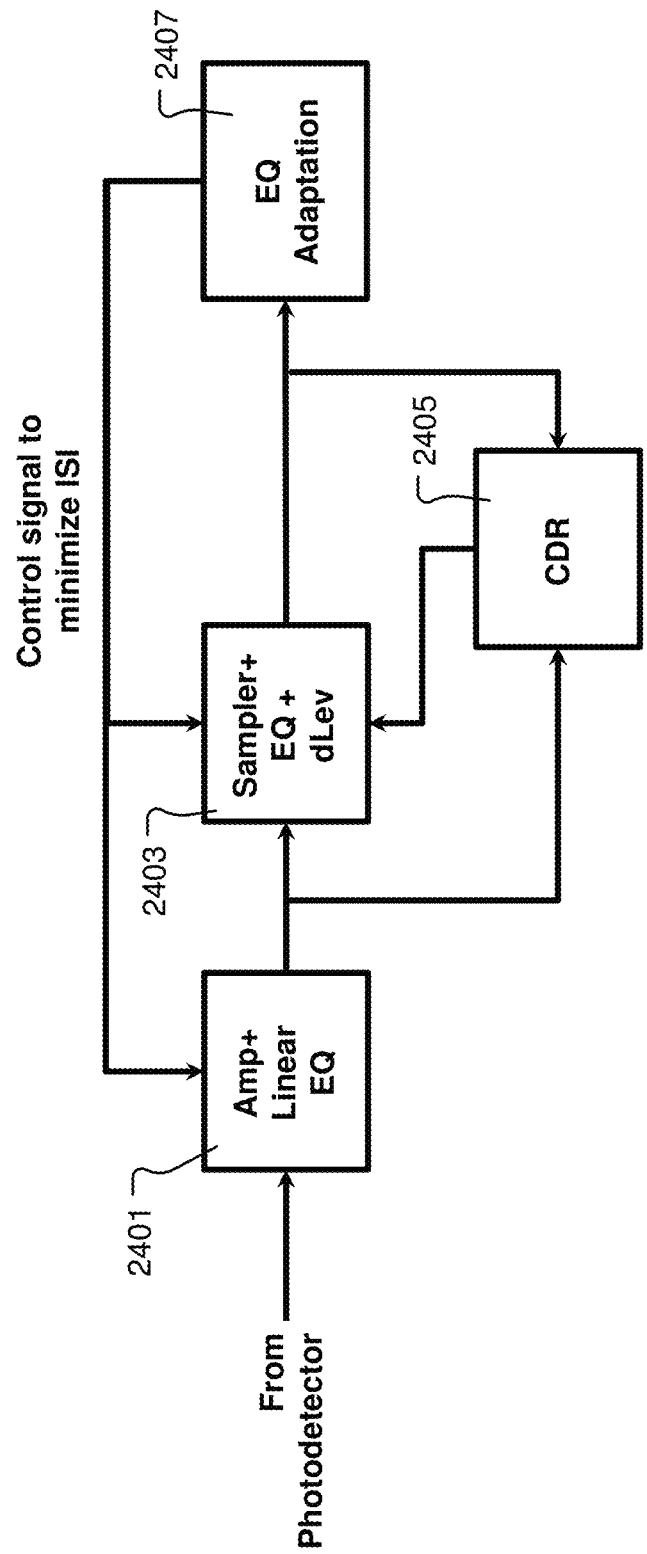
FIG. 24A shows a diagram of an electro-optic receiver that is configured to tolerate polarization-dependent timing-skew, in accordance with some embodiments.

FIG. 24A shows a diagram of an electro-optic receiver that is configured to tolerate polarization-dependent timing-skew, in accordance with some embodiments. The electro-optic receiver accepts photocurrent from a photodetector and performs amplification and linear equalization, as indicated by block 2401. In some embodiments, the linear equalization is used to cancel added ISI due to polarization skew. Next, the filtered and amplified signal is sampled to extract the data, as indicated by block 2403. Also, in some embodiments, the filtered and amplified signal undergoes non-linear equalization such as decision feedback equalization (DFE). Simultaneously, the precursor ISI, the postcursor ISI, and the main tap height are measured through a data level slicer (dLev). Also, a clock-data recovery (CDR) samples the filtered data and outputs data to extract the optimal sampling time, as indicated by block 2405. Information about the ISI is sent to the equalization (EQ) adaptation block to analyze the residual ISI and adjust the filter weights accordingly, as indicated by block 2407.

Figure 24B:
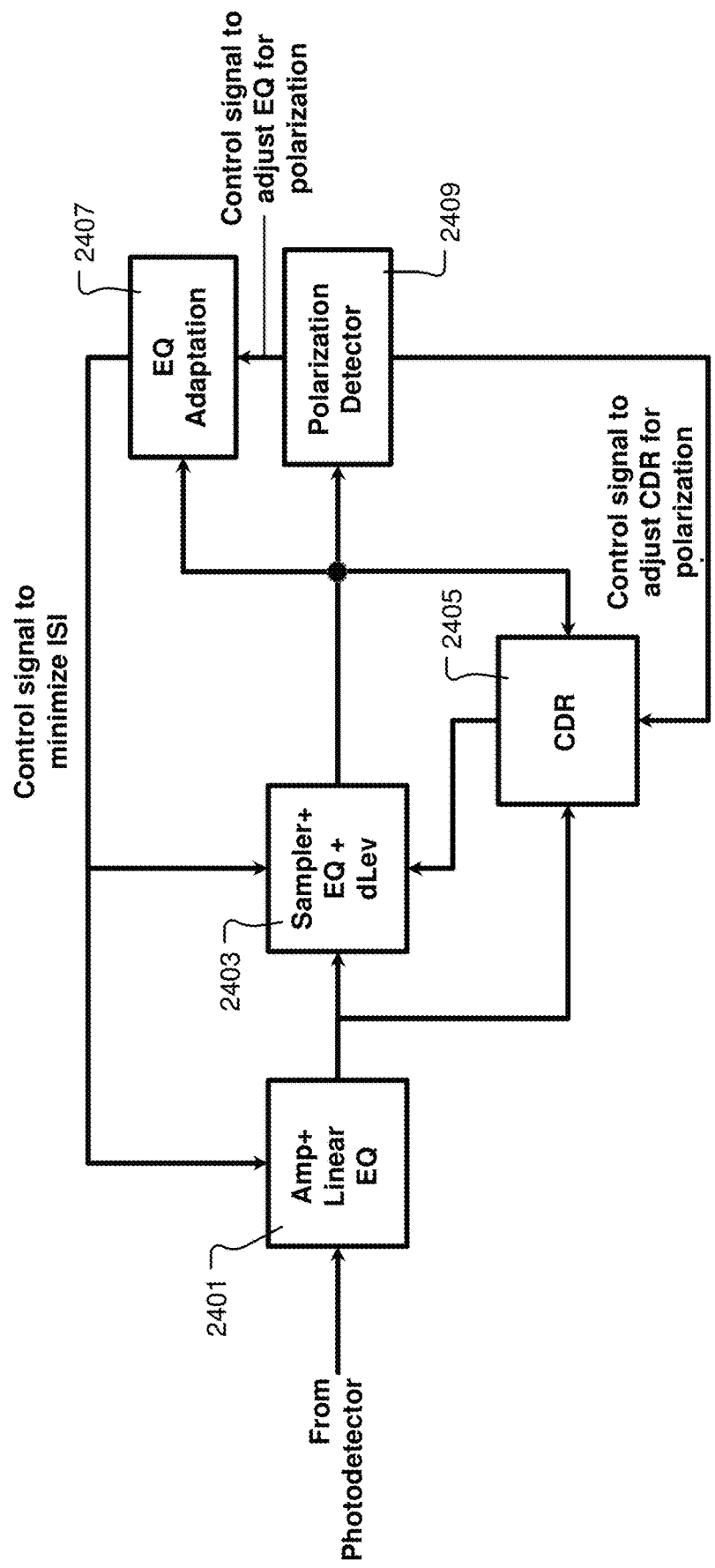
FIG. 24B shows a modification of the electro-optic receiver of FIG. 24A, in accordance with some embodiments.

FIG. 24B shows a modification of the electro-optic receiver of FIG. 24A, in accordance with some embodiments. In this embodiment, information about the ISI is also sent to a polarization detector, as indicated by block 2409. Based on the relative strength of the precursor ISI and the postcursor ISI, information about the polarization state is extracted and is then used to adjust the EQ adaptation and CDR to move to an ideal lock position.

Figure 24C:
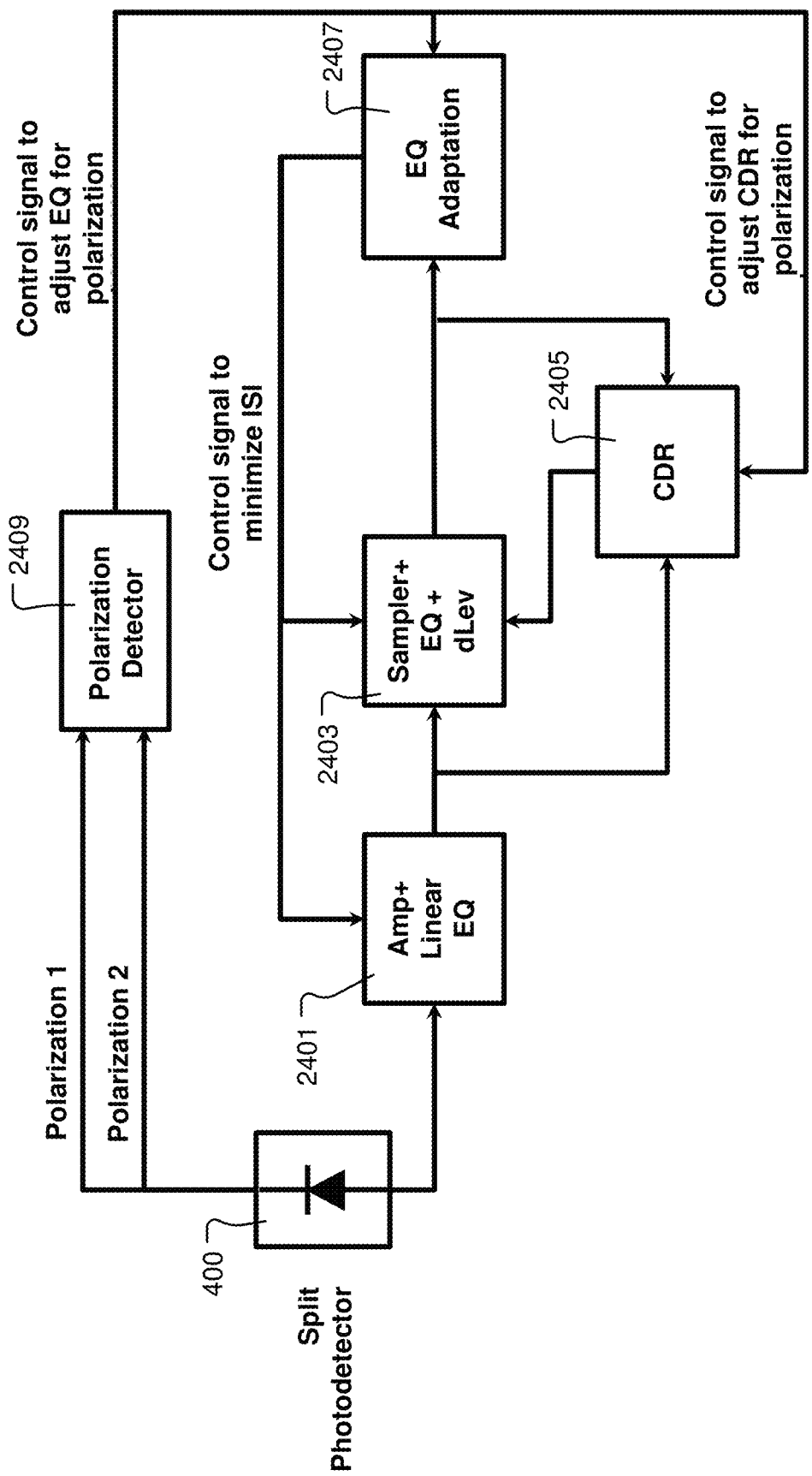
FIG. 24C shows a modification of the electro-optic receiver of FIG. 24B, in accordance with some embodiments.

FIG. 24C shows a modification of the electro-optic receiver of FIG. 24B, in accordance with some embodiments. In this embodiment, the linear photodetector 400 of FIG. 4 is implemented to output photocurrents from each of the two polarizations (TE and TM) to separate outputs for measurement by the polarization detector, as indicated by block 2409. The polarization detector provides a reverse bias to the linear photodetector 400, and measures the amount of photocurrent flowing through each bias. By comparing the relative photocurrent of each bias, information about the polarization state is extracted. This information is then used to adjust the EQ adaptation and CDR to move to the ideal lock position.

In some embodiments, the electro-optic receiver includes equalization and timing recovery circuits to handle the combined effects of polarization-dependent timing-skew, bandwidth limitations, and clock timing jitter. In some embodiments, the electro-optic receiver includes amplifiers for the purpose of conditioning the signal for equalization and clock-data recovery. In some embodiments, the electro-optic receiver includes an adaptive equalization circuit which detects the presence of ISI, and corrects for it with linear filters or non-linear feedback control through DFE. In some embodiments, the amount of ISI is measured during operation by a monitor or dLev. Information about the relative ISI tap weights is used to adapt the equalization circuit to minimize the residual ISI. In some embodiments, the electro-optic receiver includes CDR circuitry which detects the optimal time to sample the incoming signal by extracting timing information from data transitions and adjusting the internal sampling clock accordingly.

In some embodiments, the input polarization may not be well controlled, and can vary over time. The presence of a time-varying input polarization results in time-varying ISI conditions. Time-varying input polarization can also dynamically shift the electro-optic receiver's optimal sampling time by up to the skew between the two polarizations during operation. In some embodiments, without further correction, the CDR and equalization circuitry may encounter conditions where it will not lock to the optimal settings. In some embodiments, the electro-optic receiver contains additional circuitry to detect the relative split in optical power between polarization states during operation. In some embodiments, the spatial distribution of photocurrent generation in the photodetector may be used to measure the polarization state of the input. In some embodiments, a linear photodetector (e.g., 400) may be used where light is input from two different sides, where each side supplies light from one input polarization. In these embodiments, the intensity of light, and as a result the generated carriers, from one polarization decays exponentially across the length of the photodetector according to the photo-absorption coefficient. Due to this, a majority of light from one polarization is absorbed on one half of the photodetector, and a majority of light from the other polarization is absorbed on the other half of the photodetector. In these embodiments, the contacts to the photodetector may be segmented and connected to a plurality of different reverse biasing and receiver circuits. By comparing the relative photocurrent measured between different receivers, the relative power split between different polarizations can be determined.

In some embodiments changes to the relative amount of ISI can be used to detect the polarization state of the input. The impact of polarization timing-skew on ISI is minimized when the input polarization directly aligns with one of the linear polarizations of the receive chip. The impact of polarization timing-skew on ISI is maximized when the input polarization splits power evenly between the two linear polarizations of the receive chip. In some embodiments, dLev may be used to measure the magnitude of ISI during operation. Information about changes in the magnitude of ISI, and changes to the ratio of the precursor ISI and the postcursor ISI can be used to infer shifts in the polarization state. Also, in some embodiments, information about the polarization state can be used to dynamically adjust the CDR circuitry to cancel drift in the optimal sampling position. In some embodiments, information about the polarization state can be used to dynamically adjust the equalization circuitry to minimize residual ISI. In some embodiments, information about the polarization state can be used to detect and separate data streams that have been combined using polarization multiplexing.

In some embodiments, the optical coupler that couples light from the input optical fiber/waveguide into the PIC is a dual-polarization vertical grating coupler that routes light from different input polarizations directly into two output waveguides on the PIC, possibly with the same waveguide polarization. In some embodiments, the light from the two polarizations of the input optical fiber/waveguide is split into separate directions by a polarization beam splitter, and is coupled into two separate PIC waveguides through two separate vertical grating couplers, or through two separate edge couplers, or through any other coupling scheme. In various embodiments, the polarization beam-splitter is a separate device, or is built into the input optical fiber/waveguide itself by a suitable modification of the input optical fiber/waveguide termination.

In some embodiments, the light from the two polarizations are input into the same waveguide of the PIC, with different waveguide polarizations, either through edge-coupling or vertical grating coupling or some other method, and the splitting of the signal into two different waveguides is done by a polarization splitter built into the PIC. In such cases, the output of an integrated polarization splitter provides two output waveguides each carrying one polarization mode, and the polarization modes are different, such that one polarization mode is TE-like and the other polarization mode is TM-like. Hence, in some embodiments, a further integrated polarization rotator converts one of the output modes to match the same polarization state as the other, in a matching waveguide cross-section. In other embodiments, the two outputs of the polarization splitter device contain a combination of two input orthogonal polarization states. For example, the two outputs of the polarization splitter device contain the sum and the difference of the input TM and TE waves.

In some embodiments, the PIC is built on a semiconductor chip, such as a silicon or indium phosphide based chip. In some embodiments, the electronics of the electro-optic receiver are co-located with the optical devices on the chip. In some embodiments, the electrical signal from the photodetector is routed off-chip to an external receiver circuit. In some embodiments, the PIC is built out of glass, and the two waveguides in the glass PIC receiving the input optical fiber/waveguide signal are routed to a photodetector on a different chip, either through butt-coupling of two chips, or through a connecting external optical fiber/waveguide.

In some embodiments, WDM is used to receive information from different wavelength channels within the input optical fiber/waveguide. In these embodiments, the PIC will have a plurality of photodetectors, with each photodetector detecting a single wavelength channel within a narrow, distinct wavelength range. In some embodiments, all of a plurality of photodetectors are placed near a single bus optical waveguide that connects the two PIC waveguides receiving the split input signal. The photodetectors are designed to couple to the optical signal in the single bus optical waveguide, from either direction, only if the optical signal falls within the specified wavelength range of a given photodetector, which allows multiple photodetectors to operate independently on the single (shared) bus optical waveguide. In some embodiments, the plurality of photodetectors are built into ring resonators, or disk resonators, or other resonant photodetectors with wavelength selectivity control. In some embodiments, the plurality of photodetectors are linear detectors. In some embodiments, passive ring resonators are used as WDM filters, passing each wavelength channel of the incoming optical signal to a single linear photodetector that detects only data from a single wavelength channel.

In some embodiments in which the photodetector is a resonant device, such as a ring resonator or a Fabry-Perot resonator, or a non-resonant linear photodetector, a standing wave or partial standing wave will form within the photodetector if it receives light signals from two opposite directions. This standing wave pattern will manifest itself as an array of discrete positions within the photodetector where the optical power is high. In some configurations, the photodetector is built in such a way that the responsivity varies locally within the photodetector cavity. For example, in some embodiments, the photodetector includes a set of interleaved diodes formed by non-uniform dopant profiles throughout the photodetector cavity. In another example, in some embodiments, the photodetector includes a division of the photo-absorptive material into "islands" of discrete areas. In some embodiments, there is a chance that the standing wave will isolate the optical power density into discrete parts of the photodetector that do not have strong responsivity. In some embodiments, to address this issue, the photodetectors are configured so that the average responsivity over the length of the photodetector is not minimized. For example, in some embodiments, the photodetector is configured to have appropriate spacing or placement of the photodetector regions that show high responsivity, so as to spatially align with the peak amplitude locations of the standing wave within the photodetector cavity.

In some embodiments, a differential delay to the photodetector via the two PIC waveguides carrying the two components of the polarization state is compensated with an optical circuit. For example, in the electro-optic receiver 300 of FIG. 3, optical delay lines are implemented to equalize the waveguide path length for each wavelength channel of the two split signals, thereby reducing the time delay of the signals to the photodetector. In some cases, this eliminates the need for a receiver timing-skew management system. In other cases, the uncertainty in the timing delay still necessitates a receiver timing-skew management system, but the optical delay lines will enable the size of the system (such as the spacing between the detectors) to be much larger, which helps to accommodate the size of the receiver and other circuitry in embodiments where the photodetectors and receiver circuits are co-located on the same chip, and which helps to reduce packaging constraints for embodiments where the receiver circuits are located on a separate chip.

In some embodiments, an additional PIC optical skew compensator (OSC) is inserted between the inputs of the two PIC waveguides carrying the two components of the polarization state and the plurality of channel receivers. The OSC is designed to provide a group delay as a function of frequency (wavelength) to match the group delay mismatch imposed by the waveguide length for the wavelength channels. In some embodiments, the OSC provides a linear group delay with frequency, and the channel receivers are arranged along the receiver waveguide in order of monotonically increasing frequency. In some embodiments, two OSC's are provided, each providing half of the timing-skew delay compensation, with one OSC at each of the two PIC waveguide inputs. In some embodiments, the two OSC's provide linearly ramped group delay with frequency, with the first OSC having an increasing ramped group delay with frequency, and with the second OSC having a decreasing ramped group delay with frequency. In some embodiments, the OSC includes an all pass filter. In some embodiments, the OSC includes a set of ring (microring) resonator all-pass filters. In some embodiments, the OSC provides minimal insertion loss at all wavelengths corresponding to the WDM channels, and tailored group delays. In some embodiments, the OSC's slope of group delay ramp with increasing frequency is such that, over a single channel spacing, the group delay difference produced is approximately equal to the group delay difference produced by the difference in physical position of the channel receivers for two adjacent channels.

In some embodiments disclosed herein, a channel receiver circuit is provided that is capable of compensating for the two-path differential group delay. Also, in some embodiments disclosed herein, a WDM receiver architecture is provided as a wrap-around loop. Also, in some embodiments disclosed herein, a channel receiver photodiode is provided that avoids issues with arbitrarily distributed input light between two input ports (e.g., interdigitated photodetector with number of junctions different from number of wavelengths around at operating wavelength—to have constant responsivity versus detuning, with no nulls). Also, in some embodiments disclosed herein, a method and a system are provided for combining polarizations into a single mode with a feedback control, including use of an integrated delay line for timing-skew compensation to ensure broadband operation, which is generalized to WDM communication. Also, in some embodiments disclosed herein, a transmitter with modulation of orthogonal polarization components with the same bit pattern is provided.

In some embodiments disclosed herein, an electro-optic receiver configuration is provided in which an optical signal having arbitrary polarization is coupled from an input optical fiber/waveguide into a PIC and is detected by one or more optical detectors within the PIC, regardless of the polarization state of the light of the optical signal in the input optical fiber/waveguide. In some embodiments, the electro-optic receiver includes a polarization beam-splitting and rotating device that couples light having uncontrolled polarization from the input optical fiber/waveguide into two separate ends of a same loop-structured optical waveguide within the PIC, such that light from each linear polarization is coupled into a different end of the same loop-structured optical waveguide within the PIC, and such that light having one of the two linear polarizations is rotated to the other polarization before coupling into the loop-structured optical waveguide. In this manner, light propagating through the loop-structured optical waveguide from either the first end or the second end has the same polarization and can be detected by the same photodetector. This eliminates the need to have duplicate photodetector devices for detecting the two polarizations of light, respectively, thereby optimizing chip area usage and reducing cost.

Also, in some embodiments, the electro-optic receiver includes a polarization beam-splitting and rotating device that couples light having uncontrolled polarization from the input optical fiber/waveguide into two separate waveguides within the PIC, such that light from each linear polarization within the input optical fiber/waveguide is coupled into a separate waveguide within the PIC. Also, the polarization beam-splitting and rotating device is designed to rotate a polarization of light having one of the two linear polarizations to the other polarization before coupling of the light into the respective waveguide within the PIC. In this manner, light coupled into the two waveguides within the PIC have the same preferred waveguide polarization. The two waveguides within the PIC are routed to the same photodetector device (or set of photodetector devices), which allows any polarization of the input optical signal to be detected in the same photodetector device. This eliminates the need to have duplicate photodetector devices for detecting the two polarizations of light, respectively, thereby optimizing chip area usage and reducing cost.

In some embodiments, in the event that the optical signal from the input optical fiber/waveguide contains both polarizations, the light of the optical signal will be coupled into both waveguides of the PIC. Since the two waveguides within the PIC have different lengths to reach a given photodetector device, each polarization component of the optical signal may reach the given photodetector device at different times, so as to have a timing difference (timing-skew). In such cases, the timing-skew management system is implemented in the electro-optic receiver circuitry to enable the electro-optic receiver to faithfully recover the optical signal as received from the input optical fiber/waveguide even with the timing difference. In cases where the timing difference is too large to be handled by the timing-skew management system, an optical delay line is implemented within the PIC to either reduce the timing difference to a low enough level that can be handled by the timing-skew management system, or eliminate the timing difference.

It should be appreciated that the electro-optic receiver embodiments disclosed herein are useful in applications where electro-optic receivers detect light from an input optical fiber/waveguide in which the polarization is not controlled. A polarization beam-splitter and rotator, such as the dual-polarization grating coupler among others, is used in some embodiments to transmit incoming light of either polarization into a preferred polarization of the electro-optic receiver PIC. In some embodiments, with the input optical signal split into two separate optical waveguides within the PIC, the light from the two optical waveguides cannot be combined into a single waveguide in a low-loss, broadband way without complex phase control and optical power monitoring systems. To mitigate this issue, various embodiments of the electro-optic receiver disclosed herein provide for non-simultaneous detection of the polarization-split input optical signal by the same detector or set of detectors, thereby reducing cost and complexity of the electro-optic receiver.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. A method for operating an electro-optic combiner, comprising:
    receiving incoming light through an optical input port of a photonic circuit, wherein a first portion of the incoming light has a first polarization and a second portion of the incoming light has a second polarization;
    splitting the first portion of the incoming light from the second portion of the incoming light;
    directing the first portion of the incoming light through a first optical waveguide;
    rotating the second polarization of the second portion of the incoming light to the first polarization so that the second portion of the incoming light is a polarization-rotated second portion of the incoming light;
    directing the polarization-rotated second portion of the incoming light through a second optical waveguide; and
    operating a plurality of ring resonators disposed between the first optical waveguide and the second optical waveguide, wherein each of the plurality of ring resonators is operated to evanescently in-couple light from the first optical waveguide and out-couple light into the second optical waveguide.

2. The method as recited in claim 1, wherein each of the plurality of ring resonators is configured to operate at a respective resonant wavelength, such that light having a wavelength substantially equal to the respective resonant wavelength of a given one of the plurality of ring resonators optically couples from the first optical waveguide into the given one of the plurality of ring resonators.

3. The method as recited in claim 1, further comprising:
    operating a plurality of phase shifters in optical coupling with the first optical waveguide to apply a controlled amount of shift to a phase of light traveling through the first optical waveguide.

4. The method as recited in claim 3, wherein each of the plurality of phase shifters is disposed before a respective one of the plurality of ring resonators with respect to a light propagation direction through the first optical waveguide.

5. The method as recited in claim 1, further comprising:
    directing light from an output portion of the second optical waveguide to one or more photodetectors, wherein the output portion of the second optical waveguide is located after the plurality of ring resonators with respect to the light propagation direction through the second optical waveguide.

6. The method as recited in claim 1, wherein splitting the first portion of the incoming light from the second portion of the incoming light and rotating the second polarization of the second portion of the incoming light to the first polarization are performed by a polarization splitter and rotator device.

7. A method for operating an electro-optic combiner, comprising:
    receiving incoming light through an optical input port of a photonic circuit, wherein a first portion of the incoming light has a first polarization and a second portion of the incoming light has a second polarization;
splitting the first portion of the incoming light from the second portion of the incoming light;
directing the first portion of the incoming light through a first optical waveguide;
rotating the second polarization of the second portion of the incoming light to the first polarization so that the second portion of the incoming light is a polarization-rotated second portion of the incoming light;
directing the polarization-rotated second portion of the incoming light through a second optical waveguide;
operating a first plurality of ring resonators disposed between the first optical waveguide and the second optical waveguide, wherein each of the first plurality of ring resonators is operated to evanescently in-couple light at a particular channel wavelength from the first optical waveguide; and
operating a second plurality of ring resonators disposed between the first optical waveguide and the second optical waveguide, wherein each of the second plurality of ring resonators is operated to evanescently in-couple light at a particular channel wavelength from a respective one of the first plurality of ring resonators, wherein each of the second plurality of ring resonators is also operated to evanescently out-couple light to the second optical waveguide.

8. The method as recited in claim 7, wherein each optically coupled pair of ring resonators within the first plurality of ring resonators and the second plurality of ring resonators is operated at a substantially same resonant wavelength.

9. The method as recited in claim 7, wherein each optically coupled pair of ring resonators within the first plurality of ring resonators and the second plurality of ring resonators has an opposite light propagation direction.

10. The method as recited in claim 7, further comprising:
operating a phase shifter in optical coupling with the first optical waveguide to apply a controlled amount of shift to a phase of light traveling through the first optical waveguide.

11. The method as recited in claim 7, further comprising:
routing light from an output section of the second optical waveguide to one or more photodetectors.

12. The method as recited in claim 11, wherein the output section of the second optical waveguide is located after the second plurality of ring resonators with respect to a light propagation direction through the second optical waveguide.

13. A method for operating an electro-optic combiner, comprising:
receiving incoming light through an optical input port of a photonic circuit, wherein a first portion of the incoming light has a first polarization and a second portion of the incoming light has a second polarization;
splitting the first portion of the incoming light from the second portion of the incoming light;
directing the first portion of the incoming light through a first optical waveguide;
rotating the second polarization of the second portion of the incoming light to the first polarization so that the second portion of the incoming light is a polarization-rotated second portion of the incoming light;
directing the polarization-rotated second portion of the incoming light through a second optical waveguide;
operating a first plurality of ring resonators disposed between the first optical waveguide and the second optical waveguide, wherein each of the first plurality of ring resonators is operated to evanescently in-couple light at a particular channel wavelength from the first optical waveguide;
optically coupling light from each of the first plurality of ring resonators into a corresponding one of a plurality of intermediate optical waveguides;
operating a second plurality of ring resonators disposed between the first optical waveguide and the second optical waveguide, wherein each of the second plurality of ring resonators is operated to evanescently in-couple light at a particular channel wavelength from a respective one of the plurality of intermediate optical waveguides, wherein each of the second plurality of ring resonators is also operated to evanescently out-couple light to the second optical waveguide.

14. The method as recited in claim 13, wherein each optically connected pair of ring resonators within the first plurality of ring resonators and the second plurality of ring resonators is operated at a substantially same resonant wavelength.

15. The method as recited in claim 13, wherein each optically connected pair of ring resonators within the first plurality of ring resonators and the second plurality of ring resonators has an opposite light propagation direction.

16. The method as recited in claim 13, further comprising:
operating a phase shifter in optical coupling with the first optical waveguide to apply a controlled amount of shift to a phase of light traveling through the first optical waveguide.

17. The method as recited in claim 13, further comprising:
routing light from a output section of the second optical waveguide to one or more photodetectors, wherein the output section of the second optical waveguide is located after the second plurality of ring resonators with respect to a light propagation direction through the second optical waveguide.

18. The method as recited in claim 13, further comprising:
operating a plurality of photodetectors to detect an amount light optically coupled into respective ones of the plurality of intermediate optical waveguides.

19. The method as recited in claim 18, further comprising:
controlling resonant wavelengths of the first plurality of ring resonators and the second plurality of ring resonators in accordance with photocurrents generated by corresponding ones of the plurality of photodetectors to optimize an amount of optical power conveyed from the first optical waveguide to the second optical waveguide by way of a combination of the first plurality of ring resonators, the plurality of intermediate waveguides, and the second plurality of ring resonators.

20. The method as recited in claim 18, further comprising:
operating a phase shifter in optical coupling with the first optical waveguide to apply a controlled amount of shift to a phase of light traveling through the first optical waveguide, wherein the controlled amount of shift is based on photocurrents generated by the plurality of photodetectors.

* * * * *